(12) United States Patent
McGrath et al.

(10) Patent No.: US 11,159,609 B2
(45) Date of Patent: Oct. 26, 2021

(54) METHOD, SYSTEM AND PRODUCT TO IMPLEMENT DETERMINISTIC ON-BOARDING AND SCHEDULING OF VIRTUALIZED WORKLOADS FOR EDGE COMPUTING

(71) Applicant: Intel Corporation, Santa Clara, CA (US)

(72) Inventors: Michael J. McGrath, Virtinia (IE); Daire Healy, Enfield (IE); Christopher D. Lucero, Chandler, AZ (US); Marcin Spoczynski, Lexilip (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/833,435

(22) Filed: Mar. 27, 2020

(65) Prior Publication Data

US 2020/0296155 A1 Sep. 17, 2020

(51) Int. Cl.
*H04L 29/08* (2006.01)
*G06F 9/50* (2006.01)
*G06F 9/54* (2006.01)
*G16Y 40/10* (2020.01)
*G16Y 40/35* (2020.01)

(52) U.S. Cl.
CPC ........ *H04L 67/1008* (2013.01); *G06F 9/5083* (2013.01); *G06F 9/547* (2013.01); *H04L 67/1023* (2013.01); *G16Y 40/10* (2020.01); *G16Y 40/35* (2020.01)

(58) Field of Classification Search
CPC ............. H04L 67/1008; H04L 67/1023; H04L 67/1012; G06F 9/5083; G06F 9/547; G06F 9/5027; G16Y 40/10; G16Y 40/35
See application file for complete search history.

(56) References Cited

U.S. PATENT DOCUMENTS

| | | | |
|---|---|---|---|
| 2015/0074276 A1* | 3/2015 | DeCusatis | H04L 41/0896 709/226 |
| 2015/0133129 A1* | 5/2015 | Chiang | H04W 16/10 455/447 |
| 2016/0094477 A1* | 3/2016 | Bai | H04L 47/786 709/226 |
| 2018/0314425 A1* | 11/2018 | Gray | G06F 3/0644 |
| 2020/0014609 A1* | 1/2020 | Hockett | H04L 67/18 |
| 2020/0145337 A1* | 5/2020 | Keating | H04L 47/781 |
| 2020/0287962 A1* | 9/2020 | Mishra | H04L 67/1008 |

* cited by examiner

*Primary Examiner* — Michael A Keller
(74) *Attorney, Agent, or Firm* — Alliance IP, LLC

(57) ABSTRACT

A non-transitory computer-readable storage medium, an apparatus, and a computer-implemented method. The computer-readable storage medium is of an edge computing system and is to identify a target edge node for deployment of a workload thereon. The computer-readable storage medium further comprises computer-readable instructions that, when executed, cause at least one processor to perform operations comprising: determining whether respective ones of candidate target edge nodes of a set of candidate target edge nodes of the edge computing system support workload determinism key performance indicators (KPIs) of the workload; in response to a determination that one or more candidate target edge nodes support the workload determinism KPIs, selecting a target edge node from the one or more candidate edge nodes; and causing the workload to be deployed at the target edge node.

22 Claims, 28 Drawing Sheets

*LOW POWER ACCELERATED PLATFORM*
*MORE SERVICE DENSITY / WATT*
*COMPLEX ORCHESTRATION AND MANAGEMENT*
*COMPLEX ECOSYSTEM ENABLING*

*HIGHER POWER*
*LESS SERVICE DENSITY / WATT*
*SIMPLER ORCHESTRATION AND MANAGEMENT*
*EASIER ECOSYSTEM ENABLING*

```
SMT_constraint_solver_sample.doc:    sample VIFD for
description: Constraints required for SMT-based scheduler
             dependent on network characteristics metadata:
  dec_name: constraints-for-SMT-based-scheduler topology:
  node:
    type: smt.nodes.vifd
    capabilities
      ifv_compute:
        properties:
          count:  15
          topology:  'star'
          num_cpu:  1
          cpu:  3.5
          ram:  30 MB
          disk_size:  1TB constraints hop-delay:  1.0
    mem-bound:  50.0
    frame-spacing:  1.0
    num_distinct_groupings:  2
    total_time_avail:  15000 cost

Energy_hourly_max_watts: 25
    CPU_daily_cost$_max: 2.5
```

— 1900 (top right)
— 1920 (topology section)
— 1940 (constraints section)
— 1960 (cost section)

FIG. 19

METHOD, SYSTEM AND PRODUCT TO IMPLEMENT DETERMINISTIC ON-BOARDING AND SCHEDULING OF VIRTUALIZED WORKLOADS FOR EDGE COMPUTING

FIELD

The instant disclosure relates in general to the field of on-boarding, scheduling and managing virtualized workloads in an edge computing environment.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 19 illustrates a sample virtualized industrial function descriptor (VIFD) according to an embodiment;

DETAILED DESCRIPTION

Figure 1:
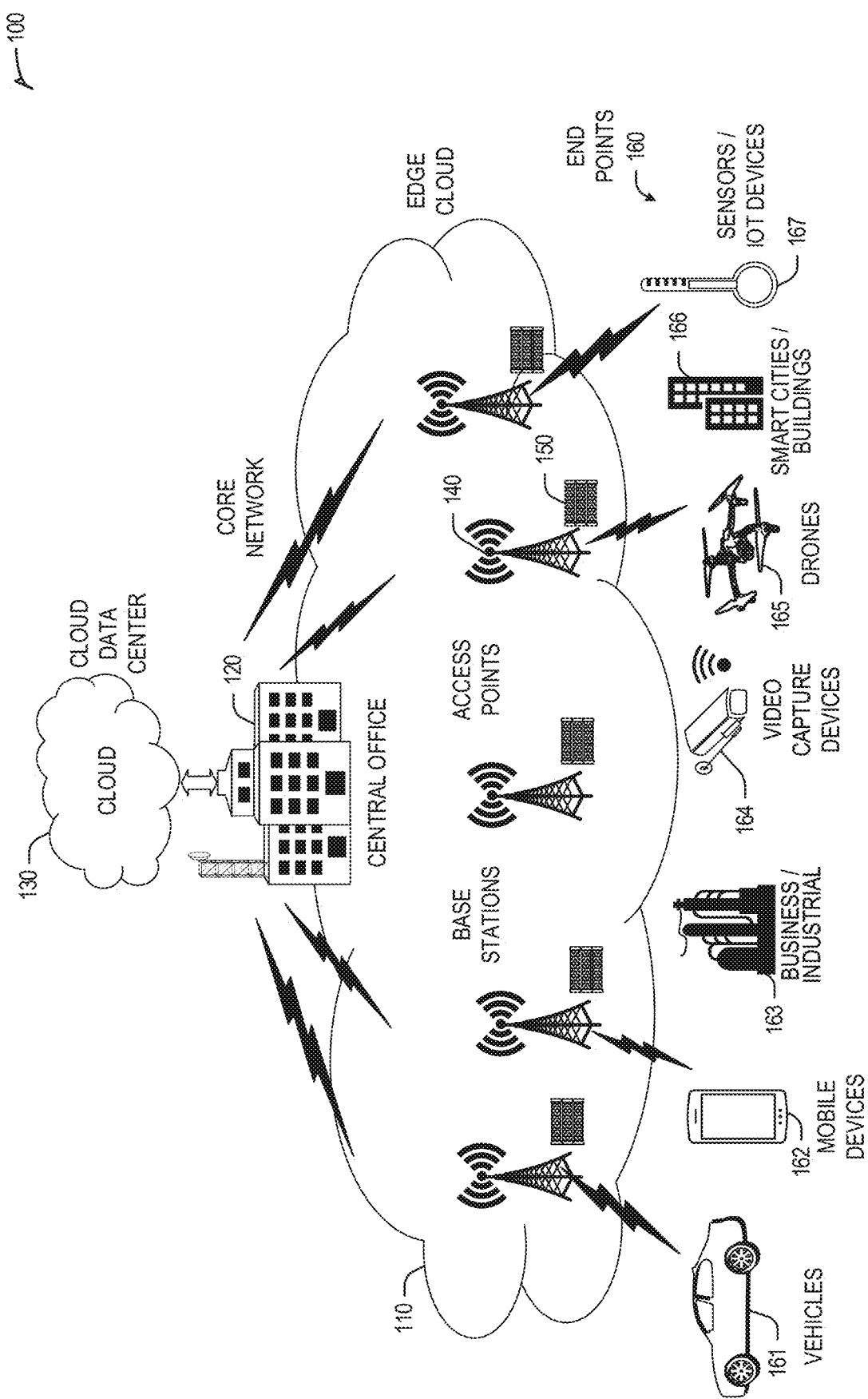
FIG. 1 illustrates an overview of an edge cloud configuration for edge computing.

The following embodiments generally relate to service management, resource allocation, compute management, network communication, and communication system implementations, and in particular, to techniques and configurations for on-boarding, scheduling and management of virtualized workloads for edge computing.

In the following description, methods, configurations, and related apparatuses are disclosed for various improvements to the configuration and functional capabilities of an edge computing architecture and an implementing edge computing system. These improvements may benefit a variety of use cases, especially those involving industrial applications, but embodiments are not so limited.

The following initially provides an overview of terminology applicable to edge computing (Section I). This is followed by an overview of edge computing technology and configurations (Section II), and example configurations and methods embodying the improvements described herein, it being understood that example configurations of embodiments in Section III may be implemented using/on for example the edge computing technology and/or configurations described in Section II, or using/on other edge computing technology and/or configurations.

I. Terminology

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

Specific arrangements of edge computing applications and services accessible via mobile wireless networks (e.g., cellular and Wi-Fi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing an aspect of edge computing operations, whether part of a larger system, distributed collection of systems, or a stand-alone apparatus. In some examples, a compute node may be referred to as a "edge node", "edge device", "edge system", whether in operation as a client, server, or intermediate entity. Specific implementations of a compute node may be incorporated into a server, base station, gateway, roadside unit, on premise unit, UE or end consuming device, or the like.

As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services, such as within an industrial enterprise setting.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site, or at a wired network site depending on the use case. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" (or NFV) indicates the migration of network functions from embedded services inside proprietary hardware appliances to software-based virtualized network functions (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local site, such as a local wireless site, such as a local cellular site, within the infrastructure edge.

As used herein, the term "virtualized network function" (or VNF) indicates a software-based network function operating on multi-function, multi-purpose compute resources (e.g., x86, ARM processing architecture) which are used by NFV in place of dedicated physical equipment. In some aspects, several VNFs will operate on an edge data center at the infrastructure edge.

As used herein, the term "edge node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

Although many of the following examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Examples of Edge Computing Systems

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 163, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., UEs), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
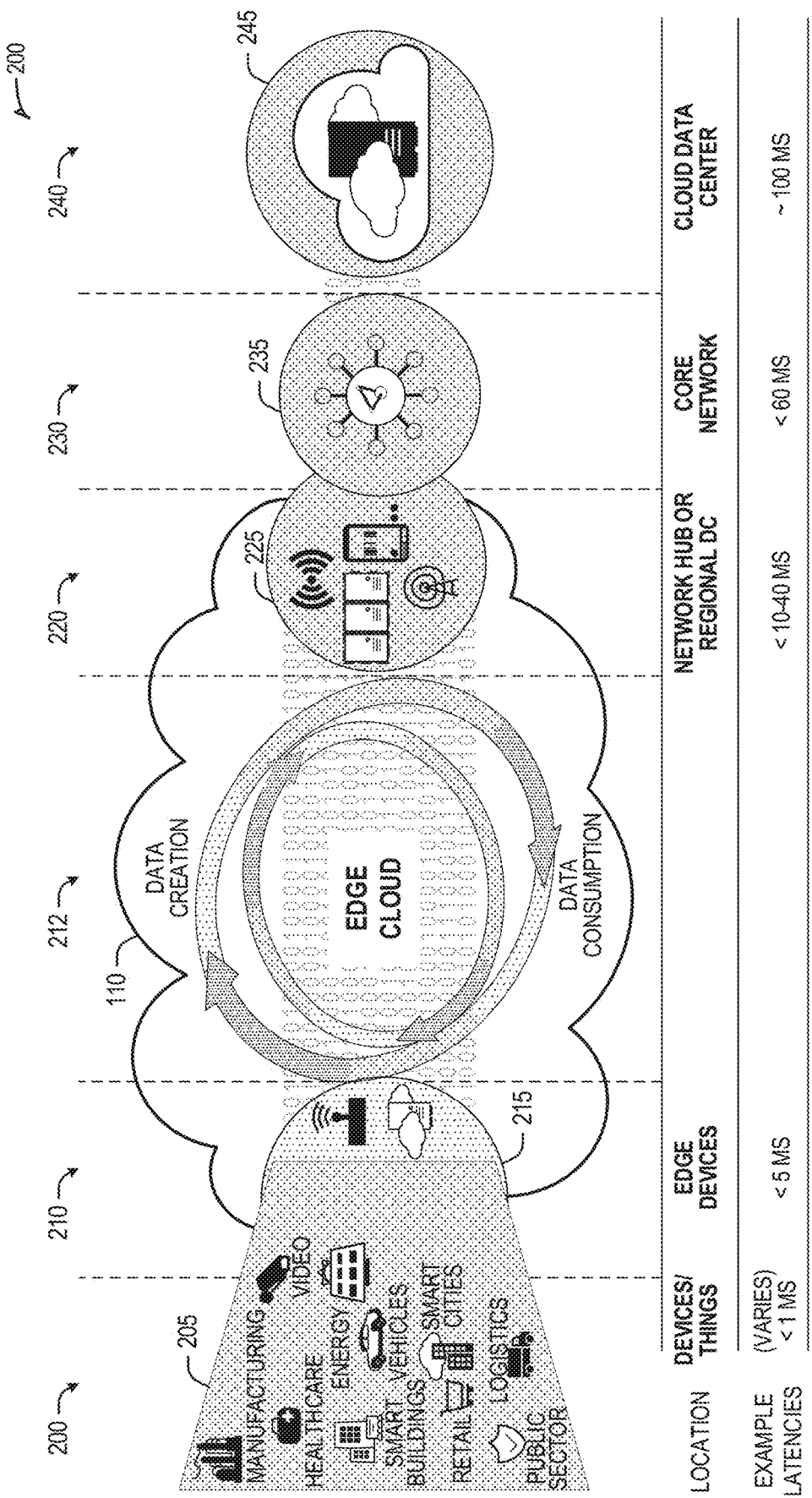
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers, or local network equipment (equipment 225); and any equipment, devices, or nodes located therebetween (in layer 212, not illustrated in detail). The network communications within the edge cloud 110 and among the various layers may occur via any number of wired or wireless mediums, including via the connectivity architectures and technologies discussed with reference to FIGS. 16 to 18.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation and (2) augment other components in the system to resume overall transaction SLA and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (VNFs, Function as a Service (FaaS), standard processes, etc.) which cannot leverage conventional cloud computing due to latency or other limitations.

Figure 3:
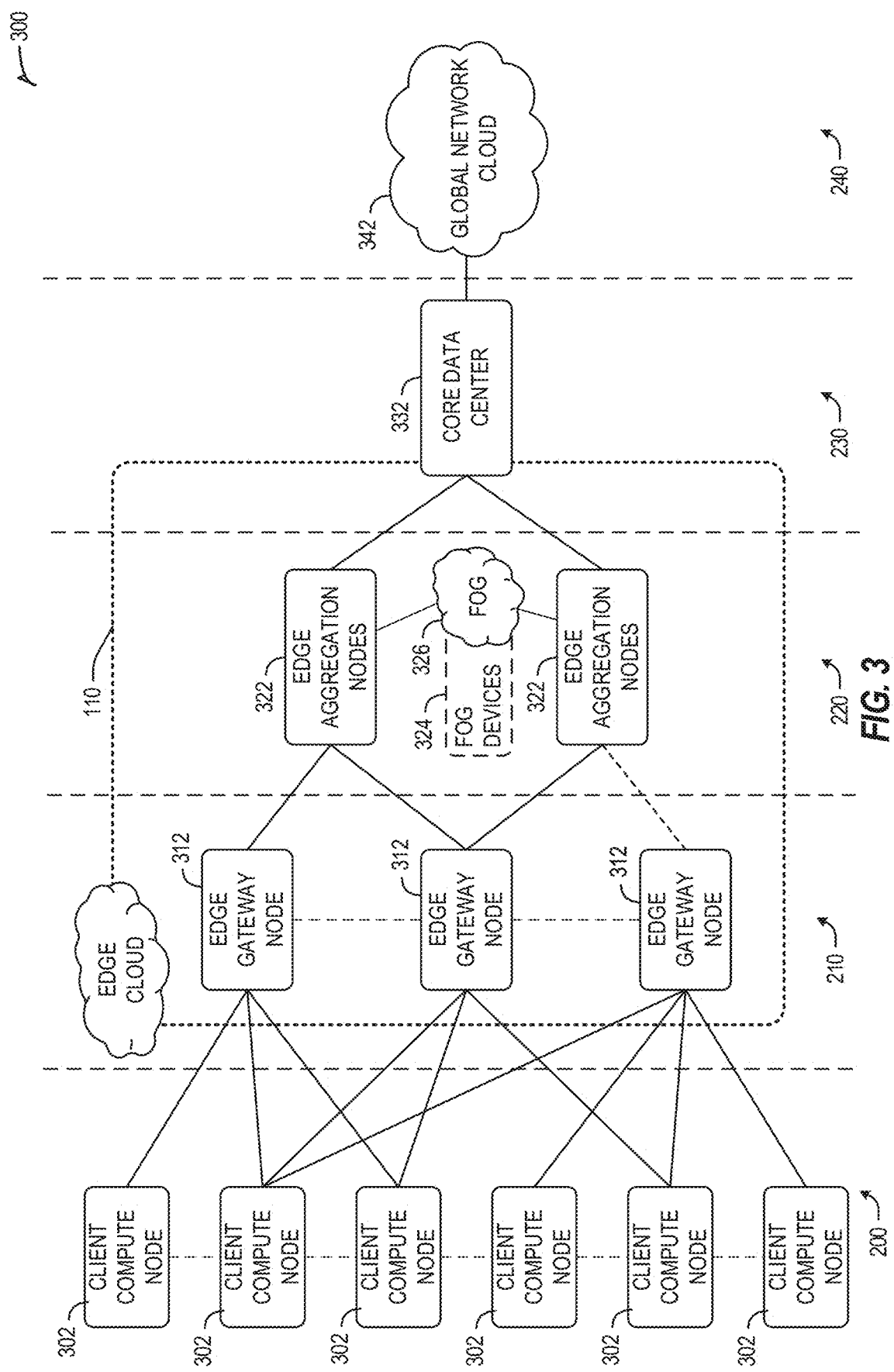
FIG. 3 provides an overview of layers of distributed compute deployed among an edge computing system.

At a more generic level, an edge computing system may be described to encompass any number of deployments at the previously discussed layers operating in the edge cloud 110 (network layers 200-240), which provide coordination from client and distributed computing devices. FIG. 3 provides an abstracted overview of layers of distributed compute deployed among an edge computing environment for purposes of illustration. Various types of network links at the same (e.g., peer-to-peer) or different layers are also depicted.

FIG. 3 generically depicts an edge computing system 300 for providing edge services and applications to multi-stakeholder entities, as distributed among one or more client compute nodes 302, one or more edge gateway nodes 312, one or more edge aggregation nodes 322, one or more core data centers 332, and a global network cloud 342, as distributed across layers of the network. The implementation of the edge computing system 300 may be provided at or on behalf of a telecommunication service provider ("telco", or "TSP"), internet-of-things service provider, cloud service provider (CSP), enterprise entity, or any other number of entities. Various implementations and configurations of the system 300 may be provided dynamically, such as when orchestrated to meet service objectives.

Individual nodes or devices of the edge computing system 300 are located at a particular layer corresponding to layers 200, 210, 220, 230, 240. For example, the client compute nodes 302 are located at an endpoint layer 200, while the edge gateway nodes 312 are located at an edge devices layer 210 (local level) of the edge computing system 300. Additionally, the edge aggregation nodes 322 (and/or fog devices 324, if arranged or operated with or among a fog networking configuration 326) are located at a network access layer 220 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provide a decentralized architecture and serves as an extension to cloud computing by collaborating with one or more edge node devices, providing the subsequent amount of localized control, configuration and management, and much more for end devices. Furthermore, Fog computing provides the ability for edge resources to identify similar resources and collaborate in order to create an edge-local cloud which can be used solely or in conjunction with cloud computing in order to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 332 is located at a core network layer 230 (a regional or geographically-central level), while the global network cloud 342 is located at a cloud data center layer 240 (a national or world-wide layer). The use of "core" is provided as a term for a centralized network location— deeper in the network—which is accessible by multiple edge nodes or components; however, a "core" does not necessarily designate the "center" or the deepest location of the network. Accordingly, the core data center 332 may be located within, at, or near the edge cloud 110. Although an illustrative number of client compute nodes 302, edge gateway nodes 312, edge aggregation nodes 322, edge core data centers 332, global network clouds 342 are shown in FIG. 3, it should be appreciated that the edge computing system 300 may include additional devices or systems at each layer. Devices at any layer can be configured as peer nodes to each other and, accordingly, act in a collaborative manner to meet service objectives. Additionally, as shown in FIG. 3, the number of components of respective layers 200, 210, 220, 230, 240 generally increases at each lower level (e.g., when moving closer to endpoints). As such, one edge gateway node 312 may service multiple client compute nodes 302, and one edge aggregation node 322 may service multiple edge gateway nodes 312.

Consistent with the examples provided herein, a client compute node 302 may be embodied as any type of endpoint component, device, appliance, or other thing capable of communicating as a producer or consumer of data. Further, the label "node" or "device" as used in the edge computing system 300 does not necessarily mean that such node or device operates in a client or slave role; rather, any of the nodes or devices in the edge computing system 300 refer to individual entities, nodes, or subsystems which include discrete or connected hardware or software configurations to facilitate or use the edge cloud 110.

As such, the edge cloud 110 is formed from network components and functional features operated by and within the edge gateway nodes 312 and the edge aggregation nodes 322 of layers 210, 220, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 3 as the client compute nodes 302. In other words, the edge cloud 110 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 110 may form a portion of or otherwise provide an ingress point into or across a fog networking configuration 326 (e.g., a network of fog devices 324, not shown in detail), which may be embodied as a system-level horizontal and distributed architecture that distributes resources and services to perform a specific function. For instance, a coordinated and distributed network of fog devices 324 may perform computing, storage, control, or networking aspects in the context of an IoT system arrangement. Other networked, aggregated, and distributed functions may exist in the edge cloud 110 between the core data center 332 and the client endpoints (e.g., client compute nodes 302). Some of these are discussed in the following sections in the context of network functions or service virtualization, including the use of virtual edges and virtual services which are orchestrated for multiple stakeholders.

As discussed in more detail below, the edge gateway nodes 312 and the edge aggregation nodes 322 cooperate to provide various edge services and security to the client compute nodes 302. Furthermore, because a client compute node 302 may be stationary or mobile, a respective edge gateway node 312 may cooperate with other edge gateway devices to propagate presently provided edge services, relevant service data, and security as the corresponding client compute node 302 moves about a region. To do so, the edge gateway nodes 312 and/or edge aggregation nodes 322 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 110. In a multi-stakeholder environment, there can be multiple loadable security modules (LSMs) used to provision policies that enforce the stakeholders interests. Enforcement point environments could support multiple LSMs that apply the combination of loaded LSM policies (e.g., where the most constrained effective policy is applied, such as where if any of A, B or C stakeholders restricts access then access is restricted). Within the edge cloud 110, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (to identify what elements are required by the system to conduct a service, how the system responds to service conditions and changes, and the like).

A "service" is a broad term often applied to various contexts, but in general it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during and end of the service.

Figure 4:
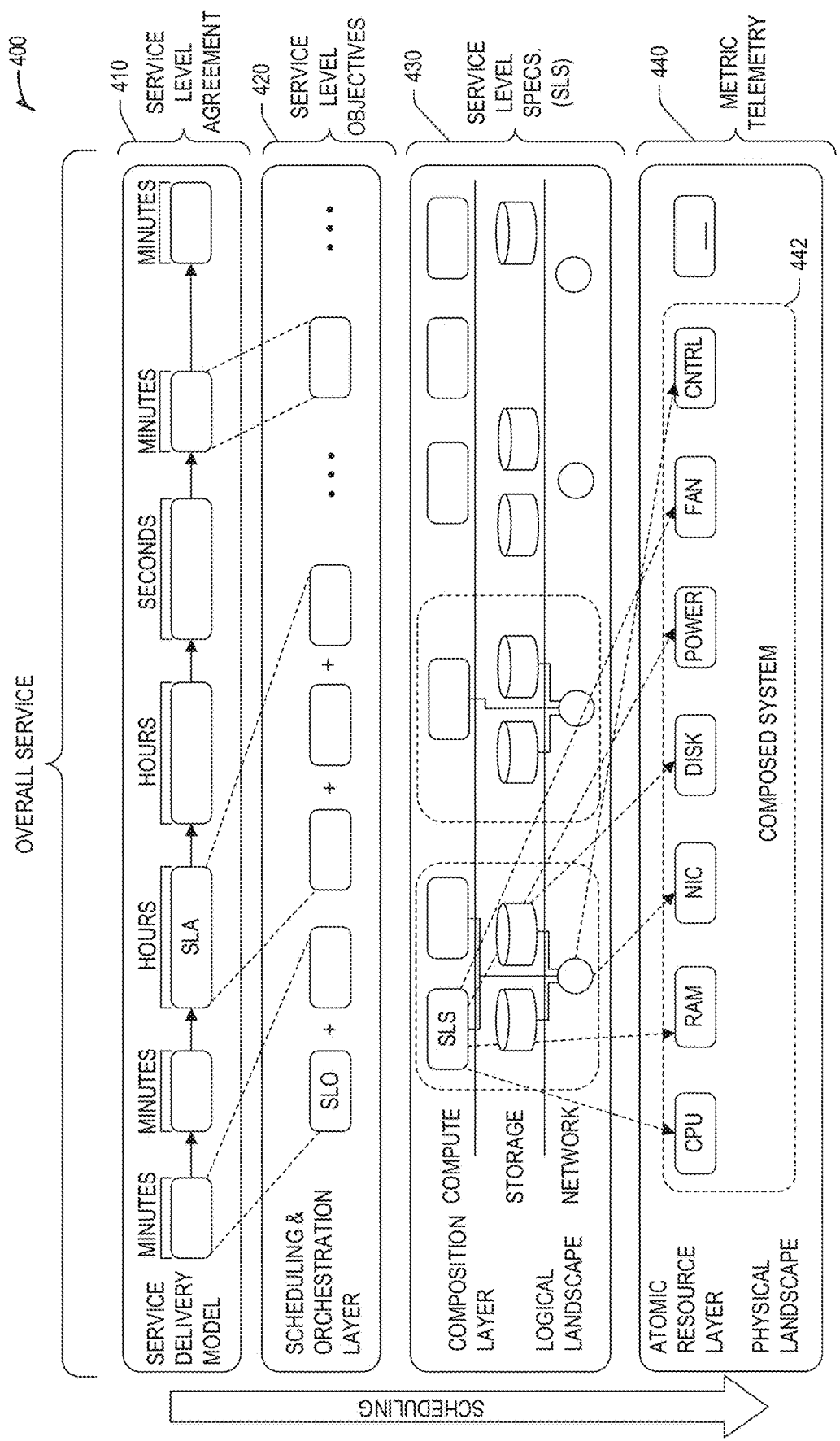
FIG. 4 provides an overview of layers of distributed compute deployed among an edge computing system.

An example relationship among services for use in an edge computing system is depicted in FIG. 4. In scenarios of edge computing, there are several services, and transaction layers in operation and dependent on each other—these services create a "service chain". At the lowest level, ingredients compose systems. These systems (or resources) communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in the hierarchy depicted in FIG. 4 is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement could define "transactional throughput" or "timeliness"—in case of SDSi, the system (or resource) can sign up to guarantee specific service level specifications (SLS 430) and objectives (SLO 420) of a service level agreement (SLA 410). SDSi hardware also provides the ability for the infrastructure and resource owner to empower the silicon component (e.g., components of a composed system 442 that produce metrics telemetry 440) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., SKU features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

The higher layer in the services hierarchy, Resource Level Services, includes systems which provide (in complete or through composition) the ability to meet workload demands by either acquiring and enabling system level features via SDSi, or through the composition of individually addressable resources (compute, storage and network).

The higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling. Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

The higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

The highest layer of services in the service hierarchy, Business Level Services (BLS), is tied to the capability that is being delivered. At this level, the customer or entity might not care about how the service is composed or what ingredients are used, managed, tracked in order to provide the service(s). The primary objective of business level services is to attain the goals set by the customer according to the overall contract terms and conditions established between the customer and the provider at the agreed to financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead through an agent or middleware capability. Services such as: locate, find, address, trace, track, identify, register may be placed immediately in effect as resources appear on the framework, and the manager or owner of the resource domain can use management rules and policies to ensure orderly resource discovery, registration and certification.

Moreover, any number of the edge computing architectures described herein may be adapted with service management features. These features may enable a system to be constantly aware and record information about the motion, vector and direction of resources as well as fully describe these features as both telemetry and metadata associated with the devices. These service management features can be used for resource management, billing and metering, as well as an element of security. The same functionality also applies to related resources, where a less intelligent device, like a sensor, might attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

Edge Computing Configurations and Arrangements

The deployment of a multi-stakeholder edge computing system may be arranged and orchestrated to enable the deployment of multiple services and virtual edge instances, among multiple edge nodes and subsystems, for use by multiple tenants and service providers. In a system example applicable to a cloud service provider (CSP), the deployment of an edge computing system may be provided via an "over-the-top" approach, to introduce edge nodes as a supplemental tool to cloud computing. In a contrasting system example applicable to a telecommunications service provider (TSP), the deployment of an edge computing system may be provided via a "network-aggregation" approach, to introduce edge nodes at locations in which network accesses (from different types of data access networks) are aggregated. However, these over-the-top and network aggregation approaches may be implemented together in a hybrid or merged approach or configuration as suggested in later examples.

Figure 5:
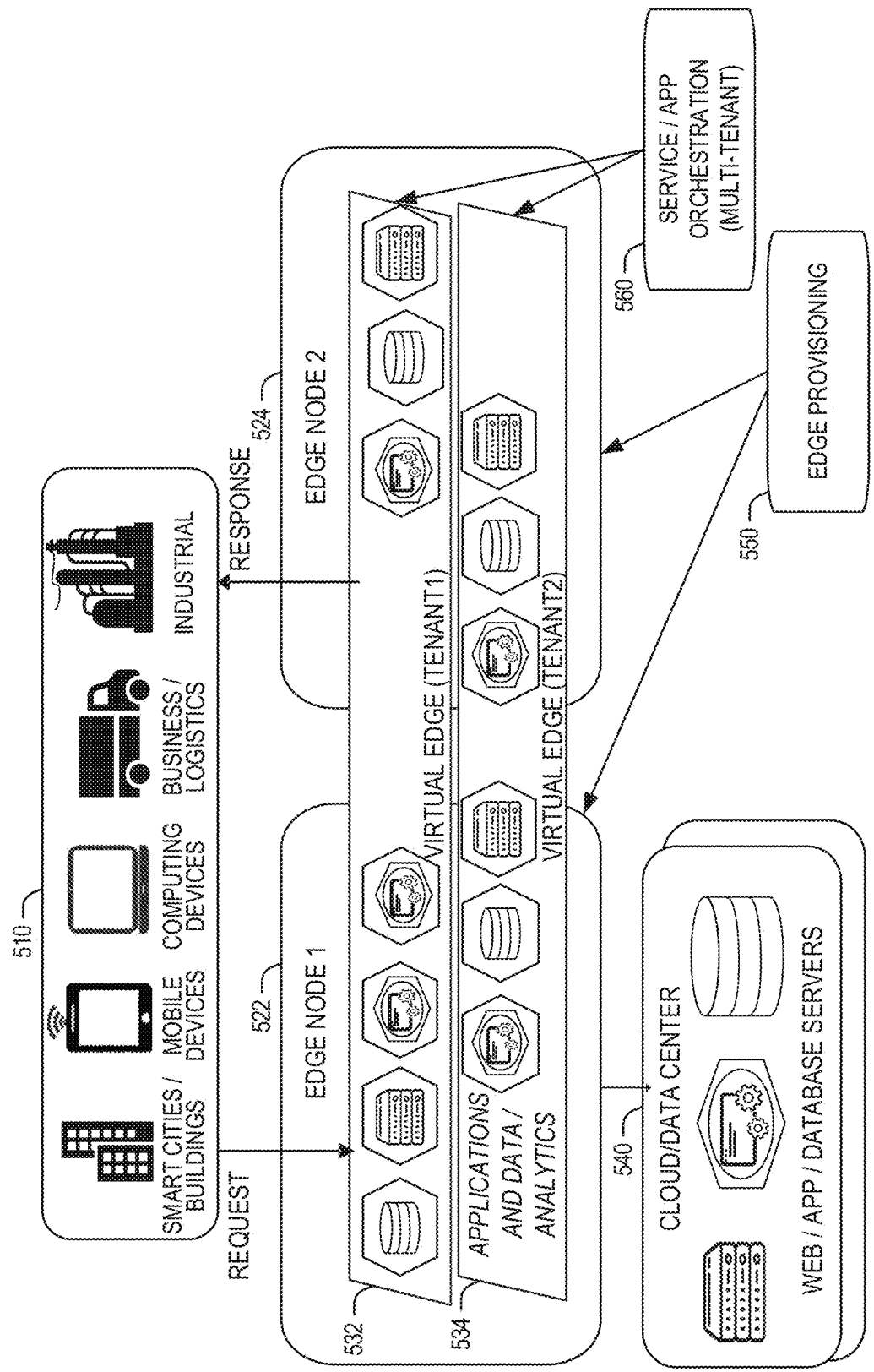
FIGS. 5 and 6 illustrate deployment and orchestration for virtual edge configurations across an edge computing system operated among multiple edge nodes and multiple tenants.
Figure 6:
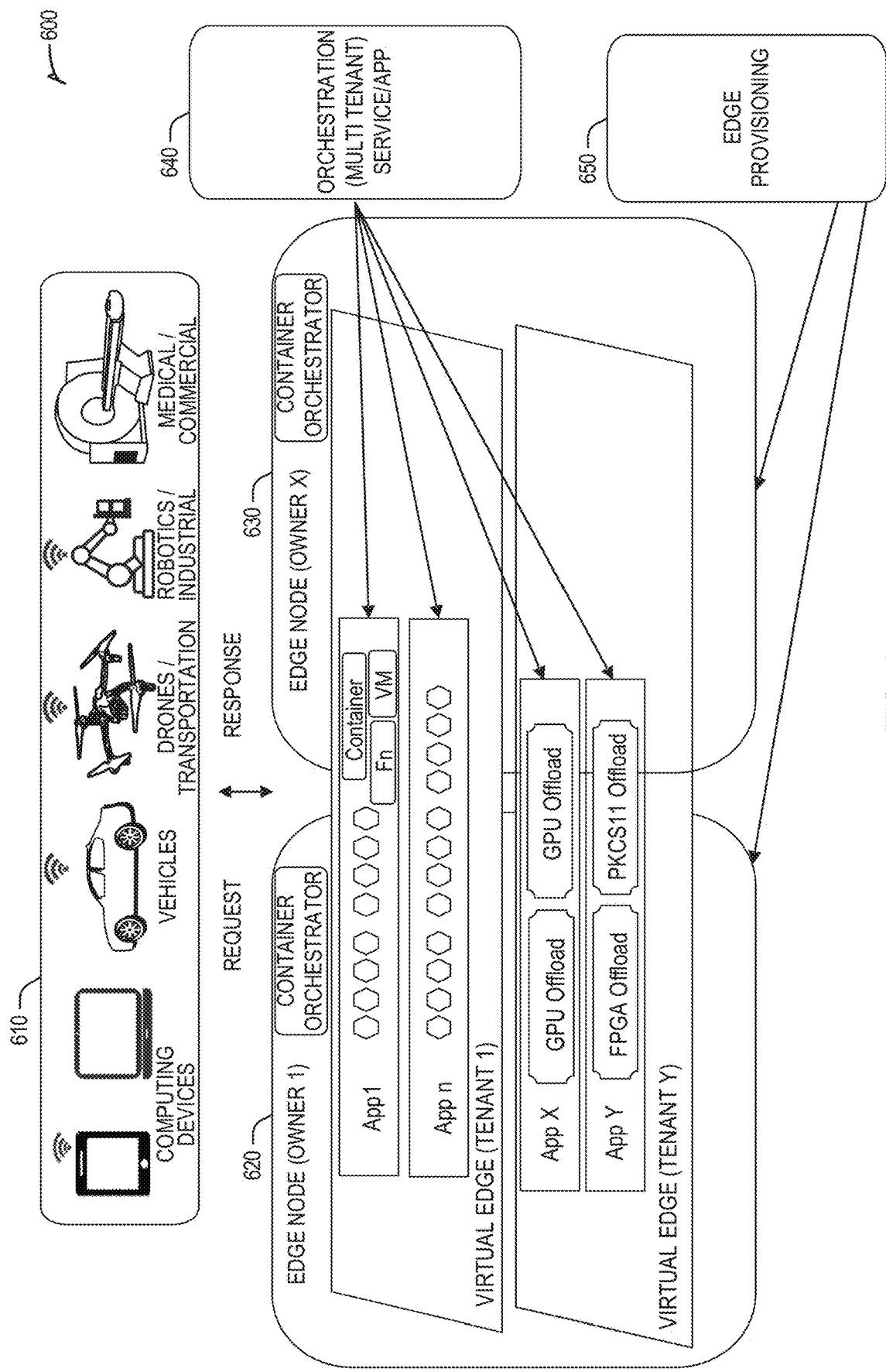

As an extension of either CSP or TSP configurations, FIGS. 5 and 6 illustrate deployment and orchestration for virtual edge configurations across an edge computing system operated among multiple edge nodes and multiple tenants.

Specifically, FIG. 5 depicts coordination of a first edge node 522 and a second edge node 524 in an edge computing system 500, to fulfill requests and responses for various client endpoints 510 (e.g., smart cities/building systems, mobile devices, computing devices, business/logistics systems, industrial systems, etc.) which access various virtual edge instances. The virtual edge instances provide edge compute capabilities and processing in an edge cloud, with access to a cloud/data center 540 for higher-latency requests for websites, applications, database servers, etc. However, the edge cloud enables coordination of processing among multiple edge nodes for multiple tenants or entities.

In the example of FIG. 5, these virtual edge instances include: a first virtual edge 532, offered to a first tenant (Tenant 1), which offers a first combination of edge storage, computing, and services; and a second virtual edge 534, offering a second combination of edge storage, computing, and services. The virtual edge instances 532, 534 are distributed among the edge nodes 522, 524, and may include scenarios in which a request and response are fulfilled from the same or different edge nodes. The configuration of the edge nodes 522, 524 to operate in a distributed yet coordinated fashion occurs based on edge provisioning functions 550. The functionality of the edge nodes 522, 524 to provide coordinated operation for applications and services, among multiple tenants, occurs based on orchestration functions 560.

It should be understood that some of the devices in 510 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 622, 624 may operate as LSM or security feature enforcement points for local resources allocated to multiple tenants per node. Additionally, tenant runtime and application execution (e.g., in instances 632, 634) may serve as an enforcement point for an LSM or other security feature that creates a virtual edge abstraction of resources spanning potentially multiple physical hosting platforms. Finally, the orchestration entity 660 may operate as an LSM or security feature enforcement point for marshalling resources along tenant boundaries.

Edge nodes may partition resources (memory, CPU, GPU, interrupt controller, I/O controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 510, 522, and 540 may coordinate the establishment of a distributed trusted computing base (DTCB) such that a tenant-specific virtual trusted secure channel linking all elements end to end can be established.

In the example of FIG. 6, an edge computing system 600 is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 6. An orchestrator may use a DICE layering and fan-out construction to create a root of trust context that is tenant specific. Thus, orchestration functions 640, provided by an orchestrator discussed below, may participate as a tenant-specific orchestration provider.

Similar to the scenario of FIG. 6, the edge computing system 600 is configured to fulfill requests and responses for various client endpoints 610 from multiple virtual edge instances (and, from a cloud or remote data center, not shown). The use of these virtual edge instances supports multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

Within the edge cloud, a first edge node 620 (operated by a first owner) and a second edge node 630 (operated by a second owner) respectively operate an orchestrator to coordinate the execution of various applications within the virtual edge instances offered for respective tenants. The edge nodes 630 are coordinated based on edge provisioning functions 650, while the operation of the various applications are coordinated with orchestration functions 640. Furthermore, the orchestrator may identify specific hardware features that are offered to one owner but hidden from a second owner, however offered across the ownership boundaries in order to ensure that services complete according to their SLA(s). Accordingly, the virtual edge, container orchestrator, and service/app orchestrator may provide an LSM or other security enforcement point, for node-specific resources tied to specific tenants.

Figure 7:
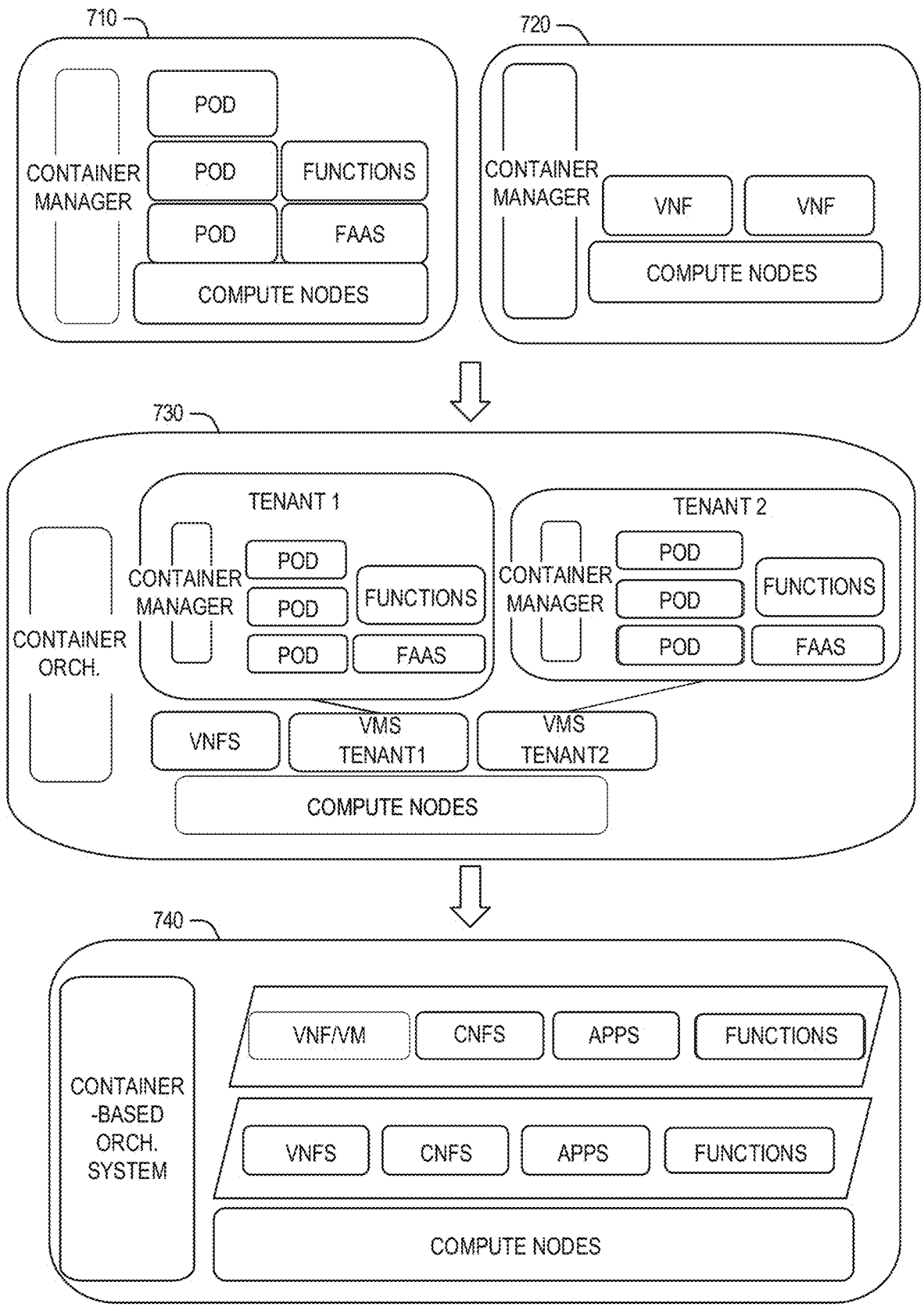
FIG. 7 illustrates various compute arrangements deploying containers in an edge computing system.

FIG. 7 illustrates various compute arrangements deploying containers in an edge computing system. As a simplified example, system arrangements 710, 720 depict settings in which a container manager is adapted to launch containerized pods, functions, and functions-as-a-service instances through execution via compute nodes (in arrangement 710), or to separately execute containerized virtualized network functions through execution via compute nodes (in arrangement 720). This arrangement is adapted for use by multiple tenants in system arrangement 730, where containerized pods, functions, and functions-as-a-service instances are launched within virtual machines specific to respective tenants (aside the execution of virtualized network functions). This arrangement is further adapted for use in system arrangement 740.

The system arrangements depicted in FIGS. 6 and 7 provide an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 7, the container manager, container orchestrator, and individual nodes may provide an LSM or other security enforcement point. However, in either of the configurations of FIG. 6 or 7, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by Edge owners to enforce tenancy. Other isolation environments may include: bare metal (dedicated) equipment, virtual machines, containers, virtual machines on containers, or combinations thereof. Functions, such as those provided in a FaaS environment, discussed further below, may run in any of these isolation environments to enforce tenant boundaries.

Figure 8A:
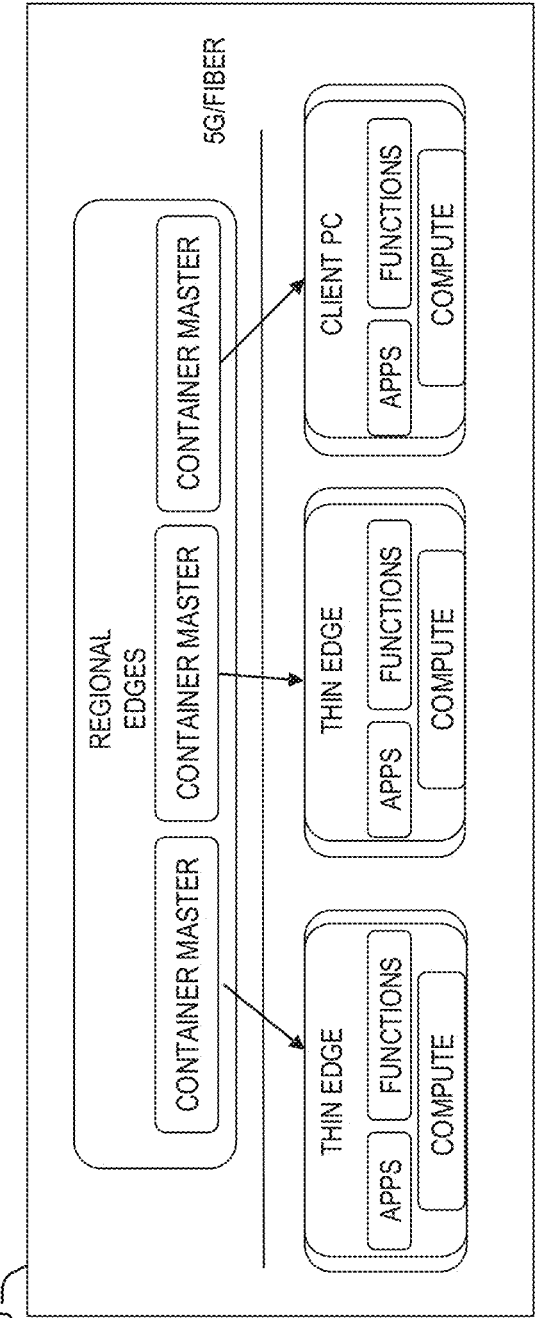
FIGS. 8A and 8B illustrate distributed edge compute deployments, using coordinated compute functions and services in an edge computing system.
Figure 8B:
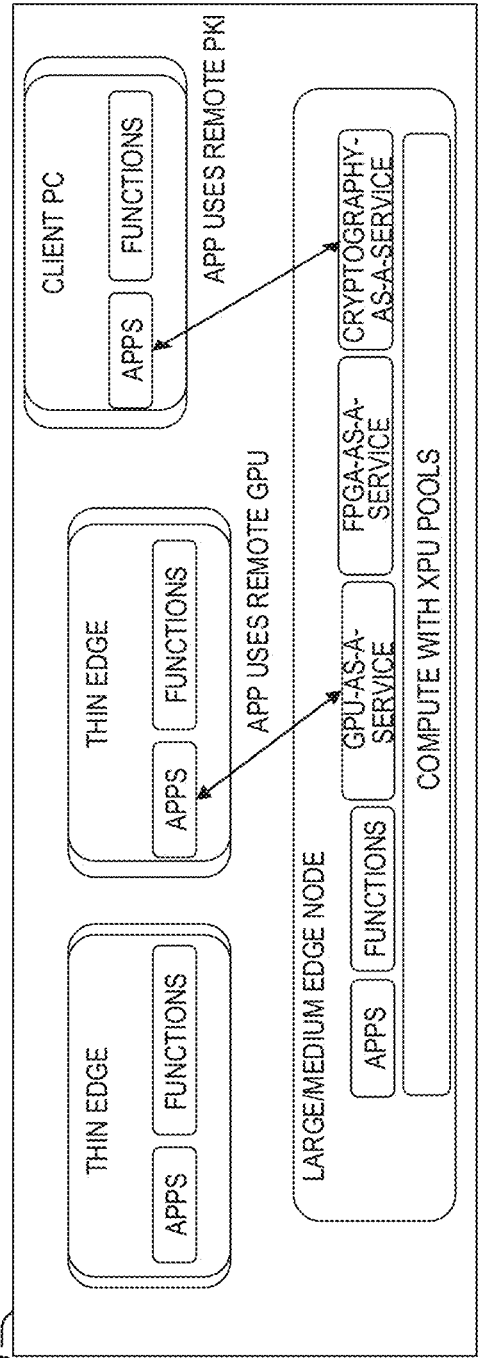

FIGS. 8A and 8B illustrate distributed edge compute deployments, using coordinated compute functions and services in instances of an edge computing system. Within edge computing environment 810, a number of regionally located edges include container managers to coordinate the execution of services, via applications and functions on compute resources on distributed edges (thin edge instances). Within edge computing environment 820, the distributed edges (thin edge instances) are coordinated with other distributed edges having additional processing capabilities (large/medium edge instances). For instance, an application operating at a specific distributed edge instance (thin edge) may invoke GPU processing capabilities further in the edge cloud (offered by the large/medium edge instance, in the form of a GPU-as-a-service); or as another example, a client computer (client PC) may invoke processing capabilities further in the edge cloud (offered by the offered by the large/medium edge instance, in the form of cryptography-as-a-service). Other functions-as-a-service or accelerator-as-a-service may be offered by the edge cloud, coordinated or distributed among the edge nodes, and the like. Furthermore, in an edge computing architecture, each edge node, VM, container or even bare metal node may be self-describing, self-aware and self-managing in order to create a set of offerings that other nodes can use for-as-a-service models.

In further examples, aspects of software-defined or controlled silicon hardware, and other configurable hardware, may integrate with the applications, functions, and services of FIGS. 8A and 8B, and other scenarios discussed herein. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

In further configurations, aspects of orchestration may be implemented in the edge computing system through service aspects of a "Orchestration as a Service (OaaS)" deployment, enabling stakeholder decentralization among many aspects of edge orchestration and multi-tenancy. In an example, an edge computing system tenant discovers OaaS providers as part of an SLA creation process (enabled as part of a bootstrap capability, a configuration wizard, a storefront, etc.). The technical capabilities needed to support the discovery and use of may be baked into respective devices by a manufacturer, and an "onboarding"-type procedure may occur with each OaaS that the tenant selects and utilizes within the edge computing system. Furthermore, during an SLA creation process, the OaaS provider may separate what resources, requirements or features are requested versus available from the pool and create a separate service request for the enablement/activation or subscription to certain features/functions in order to utilize the resource.

Various types of hardware improvements and configurations may be implemented within edge computing devices to support OaaS. For example, hardware capabilities may pre-provision OaaS trust anchors, or provide information to enable a hardware manufacturer to act as a trusted clearing house for brokering OaaS introductions. Other types of software and service improvements and configurations suggested herein may also be implemented within the edge computing system to support features of OaaS.

Workload Distribution and Management

Figure 9:
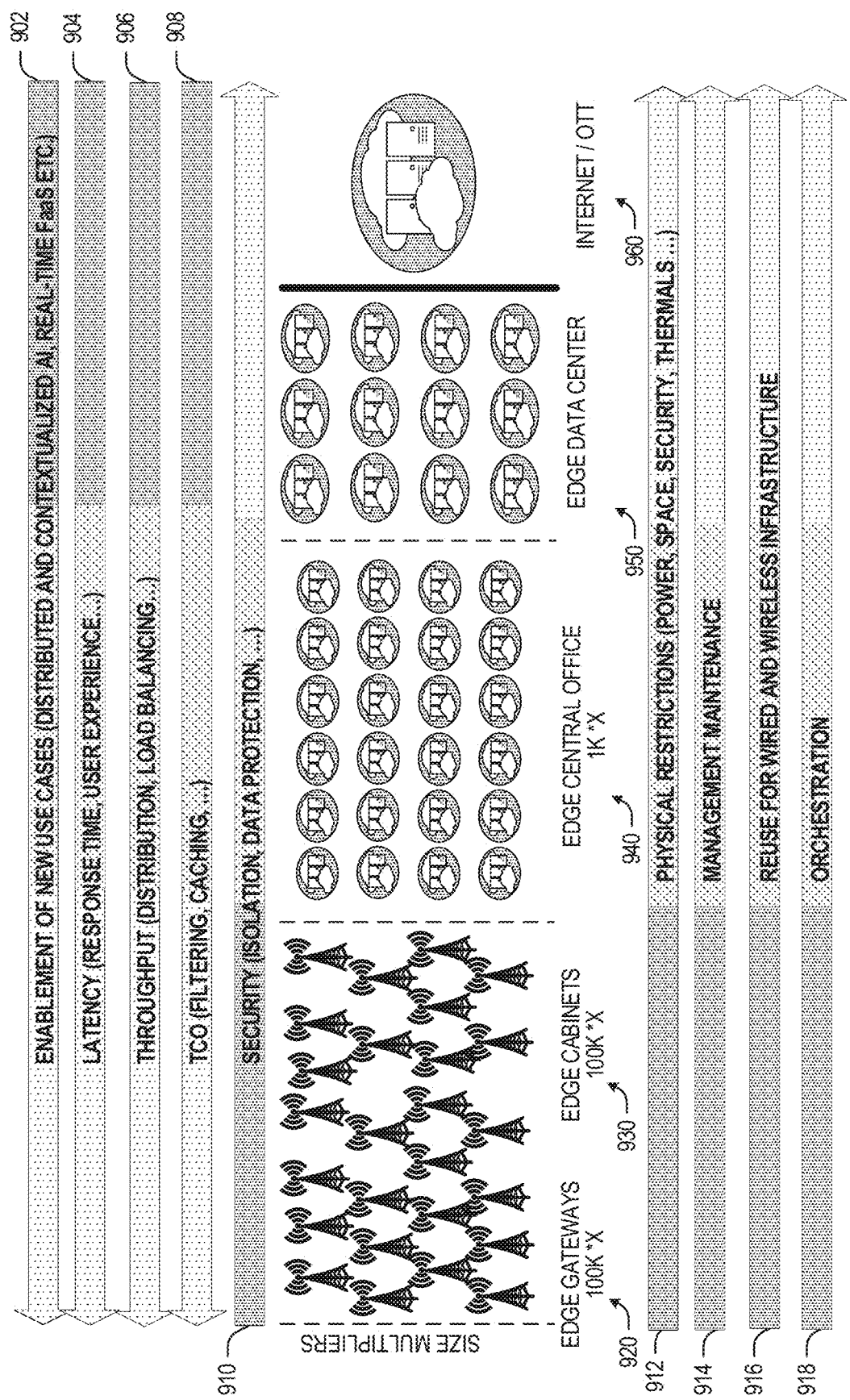
FIG. 9 illustrates a comparison of operational considerations for edge computing among operational network layers.

FIG. 9 illustrates a comparison of operational considerations for edge computing among operational network layers. Specifically, FIG. 9 illustrates the degrees and types of tradeoffs experienced among different compute processing locations. At the different layers of the network (e.g., detailing equipment located among the network access layer 220 and core network layer 230 of FIG. 2), such as among edge gateways 920 (e.g., base stations, access points) and edge cabinets 930 (e.g., street or roadside cabinets, on-premise cabinets) of a near-device edge cloud, a point of aggregation at a central office 940, a point of aggregation at a data center 950, or a cloud data center at an internet or over-the-top service 960, various service properties 902-918 are increased or decreased. When moving closer to the edge endpoints, an increase may be experienced in the enablement of new use cases 92 (e.g., distributed and contextualized AI, real-time FaaS), reduced latency 904 (e.g., reduced response time, faster user experience), increased throughput 906 (e.g., coordinated distribution, load balancing, etc.), reduced total cost of ownership and traffic 908 (e.g., via improved endpoint or edge filtering, caching, etc.). However, as moving closer to the cloud data center, an improvement may be found in security 910 (e.g., via improved isolation, data protection), decreased physical restrictions 912 (e.g., power, space, security, and thermal constraints), reduced management maintenance 914, reuse capabilities for wired and wireless infrastructure 916, and more complex orchestration 918.

Figure 10:
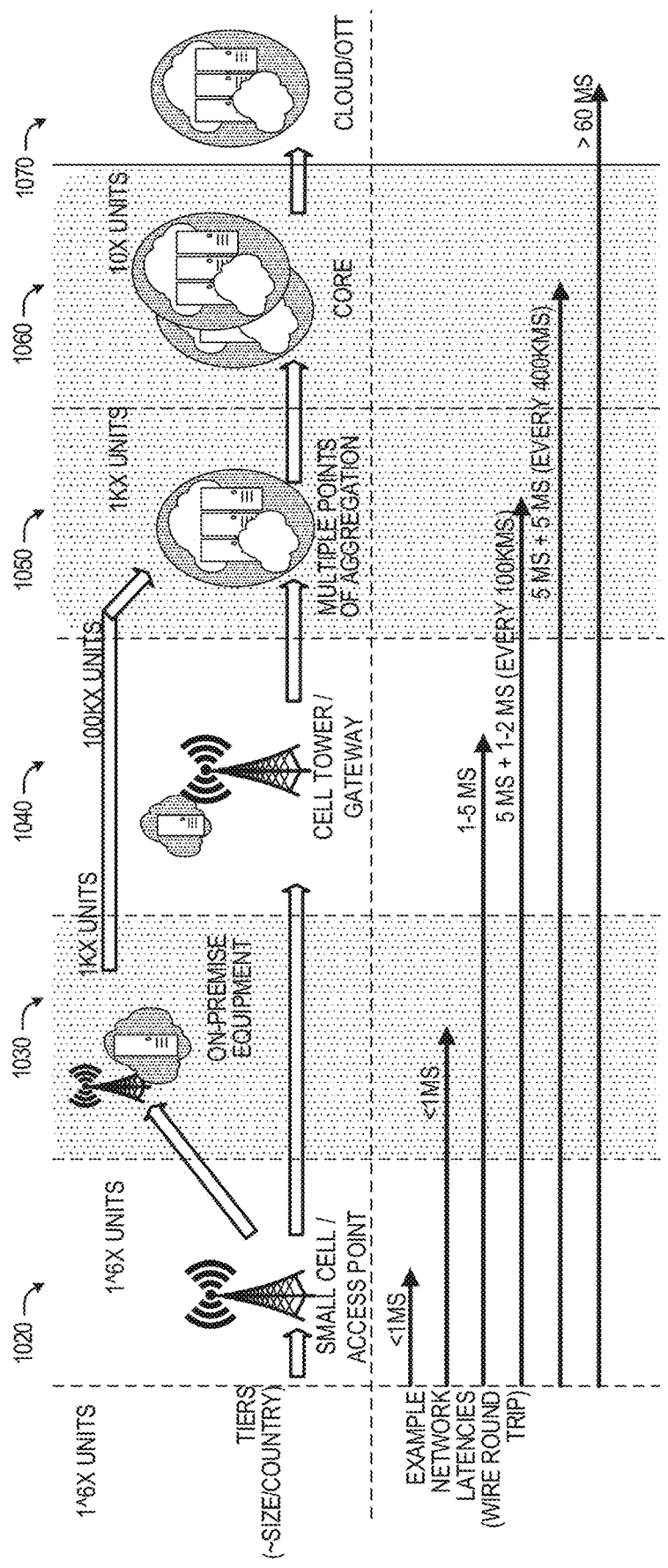
FIG. 10 illustrates deployments and latencies for edge computing among operational network layers.

These tradeoffs are magnified by characteristics of mobility and different types of communication networks. FIG. 10 illustrates operational deployments and latencies for edge computing among operational network layers, in a cellular (mobile) wireless network. Specifically, FIG. 10 illustrates an example of network latency occurring to respective mobile network layers 1020-1070 in an example country deployment, providing an example of round trip timings to a local layer 1020 (e.g., typically less than one ms to a small cell base station or access point), an on-premise layer 1030 (e.g., having on-premise equipment or cloudlets/edgelets, typically also under one ms), a base station layer 1040 (e.g., having a cell tower base station or other wireless network gateway, typically between 1-5 ms), an aggregation layer 1050 (e.g., having multiple aggregation servers or locations, typically between 5 ms plus 1-2 ms added for every 100 kilometers (KMs) of distance), a core network layer 1060 (e.g., having multiple core network servers or locations, typically between 5 ms plus 5 ms added for every 400 KMs of distance, based on currently used telecommunications technologies); and a cloud layer 1070 (e.g., having one or more cloud processing locations, typically exceeding 60 ms). Such latency times are provided for purposes of illustration only and may vary depending on the type of communication technology involved (although limited by the speed of light). The deployment of an edge cloud system (e.g., an implementation of edge cloud 1010) is discussed below with reference to layers 1020-1050.

Endpoint devices being used by the end user or accessible via the nearby local layer 1020 may be considered as the "far edge" devices. Devices in this scenario may provide the lowest latency possible. However, at some point, far edge devices may become compute limited or may not be power efficient as needed to perform a given task. For instance, at some point of network traffic load, AR/VR use cases will experience severe degradation (even to the point of providing a worse performance than executing the workload only at the far edge on the device itself).

On premise computing at the on-premise layer 1030 is a next potential tier of a low-latency network edge architecture. On premise refers to a location (typically within the customer premises) that may be able to host a certain amount of compute (from a small form factor rack to multiple racks). Such on-premise compute platforms may be owned and operated by the enterprise, cloud service provider, or a communications service provider.

Computing at a base station in the base station layer 1040 may aggregate multiple antennas, which in many cases may be hosted as a first potential edge from a Communication Service Provider perspective. Base stations may run virtual radio access network (e.g., vRAN) type of workloads to process 5G radio traffic. The main design challenges to run other services on the base station relate to: (1) limited space; (2) physical exposure that requires more security and better thermal solutions; (3) limited amount of power; (4) operating expense (OPEX) or total cost of ownership (TCO) derived from managing such a highly distributed compute environment. Having outlined the challenges of deploying services on the base station, it is important to emphasize that they are one of the unique points in the infrastructure that can still provide sub millisecond latencies.

Computing at a central office (CO) in the aggregation layer 1050 may serve as an aggregation point of multiple base stations within a local area. For instance, one CO may aggregate traffic from around 30 base stations. This number may vary depending on the country and population density. These central offices may then link to regional points of presence (POPs) (e.g., with wired, including optical, links) before connecting to a regional switch site. The CO may also bring together wireless and wireline services. The latencies to reach a CO satisfy many edge use cases (e.g., power, space, ease of management) which may make them a desirable location to place edge services. Central office or switching sites may also aggregate multiple central office connections.

Figure 11:
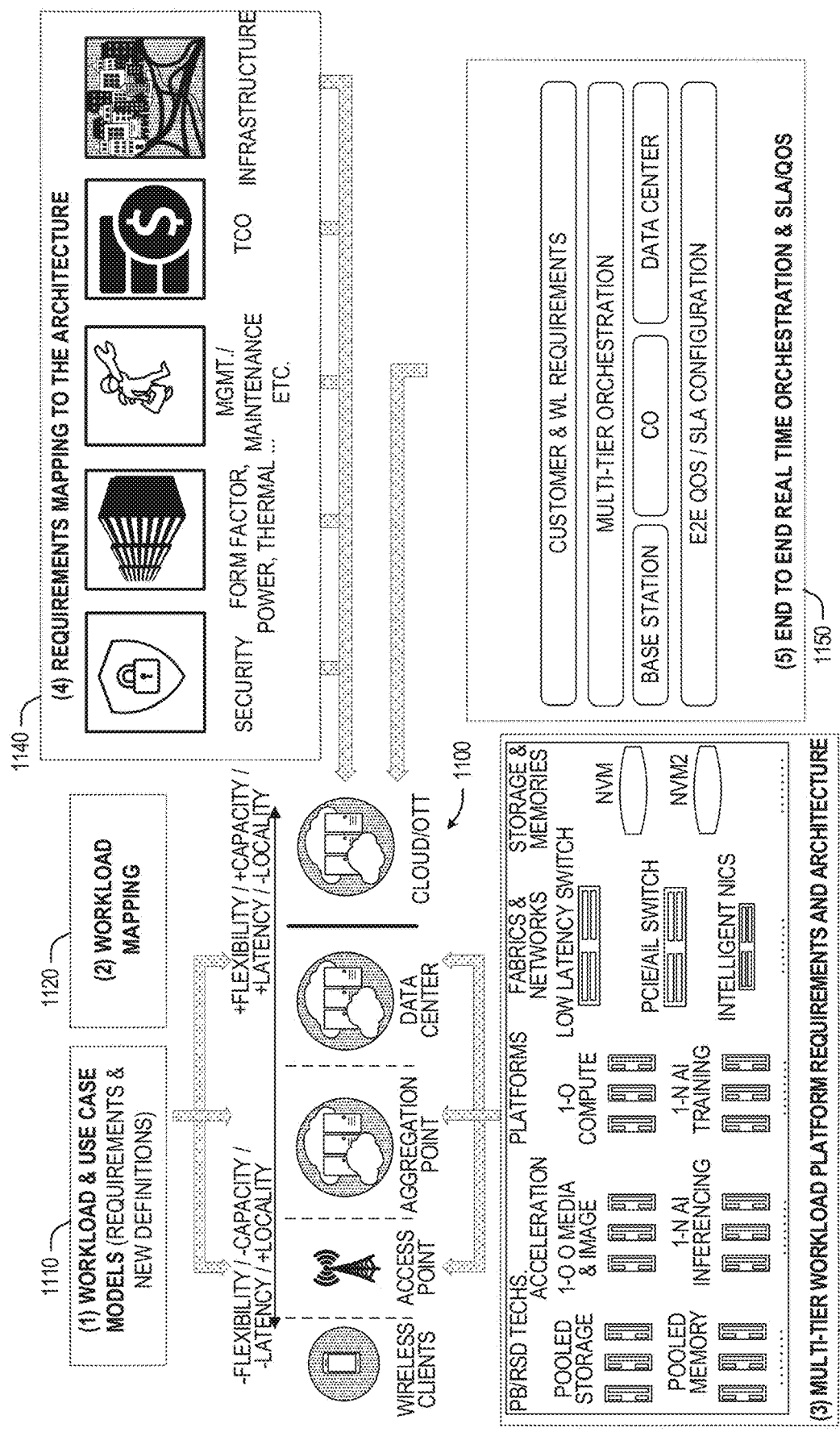
FIG. 11 illustrates workload deployments and mapping to operational layers of an edge computing system.

FIG. 11 illustrates workload deployments and mapping to operational layers (e.g., corresponding to layers 1020-1070) of an edge computing system 1100. Within this arrangement, multiple considerations and capabilities are evaluated for the location and type of workload execution among devices of the edge computing system 100, as various coordination is performed to bring the compute resources to the workload data, and bring the workload data to the compute resources. These considerations may include:

(1) Choosing the right platform architecture, rack design, or other hardware features or configurations, for short-term and long-term usage (in addition to conducting an appropriate mapping of the services and workloads) depending on the restrictions of each of the locations (e.g., power, space, and platform security). Different options may be mapped to different architecture configurations.

(2) Determining what requirements originate from network or service operators will shape the architecture. This may indicate a platform architecture that satisfies operator requirements (e.g., capital expense vs. operating expense, form factors, security, and QoS).

(3) Determining the correct software architecture to manage, monitor and orchestrate the edge computing architecture. Without the right interfaces to orchestrate, complex distributed scenarios cloud architectures will not work. Furthermore, exposing appropriate abstractions and interfaces to the services to access to the hardware resources underneath is at the same level of criticality.

Based on these and other determinations, various workloads and use case models 1110 may be first mapped among locations of the edge computing system 1100 according to workload mapping definitions 1120. Such workload mapping definitions 1120 may identify platform requirements and architecture elements 1130 that can be deployed among the edge computing system 1100. Further, the workload mapping definitions 1120 may be based on requirements mapping 1140 addressing aspects such as security, physical constraints, management, cost, infrastructure restrictions and capabilities, and the like.

Further, the end-to-end considerations of the edge computing system 1100 may include evaluation of real time orchestration, service-level agreement (SLA), and QoS characteristics, as provided in definitions 1150. These definitions 1150 may be used to select the platform requirements and architecture elements 1130, rank or prioritize requirements mapping 1140, and ultimately change the workload mapping 1120. These considerations, recorded in the definitions 1150 or elsewhere, may reflect the following features:

(1) Latency used to provide a first key performance indicator (KPI) with a significant role in edge service location. Since the speed of light is approximately 300,000 km/s and transmission on the wire is ~⅔ of that a required response latency will determine how far from a device may be from the edge. For example, if some services require response latency of less than 4 ms they cannot be further than ~150 kms from the device. Thus, for some of the workloads (e.g., IoT device data processing) the unique edge definition may be only consumed by a base station, whereas others may be consumed by a central office;

(2) Data Privacy, sovereignty and sensitivity, used to determine compliance and verify operability. These considerations may dictate that some of the services can only reside on certain locations of the edge. For example, in the healthcare segment, some hospitals may want to host and share some services on the edge cloud but without having the data crossing certain boundaries of the infrastructure (e.g., equipment on premise, central office etc.);

(3) Reduction in backhaul traffic. Backhaul traffic data savings may be achieved by filtering traffic at the different edges of the network in order to reduce OPEX/TCO (as well as CAPEX as smaller bandwidth may be required on the backhaul network). In this case, filtering may happen at any of the different potential edges of the infrastructure. For example, video surveillance can be processed in the base station to identify what images are to be sent to the cloud or to the central office while the content delivery network may be placed into the central office.

(4) Enabling of new edge processing use cases: For example, a service on the edge that allows biometry authentication. Or, a service which enables payment to be done real-time via voice analysis as long as the reliability requirements are met.

(5) Definition and use of resource level trust, which allows for the authorization for access to capabilities across platforms and resources.

(6) Defining where the actual edge resides for a particular use case or workload is directly related to the KPI or value proposition that a particular location provides to it. For example, defining edge compute for execution of an IoT or AR/VR workload in the core of an operator infrastructure might be impossible to satisfy KPI requirements in terms of latency. Thus, the edge compute for this workload is located closer to the device (in the base station or a more local central office). On the other hand, edge compute for a content distribution network (CDN) (also known as a "content delivery network" or a "content defined network") workload may be located at a base station, central office or any other intermediate point of aggregation (POA or POP) of the operator infrastructure. In this case, to define what is the most suitable edge location, the associated OPEX/TCO may derive what is the best location for placing the CDN workload.

In further examples, advanced forms of workload mapping may be used in an edge computing system to map specific forms of compute activities to specific locations and systems (or types of systems and location capabilities, to more efficiently bring the workload data to available compute resources).

Figure 12:
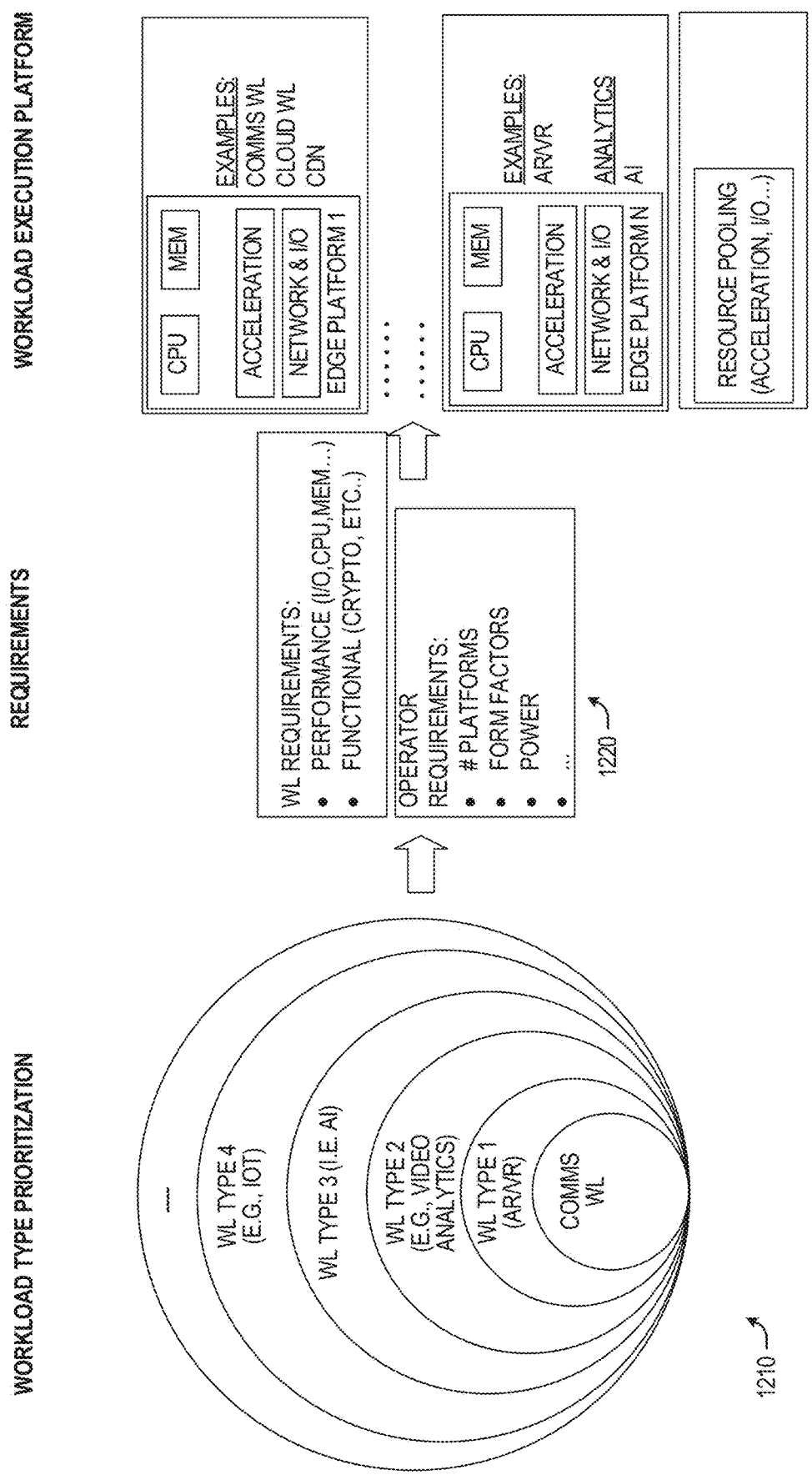
FIG. 12 illustrates workload type mapping to execution platforms in an edge computing system.

FIG. 12 illustrates workload type mapping to execution platforms in an edge computing system. As shown, a set of workload types 1210 progressively advance from a type classification indicating lowest priority and latency requirements of the workload (e.g., for IoT data processing) to a type classification indicating highest priority and latency requirements of the workload (e.g., for network communication functions) with intermediate type classifications (e.g., for AI workloads, video analytics workloads, AR/VR workloads). These workload types 1210 may be orchestrated in a multi-stakeholder, multi-tenant edge system according to the type classification.

The respective type classifications may be associated with sets of requirements 1220, which may specify workload requirements for the particular classification (e.g., performance requirements, functional requirements), as compared with operator requirements or constraints (available number of platforms, form factors, power, etc.). As result of the requirements 1220 for the invoked workload(s), a selection may be made for a particular configuration of a workload execution platform 1230. The configuration for the workload execution platform 1230 may be selected by identifying an execution platform from among multiple edge nodes (e.g., platforms 1 to N); by reconfiguring an execution platform within a configurable rack scale design system; or by reconfiguring an execution platform through pooling or combining resources from one or multiple platforms.

In addition to requirements and constraints provided from the mapping of workload types, other measurements or indicators may be used to select or configure an edge execution platform. For instance, mapping of services on a particular execution platform may consider: KPI performance benefits or user experience benefits (e.g., what latency is required to provide a good user experience for 360-degree video); OPEX/TCO (e.g., derived from placing a service into a particular location versus the expected monetization); SLA and service level objective (SLO) definitions; and the like. These considerations are balanced with operator concerns to manage the potential high cost of management among a distributed ecosystem and disparate hardware locations.

Figure 13:
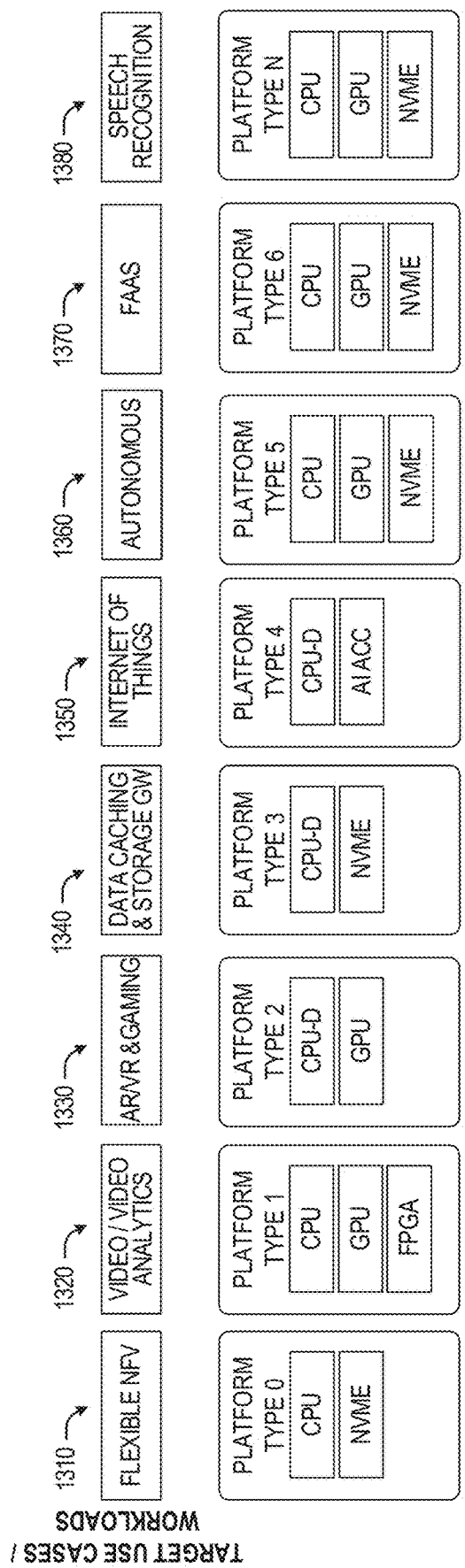
FIG. 13 illustrates further mapping of use cases and workloads to operational deployments of edge computing hardware configurations.

FIG. 13 illustrates further mapping of use cases and workloads to operational deployments of edge computing hardware configurations. Specifically, FIG. 13 shows how different workloads relevant to the edge cloud, each with varying requirements, applications and value propositions, may be deployed by service providers.

The various types of use cases and workloads may be mapped to different platform types, based on the selection or reconfiguration of hardware configurations. For example a flexible NFV workload 1310 may be mapped to a first platform type providing CPU and storage resources; a video processing or video analytics workload 1320 may be mapped to a second platform type providing low-power CPU and specialized GPU and FPGA processing; AR/VR and gaming workloads 1330 may be mapped to a third platform type providing CPU and storage resources; data caching and storage gateway workloads 1340 may be mapped to a fourth platform type providing low-power CPU and storage resources; internet of things processing 1350 may be mapped to a fifth platform type providing low-power CPU and AI acceleration resources; autonomous vehicle workloads 1360 and function-as-a-service workloads 1370 may be mapped to sixth and seventh platform types providing CPU, storage, and specialized GPU processing resources; speech recognition workloads 1380 may be mapped to an Nth platform type having CPU and storage resources, and specialized GPU processing; etc.

Different locations therefore may be usable across the edge cloud 110 to perform services management, as both compute resources are mapped to the workload data, and workload data instances are mapped to the compute resources. In a highly distributed architecture, the features are based on mapping services on the base station. In this case, the platform physical requirements in terms of power and space will mostly limit the amount of hardware that can be placed in this particular edge node. Furthermore, in order to get more service density, acceleration schemes such as hardware inference acceleration may be utilized. In a central office architecture, the architecture is less distributed, but less power and space constrained according to the capabilities and servicing location of the central office. In this case, with fewer space and power constraints, the architectural solution can be more homogenous at the cost of sacrificing some degree of performance or service density.

It should be understood that initial workload mapping may not be effective for runtime activities during the lifecycle of the workload or in the construct of a workflow. Additional services that should be enabled are the workload assessment as a service, which can provide the assessment and reallocation of a workload based on over time characterization of the workload. Based on this, as suggested by the examples below, a workload may be migrated to another location or another hardware or system configuration in order to support the workload needs.

In further examples, various types of distribution, upgrade, and change architectures may be implemented to support software (and firmware and hardware feature) updates to implement workloads and edge computing services generally. Normally, a vendor of a computing platform is responsible for producing feature changes or security patches that apply to deployed platforms. A vendor typically does not enable other supply chain entities to develop firmware updates and/or allow another entity to apply them. This scenario may also apply in edge computing environments, although a distributed computing environment may enable new software distribution and upgrade dynamics. When a workload is dissected and distributed across a 'slice' or 'flavor' of resources spanning multiple platforms and therefore multiple administrators and vendors, considerations may be made on whether the user and orchestrator have enough control over which versions of what software/firmware.

In an example, a workload may be validated or simulated on a particular configuration and deployment 'flavor' where the simulation outcome may exhaustively depend on the firmware, software and other configuration parameters. In some cases, the security vulnerabilities in hardware, firmware, and software also predict how the workload execution behaves. However, if the environment used to validate and/or simulate the workload execution differs from the actual environment that executes it, then that differential represents added risk.

An edge computing ecosystem may be optimized for minimizing risk differential as a way to manage software, firmware, and hardware feature updates. A three phased approach to workload deployment can be utilized: (1) Setup a workload validation environment that identifies the execution environment dependencies. This considers which software models are required to process the workload application. This dependency graph is identified as part of a validation environment setup. Additionally, excess functionality presents an increased attack surface that adds runtime execution risk. These non-dependencies can be removed from the validation environment. (2) The simulation creates the actual environment needed to process the workload. It could involve use of simulated hardware, virtualization or simulated performance scenarios. The workload executes with an expectation of interacting with other workloads, orchestration, users, collaborations etc. The simulation ensures the operational corner cases are exposed. The simulation may also specify which versions of hardware, software, and firmware are used. These may be actual hardware, software, and firmware resources to better understand expected actual behavior. (3) The simulation environment is reproduced in a real-world deployment. The version of hardware, software, and firmware are adjusted appropriately. Possibly, this implies moving to a backward revision or passing over backward revisions to find and allocate resources according to the simulation defined environment. This may also involve removal of hardware, software, and firmware that isn't used by the workload.

Hardware Components

Figure 14A:
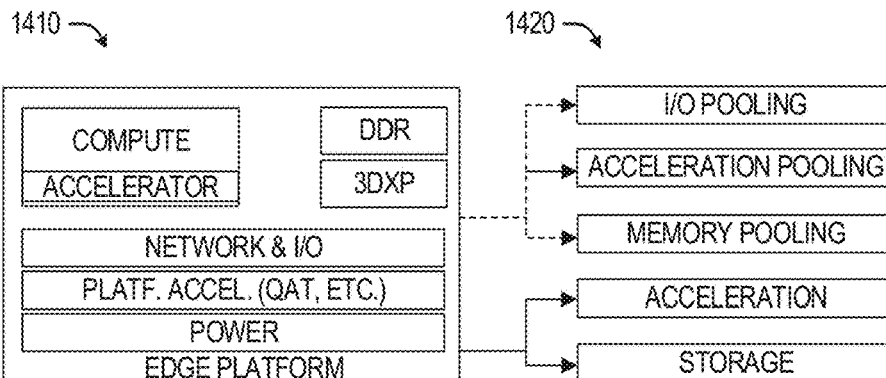
FIGS. 14A to 14C illustrates further examples of edge computing hardware configurations, based on operational objectives.

FIG. 14A illustrates a first edge computing hardware configuration, which maps various architectural aspects of an edge platform 1410 (e.g., compute hardware, network features, power management features, etc.) to specific edge platform capabilities 1420 (e.g., I/O pooling, acceleration pooling, memory pooling, acceleration technologies, storage capabilities). To offer the edge cloud configuration as an overall solution for services, then the workloads or basic hardware components for services and service requirements/constraints (e.g., network and I/O, platform acceleration, power) are considered in light of available architectural aspects (e.g., pooling, storage, etc.).

Within the edge platform capabilities 1420, specific acceleration types may be configured or identified in order to ensure service density is satisfied across the edge cloud. Specifically, four primary acceleration types may be deployed in an edge cloud configuration: (1) General Acceleration (e.g., FPGAs) to implement basic blocks such as a Fast Fourier transform (FFT), k-nearest neighbors algorithm (KNN) and machine learning workloads; (2) Image, Video and transcoding accelerators; (3) Inferencing accelerators; (4) Crypto and compression related workloads (implemented such as in Intel® QuickAssist™ technology). Thus, the particular design or configuration of the edge platform capabilities 1420 can consider which is the right type of acceleration and platform product models that needs to be selected in order to accommodate the service and throughput density as well as available power.

Figure 14B:
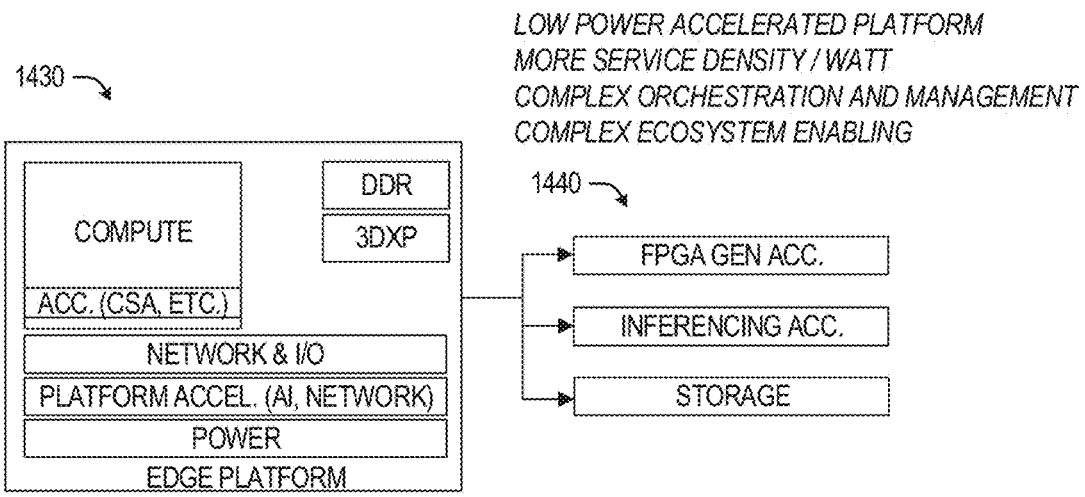

FIG. 14B illustrates a second edge computing hardware configuration, offering a second edge platform 1430 with a second set of edge platform capabilities 1440, and deployable for a low power but more service-dense solution. This approach is targeted to define a lower power solution which uses acceleration schemes in order to achieve better service density or service throughput per watt. This main design trade-off leads to a platform that uses sacrifices general compute in favor specialized hardware (e.g., FPGAs, inferencing accelerators) that can perform the same work at better performance-per-watt ratio. In this example, a "service dense" solution enables more service actions per platform and per watt or being able to drive more throughput at a service level per watt.

The platform capabilities 1440 may be designed to be favorable in terms of power envelope as well in terms of physical space. As a result, the configuration of FIG. 14B may provide a suitable target for base station deployments. However, the platform capabilities 1440 may have tradeoffs including: (1) requirements in terms of orchestration, maintenance and system management (which can be translated to OPEX/TCO costs); (2) requiring an operator ecosystem to enable all a system stack to work with different accelerators that are exposed. However, these disadvantages may be mitigated with a developed software abstraction layer.

Figure 14C:
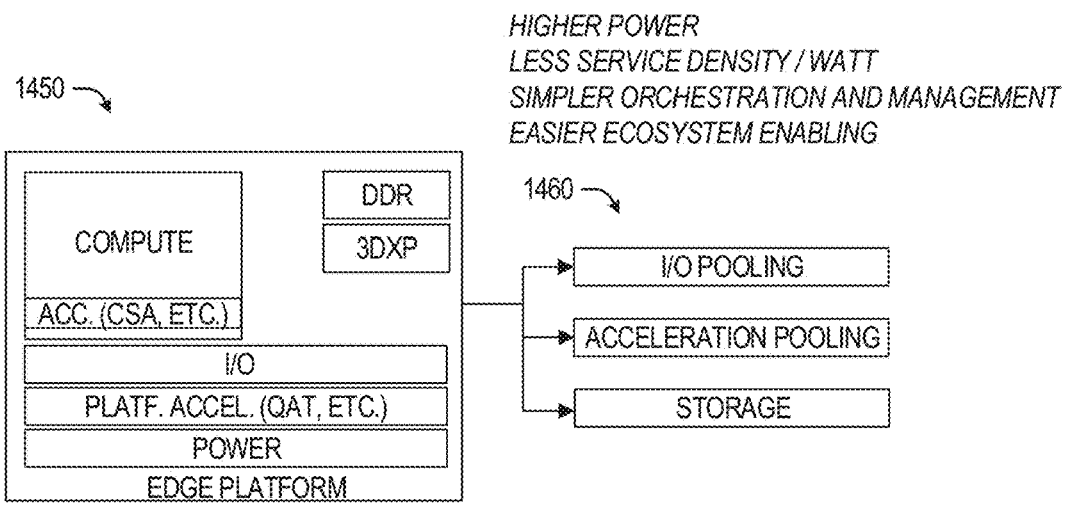

FIG. 14C illustrates a third edge computing hardware configuration, offering a third edge platform 1450 with a second set of edge platform capabilities 1460 offering a high power yet homogenous and generic architecture. FIG. 14C provides an approach that is opposite as compared FIG. 14B, to provide a platform architecture with reduced heterogeneity in the different types of resources that an operator or edge owner has to deal with respect to management, maintenance and orchestration. However, removing accelerators in favor of homogeneity comes at a cost of having less service density and service throughput per watt at platform level. In further examples, the edge platform capabilities 1460 may implement general purpose acceleration (such as in the form of FPGAs).

Other derivative functions of the edge platforms depicted in FIGS. 14A-C may also be adapted. For example, the platform can be sized and designed in order to incorporate new ingredients that make it more service and throughput dense but keeping it more homogenous by for example including accelerators inside the platform or on die in order to make them seamlessly manageable to the operators.

In further examples, any of the compute nodes or devices discussed with reference to the present edge computing systems and environment may be fulfilled based on the components depicted in FIGS. 15A and 15B. Respective edge nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 15A:
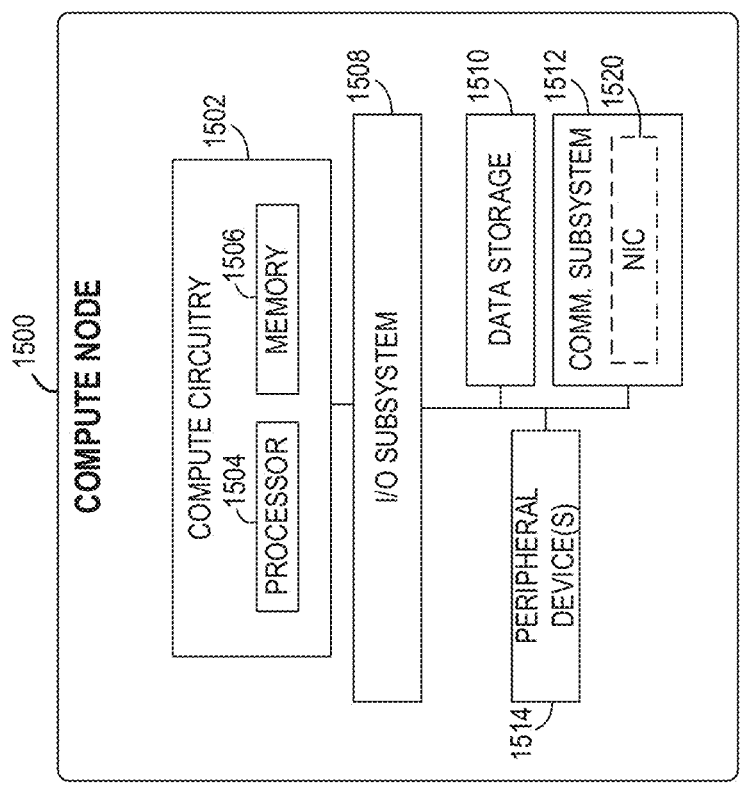
FIG. 15A provides an overview of example components for compute deployed at a compute node in an edge computing system.

In the simplified example depicted in FIG. 15A, an edge node 1500 includes a compute engine (also referred to herein as "compute circuitry") 1502, an input/output (I/O) subsystem 1508, data storage 1510, a communication circuitry subsystem 1512, and, optionally, one or more peripheral devices 1514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1500 may be embodied as any type of engine, device, or collection of devices capable of performing various compute functions. In some examples, the compute node 1500 may be embodied as a single device such as an integrated circuit, an embedded system, a field-programmable gate array (FPGA), a system-on-a-chip (SOC), or other integrated system or device. In the illustrative example, the compute node 1500 includes or is embodied as a processor 1504 and a memory 1506. The processor 1504 may be embodied as any type of processor capable of performing the functions described herein (e.g., executing an application). For example, the processor 1504 may be embodied as a multi-core processor(s), a microcontroller, or other processor or processing/controlling circuit. In some examples, the processor 1504 may be embodied as, include, or be coupled to an FPGA, an application specific integrated circuit (ASIC), reconfigurable hardware or hardware circuitry, or other specialized hardware to facilitate performance of the functions described herein.

The main memory 1506 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random access memory (SRAM). One particular type of DRAM that may be used in a memory module is synchronous dynamic random-access memory (SDRAM).

In one example, the memory device is a block addressable memory device, such as those based on NAND or NOR technologies. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1506 may be integrated into the processor 1504. The main memory 1506 may store various software and data used during operation such as one or more applications, data operated on by the application(s), libraries, and drivers.

The compute circuitry 1502 is communicatively coupled to other components of the compute node 1500 via the I/O subsystem 1508, which may be embodied as circuitry and/or components to facilitate input/output operations with the compute circuitry 1502 (e.g., with the processor 1504 and/or the main memory 1506) and other components of the compute circuitry 1502. For example, the I/O subsystem 1508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1508 may form a portion of a system-on-a-chip (SoC) and be incorporated, along with one or more of the processor 1504, the main memory 1506, and other components of the compute circuitry 1502, into the compute circuitry 1502.

The one or more illustrative data storage devices 1510 may be embodied as any type of devices configured for short-term or long-term storage of data such as, for example, memory devices and circuits, memory cards, hard disk drives, solid-state drives, or other data storage devices. Individual data storage devices 1510 may include a system partition that stores data and firmware code for the data storage device 1510. Individual data storage devices 1510 may also include one or more operating system partitions that store data files and executables for operating systems depending on, for example, the type of compute node 1500.

The communication circuitry 1512 may be embodied as any communication circuit, device, or collection thereof, capable of enabling communications over a network between the compute circuitry 1502 and another compute device (e.g., an edge gateway node 312 of the edge computing system 300). The communication circuitry 1512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1512 includes a network interface controller (NIC) 1520, which may also be referred to as a host fabric interface (HFI). The NIC 1520 may be embodied as one or more add-in-boards, daughter cards, network interface cards, controller chips, chipsets, or other devices that may be used by the compute node 1500 to connect with another compute device (e.g., an edge gateway node 312). In some examples, the NIC 1520 may be embodied as part of a system-on-a-chip (SoC) that includes one or more processors or included on a multichip package that also contains one or more processors. In some examples, the NIC 1520 may include a local processor (not shown) and/or a local memory (not shown) that are both local to the NIC 1520. In such examples, the local processor of the NIC 1520 may be capable of performing one or more of the functions of the compute circuitry 1502 described herein. Additionally, or alternatively, in such examples, the local memory of the NIC 1520 may be integrated into one or more components of the client compute node at the board level, socket level, chip level, and/or other levels.

Additionally, in some examples, a respective compute node 1500 may include one or more peripheral devices 1514. Such peripheral devices 1514 may include any type of peripheral device found in a compute device or server such as audio input devices, a display, other input/output devices, interface devices, and/or other peripheral devices, depending on the particular type of the compute node 1500. In further examples, the compute node 1500 may be embodied by a respective edge node in an edge computing system (e.g., client compute node 302, edge gateway node 312, edge aggregation node 322) or like forms of appliances, computers, subsystems, circuitry, or other components.

Figure 15B:
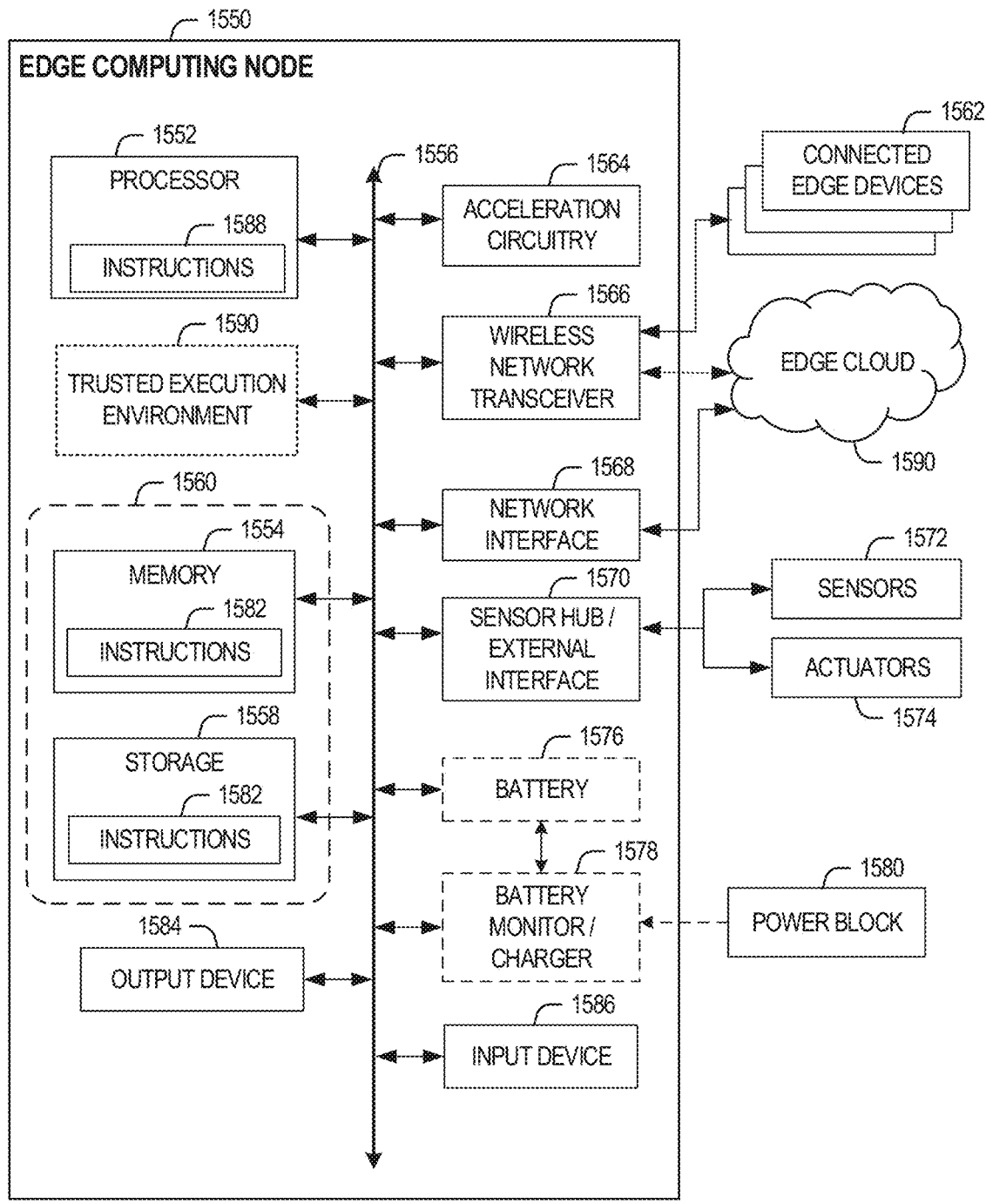
FIG. 15B provides a further overview of example components within a computing device in an edge computing system.

In a more detailed example, FIG. 15B illustrates a block diagram of an example of components that may be present in an edge node 1550 for implementing the techniques (e.g., operations, processes, methods, and methodologies) described herein. This edge node 1550 provides a closer view of the respective components of node 1500 when implemented as or as part of a computing device (e.g., as a mobile device, a base station, server, gateway, etc.). The edge node 1550 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge node 1550, or as components otherwise incorporated within a chassis of a larger system.

The edge computing device 1550 may include processing circuitry in the form of a processor 1552, which may be a microprocessor, a multi-core processor, a multithreaded processor, an ultra-low voltage processor, an embedded processor, or other known processing elements. The processor 1552 may be a part of a system on a chip (SoC) in which the processor 1552 and other components are formed into a single integrated circuit, or a single package, such as the Edison™ or Galileo™ SoC boards from Intel Corporation, Santa Clara, Calif. As an example, the processor 1552 may include an Intel® Architecture Core™ based processor, such as a Quark™ an Atom™, an i3, an i5, an i7, or an MCU-class processor, or another such processor available from Intel®. However, any number other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1552 may communicate with a system memory 1554 over an interconnect 1556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example, the storage 1558 may be implemented via a solid-state disk drive (SSDD). Other devices that may be used for the storage 1558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others. 8922

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in an SoC based system. Other bus systems may be included, such as an I2C interface, an SPI interface, point to point interfaces, and a power bus, among others.

The interconnect 1556 may couple the processor 1552 to a transceiver 1566, for communications with the connected edge devices 1562. The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the edge node 1550 may communicate with close devices, e.g., within about 10 meters, using a local transceiver based on BLE, or another low power radio, to save power. More distant connected edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in the edge cloud 1590 via local or wide area network protocols. The wireless network transceiver 1566 may be an LPWA transceiver that follows the IEEE 802.15.4, or IEEE 802.15.4g standards, among others. The edge node 1550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1568 may be included to provide a wired communication to nodes of the edge cloud 1590 or to other devices, such as the connected edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, transmitting, etc.) may be embodied by such communications circuitry.

The edge node 1550 may include or be coupled to acceleration circuitry 1564, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like.

The interconnect 1556 may couple the processor 1552 to a sensor hub or external interface 1570 that is used to connect additional devices or subsystems. The devices may include sensors 1572, such as accelerometers, level sensors, flow sensors, optical light sensors, camera sensors, temperature sensors, global navigation system (e.g., GPS) sensors, pressure sensors, barometric pressure sensors, and the like. The hub or interface 1570 further may be used to connect the edge node 1550 to actuators 1574, such as power switches, valve actuators, an audible sound generator, a visual warning device, and the like.

In some optional examples, various input/output (I/O) devices may be present within or connected to, the edge node 1550. For example, a display or other output device 1584 may be included to show information, such as sensor readings or actuator position. An input device 1586, such as a touch screen or keypad may be included to accept input. An output device 1584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge node 1550. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1576 may power the edge node 1550, although, in examples in which the edge node 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the edge node 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1578 may communicate the information on the battery 1576 to the processor 1552 over the interconnect 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the edge node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the edge node 1550. A wireless battery charging circuit, such as an LTC4020 chip from Linear Technologies of Milpitas, Calif., among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1582 provided via the memory 1554, the storage 1558, or the processor 1552 may be embodied as a non-transitory, machine-readable medium 1560 including code to direct the processor 1552 to perform electronic operations in the edge node 1550. The processor 1552 may access the non-transitory, machine-readable medium 1560 over the interconnect 1556. For instance, the non-transitory, machine-readable medium 1560 may be embodied by devices described for the storage 1558 or may include specific storage units such as optical disks, flash drives, or any number of other hardware devices. The non-transitory, machine-readable medium 1560 may include instructions to direct the processor 1552 to perform a specific sequence or flow of actions, for example, as described with respect to the flowchart(s) and block diagram(s) of operations and functionality depicted above. As used herein, the terms "machine-readable medium" and "computer-readable storage medium" are interchangeable.

In further examples, a machine-readable medium or computer-readable storage medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 15C:
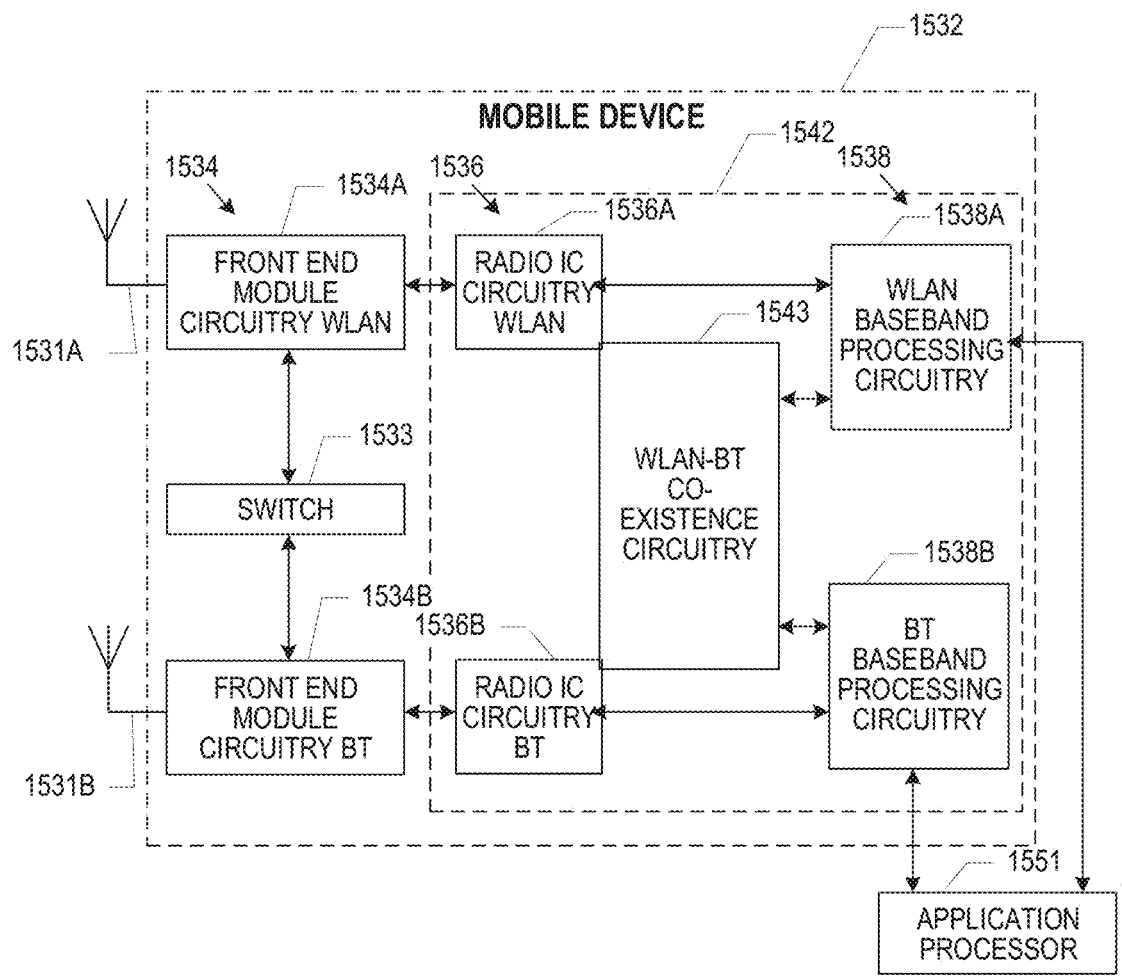
FIG. 15C provides a further overview of example components within a mobile computing device in an edge computing system.

FIG. 15C is a block diagram of communication components within an example mobile device 1532. This mobile device 1532 provides a closer view of the communication processing components of node 1500 or device 1550 when implemented as a user equipment or a component of a user equipment. The mobile device 1532 may include radio front-end module (FEM) circuitry 1534, radio IC circuitry 1536 and baseband processing circuitry 1538. The mobile device 1532 as shown includes both Wireless Local Area Network (WLAN) functionality and Bluetooth (BT) functionality although aspects of the device are not so limited, and other radio technologies discussed herein may be implemented by similar circuitry. FEM circuitry 1534 may include, for example, a WLAN or Wi-Fi FEM circuitry 1534A and a Bluetooth (BT) FEM circuitry 1534B. The WLAN FEM circuitry 1534A may include a receive signal path comprising circuitry configured to operate on WLAN RF signals received from one or more antennas 1531A, to amplify the received signals and to provide the amplified versions of the received signals to the WLAN radio IC circuitry 1536A for further processing. The BT FEM circuitry 1534B may include a receive signal path which may include circuitry configured to operate on BT RF signals received from one or more antennas 1531B, to amplify the received signals and to provide the amplified versions of the received signals to the BT radio IC circuitry 1536B for further processing. FEM circuitry 1534A may also include a transmit signal path which may include circuitry configured to amplify WLAN signals provided by the radio IC circuitry 1536A for wireless transmission by one or more of the antennas 1531A. In addition, FEM circuitry 1534B may also include a transmit signal path which may include circuitry configured to amplify BT signals provided by the radio IC circuitry 1536B for wireless transmission by the one or more antennas 1531B. In the example of FIG. 15C, although FEM 1534A and FEM 1534B are shown as being distinct from one another, aspects of the present disclosure are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1536 as shown may include WLAN radio IC circuitry 1536A and BT radio IC circuitry 1536B. The WLAN radio IC circuitry 1536A may include a receive signal path which may include circuitry to down-convert WLAN RF signals received from the FEM circuitry 1534A and provide baseband signals to WLAN baseband processing circuitry 1538A. BT radio IC circuitry 1536B may in turn include a receive signal path which may include circuitry to down-convert BT RF signals received from the FEM circuitry 1534B and provide baseband signals to BT baseband processing circuitry 1538B. WLAN radio IC circuitry 1536A may also include a transmit signal path which may include circuitry to up-convert WLAN baseband signals provided by the WLAN baseband processing circuitry 1538A and provide WLAN RF output signals to the FEM circuitry 1534A for subsequent wireless transmission by the one or more antennas 1531A. BT radio IC circuitry 1536B may also include a transmit signal path which may include circuitry to up-convert BT baseband signals provided by the BT baseband processing circuitry 1538B and provide BT RF output signals to the FEM circuitry 1534B for subsequent wireless transmission by the one or more antennas 1531B. In the example of FIG. 15C, although radio IC circuitries 1536A and 1536B are shown as being distinct from one another, aspects of the present disclosure are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1538 may include a WLAN baseband processing circuitry 1538A and a BT baseband processing circuitry 1538B. The WLAN baseband processing circuitry 1538A may include a memory, such as, for example, a set of RAM arrays in a Fast Fourier Transform or Inverse Fast Fourier Transform block (not shown) of the WLAN baseband processing circuitry 1538A. Each of the WLAN baseband circuitry 1538A and the BT baseband circuitry 1538B may further include one or more processors and control logic to process the signals received from the corresponding WLAN or BT receive signal path of the radio IC circuitry 1536, and to also generate corresponding WLAN or BT baseband signals for the transmit signal path of the radio IC circuitry 1536. Each of the baseband processing circuitries 1538A and 1538B may further include physical layer (PHY) and medium access control layer (MAC) circuitry, and may further interface with application processor 1551 (or, in other examples, processor circuitry 1550) for generation and processing of the baseband signals and for controlling operations of the radio IC circuitry 1536.

Referring still to FIG. 15C, according to the illustrated aspects, WLAN-BT coexistence circuitry 1543 may include logic providing an interface between the WLAN baseband circuitry 1538A and the BT baseband circuitry 1538B to enable use cases requiring WLAN and BT coexistence. In addition, a switch 1533 may be provided between the WLAN FEM circuitry 1534A and the BT FEM circuitry 1534B to allow switching between the WLAN and BT radios according to application needs. In addition, although the antennas 1531A, 1531B are depicted as being respectively connected to the WLAN FEM circuitry 1534A and the BT FEM circuitry 1534B, aspects of the present disclosure include within their scope the sharing of one or more antennas as between the WLAN and BT FEMs, or the provision of more than one antenna connected to each of FEM 1534A or 1534B.

In some aspects of the present disclosure, the front-end module circuitry 1534, the radio IC circuitry 1536, and baseband processing circuitry 1538 may be provided on a single radio card. In other aspects, the one or more antennas 1531A, 1531B, the FEM circuitry 1534 and the radio IC circuitry 1536 may be provided on a single radio card. In some other aspects of the present disclosure, the radio IC circuitry 1536 and the baseband processing circuitry 1538 may be provided on a single chip or integrated circuit (IC).

Figure 15D:
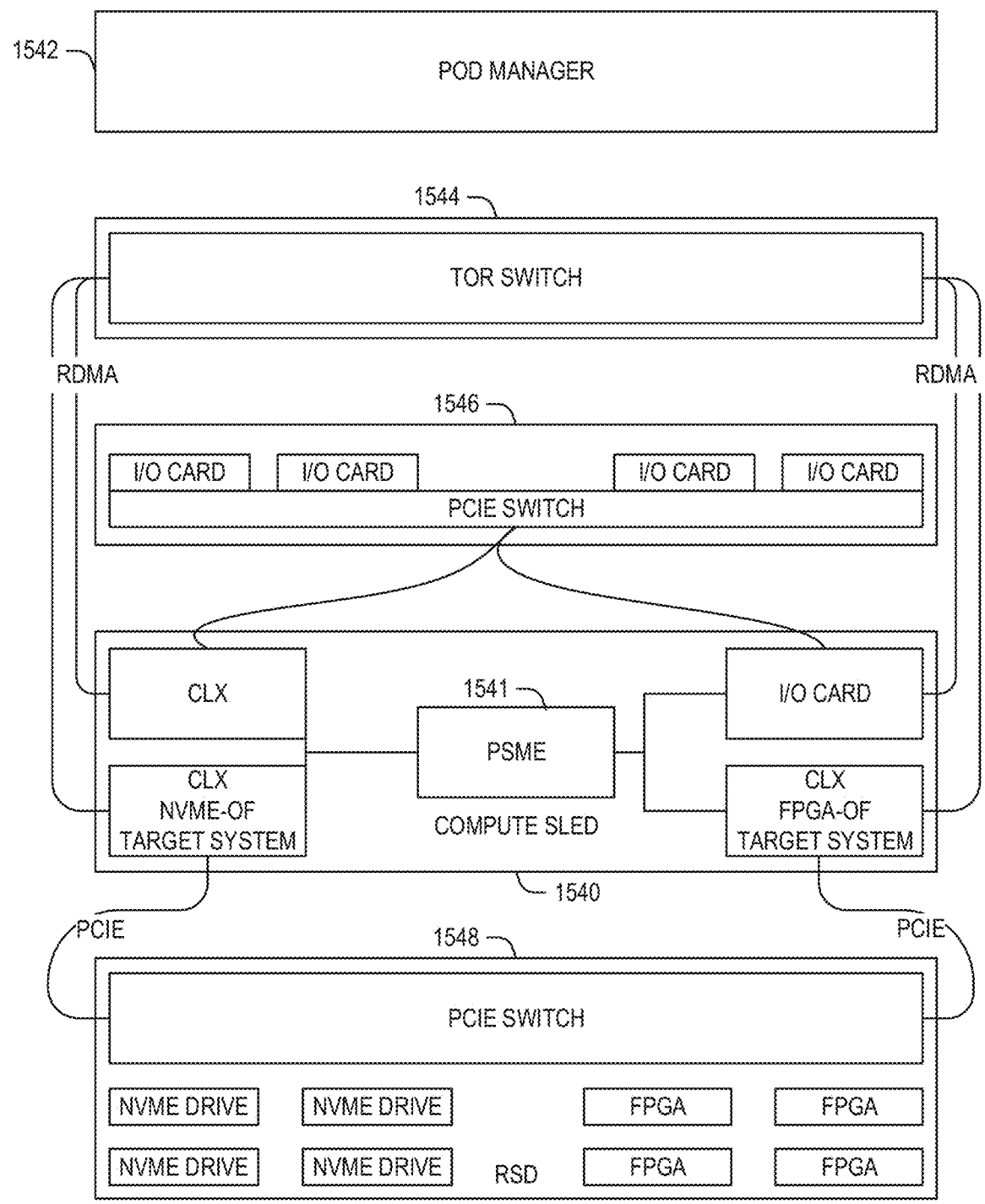
FIG. 15D provides a further overview of example components within a configurable server rack in an edge computing system.

FIG. 15D illustrates Rack Scale Design (RSD) components that may be included a part of a server or other discrete compute node in an edge platform architecture. This arrangement provides a closer view of the configurable processing components of node 1500 or device 1550 when implemented as a server (e.g., in a server rack, blade, etc.). This configurable architecture differs from some others by disaggregating field programmable gate array (FPGA), non-volatile memory express (NVMe), and input-output (I/O) pooling resources. The FPGA and NVMe resources provide elements that may be used for any type of edge services, such as video or speech analytics. I/O pooling may be used to provide flexible network functions. This architecture enables scaling network interfaces according to the expected data rate or network load for a particular virtual network function (VNF). This architecture also enables flexibility to map different network cards to compute nodes depending on the type of network processing happening at a given node.

The illustrated RSD architecture includes a point of delivery (POD) Manager 1542. The POD Manager 1542 is responsible of managing the resources—including compute and disaggregated resources—within a POD (e.g., one or more racks). The POD Manager 1542 exposes interfaces to an orchestrator in order to create, manage, or destroy composed nodes. Managing a composed node includes the feature of scaling up or down the amount of pooled resources 1548 connected to a particular compute sled 1540. The POD Manager 1542 typically runs on a node controller. The POD Manager 1542 is responsible for discovery of resources in the POD, configuring and managing the resources, and composing a logical server. In an example, the POD Manager 1542 is an optional separate component and will not be required in-rack. However, in an example, to be "RSD conformant" a Rack is manageable by a certified POD Manager.

The following are some example attributes of a POD Manager 1542. For example, a rack may include a set of compute sleds 1540 used to execute edge services and other related system software stacks (e.g., such as orchestration or other system services). One type of compute sled 1540 may be a Pooled Resources Sled. This compute sled 1540 may manage a set of disaggregated resources. Here, a compute sled 1540 may include a pooled System Management Engine software (PSME) 1541. The PSME 1541 provides a management interface to manage the modules or blades at a drawer level. In an example, a rack contains one or more logical PSME(s). For example, each drawer may have a PSME or server drawers may share a PSME, or a PSME may run on a top-of-rack (TOR) 1544 switch or on a separate host. In an example, the PSME 1541 supports the RSD APIs.

In an example, the compute sled 1540 may include processors (e.g., CLX) to run an RSD software stack implementing NVM-oF or FPGA-oF acting as a target system and managing a set of disaggregated resources. In an example, the processors are connected using PCIe x16 bifurcation port to a PCIe switch 1546 providing access to the target resources (FPGA or NVME in the RSD 1548).

Various RSD edge-composed node flavors may be used in the compute sled 1540 to run edge services. Services running on those nodes may use client software libraries or drivers to provide transparent access to the disaggregated FPGAS and NVME in the RSD 1548. In a further example, the rack includes one or more PCIE switches connecting the compute sleds 1540 to a set of disaggregated resources (e.g., RSD 1548).

The block diagrams of FIGS. 15A, 15B, 15C, and 15D are intended to depict a high-level view of components of a varying device, subsystem, or arrangement of an edge node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 15A-15C and 15A-15D may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

Use Cases for Edge Computing Systems

Edge computing meets several value propositions and key performance indicators (KPI) for many types of use cases and deployments involving multi-system compute operations (multi-tenant, multi-user, multi-stakeholder, multi-device, etc.). These value propositions enable improved response latency, increased security, lower backhaul traffic, all while enabling new use cases.

Defining where the actual computing edge "resides" for a particular use case or workload is directly related to the KPI or value proposition that a particular location provides to it. For example, defining a compute edge for an IoT or augmented reality/virtual reality (AR/VR) workload in the core of the operator infrastructure does not satisfy its KPI requirements in terms of latency. Thus, the compute edge for this workload is located closer to the device (such as in the base station or central office, bringing the compute resources closer to the workload data). On the other hand, a computing edge for a CDN workload may be hosted at a base station, at a central office, or at any other intermediate point of aggregation (POA or POP) of the operator infrastructure.

Devices being used by the end user (or meshes of devices) may be considered as the far edge devices, but many also offer some compute edge capabilities. Devices in this scenario may provide the lowest latency possible and may serve in types of mesh or connected IoT networks. However, at some point end devices may become compute limited or may not be power efficient as needed to perform a given task. For instance, at some point of network traffic load, the AR/VR user will experience severe degradation (even to the point of providing a worse performance than executing the workload in the far edge on the device itself).

Top priorities for edge computing among various network layers include central office (telecom) functionality, video on demand/content data network serving, Media Analytics, Live Streaming/Transcoding, and AV/VR including online gaming. Central office workloads may include, for example, SDN/NFV for converged footprint and new service models. Video on demand/content data network workloads may include, for example, streaming, surveillance, alarm systems, building access, and the like. Live Streaming/Transcoding may include, for example, enhanced user experience (UX) such as live streaming from social networking applications. AR/VR workloads may include, for example, real-time retail, gaming networks, etc. Media analytics (including both audio and video) may also be extensively deployed within edge deployments. These workloads constitute another important pillar used in many of the aforementioned workloads (such as surveillance, AR etc.).

In addition to these priorities, other use cases may be enabled within the edge cloud. In-memory databases (IMBD) are becoming more relevant in the design on edge computing deployments. Their target utilization is to serve online transaction processing (OLTP, to handle small transaction processing requests—such as small reads or writes) and online analytical processing (OLAP, to handle larger analytic processing requests—such as bigger data set queries and compute tasks). These two types of workloads are mostly mapped to network analytics to improve infrastructure management or other type of analysis or data storage (such as IoT).

Enterprise and government use cases also may be enabled within the edge cloud. In this case, some of the enterprise customers are looking potentially edge deployment as potential ways to improve some of their own processes. Examples of this are thin clients. Thin clients can move across the edge infrastructure as the employees of a given enterprise move across the geography in order to provide a low latency access to the thin clients.

Use cases related to Industry 4.0 initiatives may also be enabled. This may be improved by virtualization in manufacturing—such as with use cases for ultra-reliable low latency communications via 5G. Such communications may allow TSP providers to offer more complete solutions for both industrial workloads and localized 5G networking.

Healthcare is another area where, as technology evolves and security technologies become more mature, hospitals and other healthcare institutions will use the edge cloud to securely store and process healthcare related data. In this setting, the edge cloud will facilitate resource sharing, and assist with reducing CAPEX and OPEX/TCO costs.

Another use case area that may be enabled via the edge cloud includes V2V, V2X, and other type of advanced driver assistance system (ADAS) workloads. As automotive technologies become more mature, the edge cloud will enable communication between devices as well as a means for users inside the edge to access to edge services (V2X).

The following sections lay out many different example workload use cases relevant for edge clouds, along with their requirements, example applications, and value propositions for third-party service providers. These sections are broadly classified into the following areas: Data Caching, Video/Video Analytics, NFV, RAN, Augmented Reality/Virtual Reality (AR/VR), Vehicle Driving and Assistance, Internet of Things (IoT), Industry Applications, Gaming, Accelerated Browsing, and Speech Analytics. However, it will be understood that some edge cloud use cases or architectures may be relevant under multiple or other categories.

Figure 16:
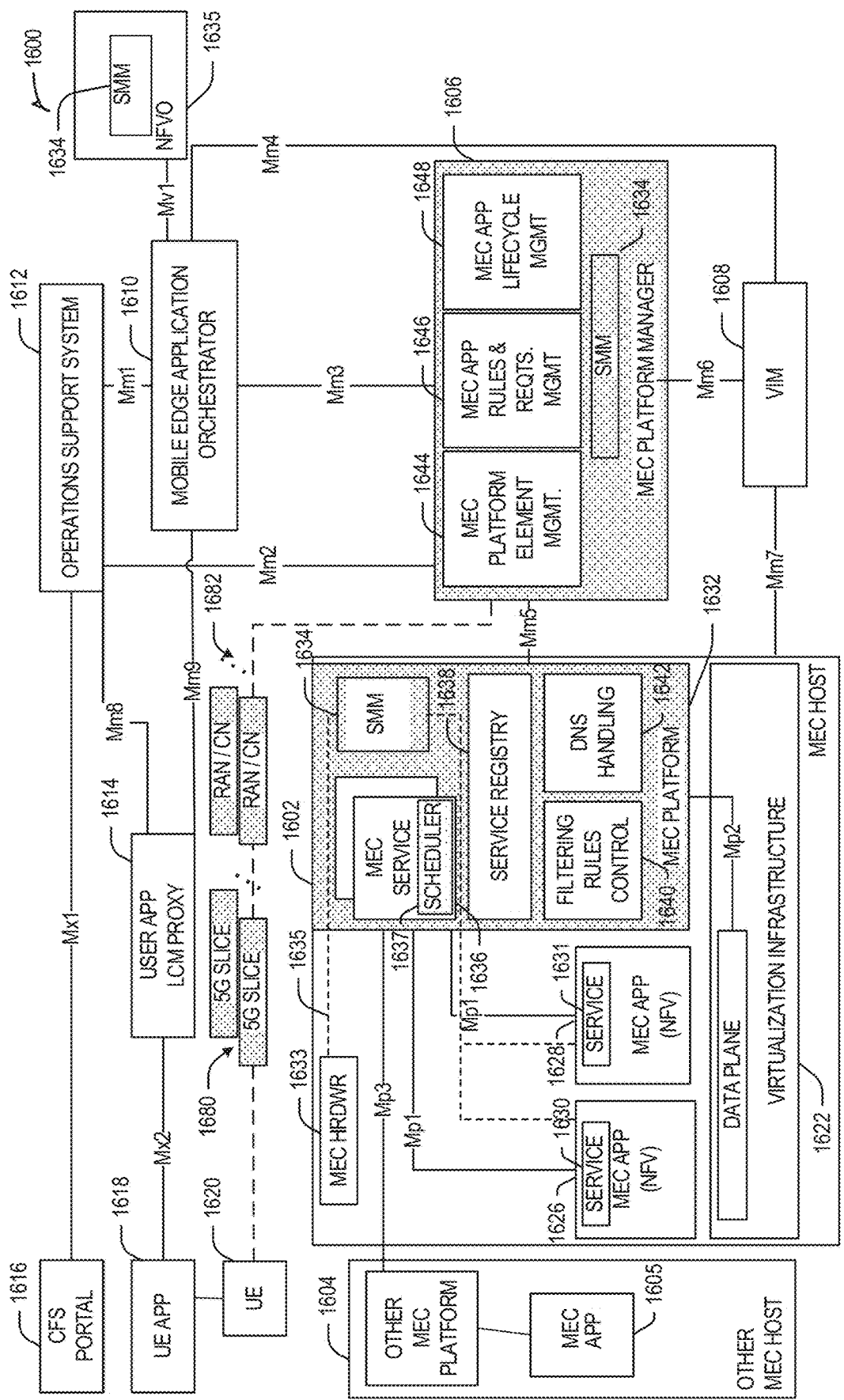
FIG. 16 illustrates a MEC network architecture supporting slice management, resource management, and traceability functions, deployable from an example edge computing system.

FIG. 16 illustrates a MEC network architecture 1600 supporting slice management, resource management, and traceability functions. FIG. 16 specifically illustrates a MEC architecture 1600 with MEC hosts 1602 and 1604 providing functionalities in accordance with the ETSI GS MEC-003 specification, with the shaded blocks used to indicate processing aspects for the MEC architecture configuration described herein in connection with slice management, resource management, and traceability functions. Specifically, enhancements to the MEC platform 1632 and the MEC platform manager 1606 may be used for providing slice management, resource management, and traceability functions within the MEC architecture 1600. This may include provisioning of one or more network slices, dynamic management of resources used by the network slices, as well as resource traceability functions within the MEC architecture.

In a further example, every entity in a MEC architecture could be instrumented to load an LSM or other security policy, and be an enforcement point for security operations. Operational and management entities can be tasked with provisioning of LSMs according to various ways resources are allocated to users, workloads, tenants, domains, uServices, functions, hosting environments.

Referring to FIG. 16, the MEC network architecture 1600 can include MEC hosts 1602 and 1604, a virtualization infrastructure manager (VIM) 1608, an MEC platform manager 1606, an MEC orchestrator 1610, an operations support system 1612, a user app proxy 1614, a UE app 1618 running on UE 1620, and CFS portal 1616. The MEC host 1602 can include a MEC platform 1632 with filtering rules control component 1640, a DNS handling component 1642, service registry 1638, and MEC services 1636. The MEC services 1636 can include at least one scheduler 1637, which can be used to select resources for instantiating MEC apps (or NFVs) 1626 and 1628 upon virtualization infrastructure 1622. The MEC apps 1626 and 1628 can be configured to provide services 1630 and 1631, which can include processing network communications traffic of different types associated with one or more wireless connections (e.g., connections to one or more RAN or telecom-core network entities).

The MEC platform manager 1606 can include a MEC platform element management component 1644, MEC app rules and requirements management component 1646, and a MEC app lifecycle management component 1648. The various entities within the MEC architecture 1600 can perform functionalities as disclosed by the ETSI GS MEC-003 specification.

In some aspects, the UE 1620 can be configured to communicate to one or more of the telecommunication core networks 1682 via one or more of the network slices 1680. In some aspects, the telecommunication core networks 1682 can use slice management functions (e.g., as provided by a slice management module, or SMM, 1634) to dynamically configure slices 1680, including dynamically assign a slice to a UE, reassign a slice to a UE, dynamically allocate or reallocate resources (including MEC resources) used by one or more of the slices 1680, or other slice related management functions. One or more of the functions performed in connection with slice management can be initiated based on user requests (e.g., via a UE) or request by a service provider. In some aspects, the slice management functions in connection with network slices 1680 can be facilitated by E2E multi-slice support functions for MEC-enabled 5G deployments, provided by the SMM 1634 within the MEC host 1602 or the MEC platform manager 1606 (or within another MEC entity).

In some aspects, the SMM 1634 can be within an NFV orchestrator (NFVO) 1635, which can be coupled to the MEC orchestrator 1610, as well as to other MEC entities.

Figure 17:
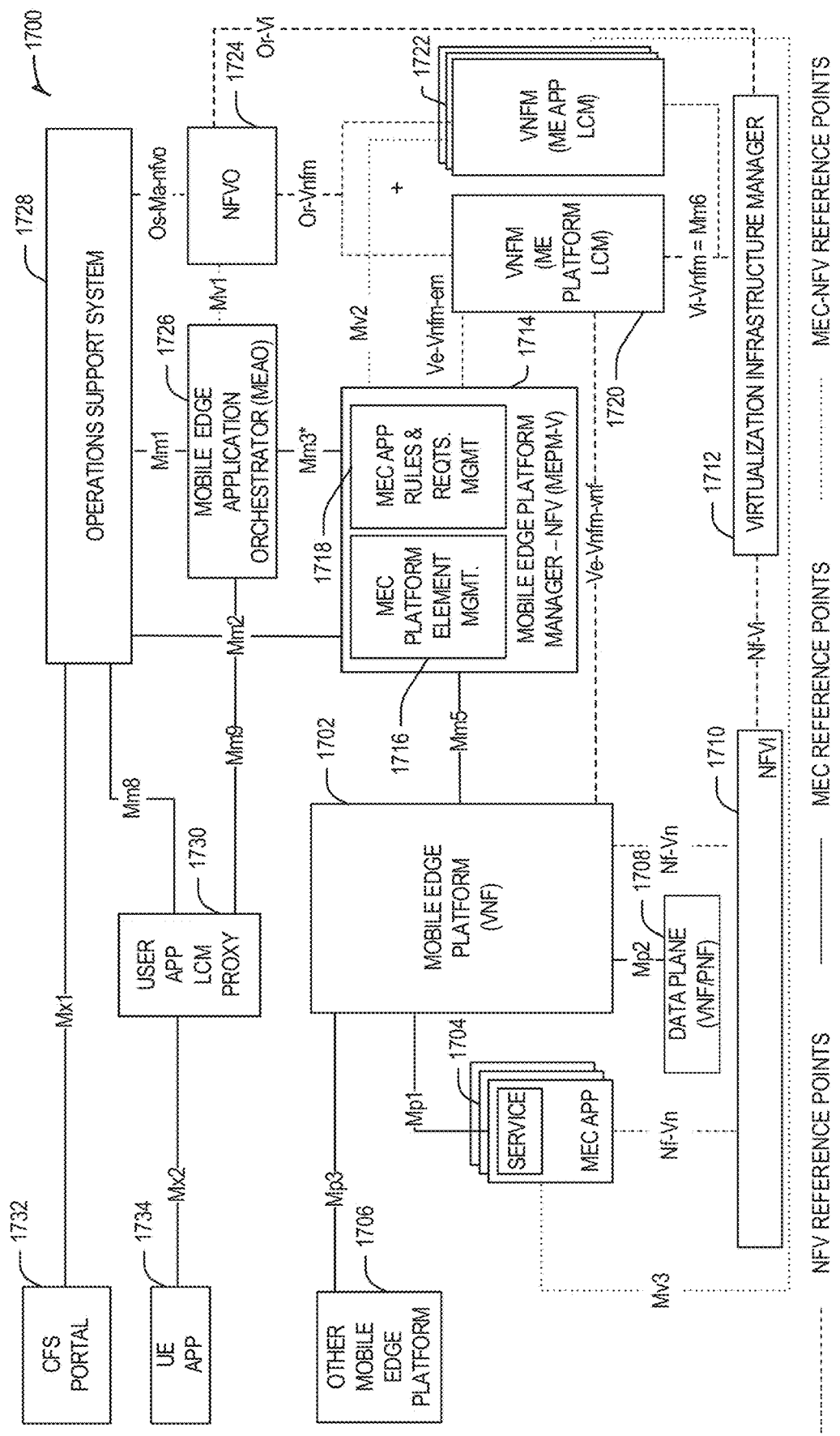
FIG. 17 illustrates a MEC reference architecture in a Network Function Virtualization (NFV) environment, deployable from an example edge computing system.

FIG. 17 illustrates a MEC reference architecture 1700 in a Network Function Virtualization (NFV) environment. The MEC architecture 1700 can be configured to provide functionalities in accordance with the ETSI GR MEC-017 specification.

In some aspects, ETSI MEC can be deployed in an NFV environment as illustrated in FIG. 17.

The MEC reference architecture 1700 includes a mobile edge platform 1702, a mobile edge platform manager 1714, a data plane 1708, a network function virtualization infrastructure (NFVI) 1710, virtual network function managers (VNFMs) 1720 and 1722, and NFVO 1724, a mobile edge application orchestrator (MEAO) 1726, an operations support system 1728, a user app LCM proxy 1730, a UE app 1734, and a CFS portal 1732. The mobile edge platform manager 1714 can include a MEC platform element management 1716 and MEC app rules and requirements management 1718. In some aspects, the mobile edge platform 1702 can be coupled to another mobile edge platform 1706 via an MP3 interface.

In some aspects, the MEC platform 1702 is deployed as a virtualized network function (VNF). The MEC applications 1704 can appear like VNFs towards the ETSI NFV Management and Orchestration (MANO) components. This allows re-use of ETSI NFV MANO functionality. In some aspects, the full set of MANO functionality may be unused and certain additional functionality may be needed. Such a specific ME application is denoted by the name "ME app VNF" as discussed herein. In some aspects, the virtualization infrastructure is deployed as an NFVI and its virtualized resources are managed by the virtualized infrastructure manager (VIM) 1712. For that purpose, one or more of the procedures defined by ETSI NFV Infrastructure specifications, e.g., ETSI GS NFV-INF 003, ETSI GS NFV-INF 004, and ETSI GS NFV-INF 005 can be used.

In some aspects, the ME application (or app) VNFs 1704 will be managed like individual VNFs, allowing that a MEC-in-NFV deployment can delegate certain orchestration and Life Cycle Management (LCM) tasks to the NFVO 1724 and VNFM functional blocks 1720 and 1722, as defined by ETSI NFV MANO.

In some aspects, the Mobile Edge Platform Manager (MEPM) 1714 can be transformed into a "Mobile Edge Platform Manager-NFV" (MEPM-V) that delegates the LCM part to one or more virtual network function manager(s) (VNFM(s)) 1720 and 1722. The Mobile Edge Orchestrator (MEO), as defined in the MEC reference architecture ETSI GS MEC-003, can be transformed into a "Mobile Edge Application Orchestrator" (MEAO) 1726 that uses the NFVO 1724 for resource orchestration, and for orchestration of the set of ME app VNFs as one or more NFV Network Services (NSs).

In some aspects, the Mobile Edge Platform VNF, the MEPM-V 1714, and the VNFM (ME platform LCM) can be deployed as a single package as per the ensemble concept in 3GPP TR 32.842, or that the VNFM is a Generic VNFM as per ETSI GS NFV-IFA 009 and the Mobile Edge Platform VNF and the MEPM-V are provided by a single vendor.

In some aspects, the Mp1 reference point between a ME application and the ME platform can be optional for the ME application, unless it is an application that provides and/or consumes a ME service In some aspects, the Mm3* reference point between MEAO 1726 and the MEPM-V 1714 is based on the Mm3 reference point, as defined by ETSI GS MEC-003. Changes may be configured to this reference point to cater for the split between MEPM-V and VNFM (ME applications LCM).

In some aspects, the following new reference points (Mv1, Mv2, and Mv3) are introduced between elements of the ETSI MEC architecture and the ETSI NFV architecture to support the management of ME app VNFs. The following reference points are related to existing NFV reference points, but only a subset of the functionality may be used for ETSI MEC, and extensions may be necessary: Mv1 (this reference point connects the MEAO and the NFVO; it is related to the Os-Ma-nfvo reference point, as defined in ETSI NFV); Mv2 (this reference point connects the VNF Manager that performs the LCM of the ME app VNFs with the MEPM-V to allow LCM related notifications to be exchanged between these entities; it is related to the Ve-Vnfm-em reference point as defined in ETSI NFV, but may possibly include additions, and might not use all functionality offered by Ve-Vnfm-em); Mv3 (this reference point connects the VNF Manager with the ME app VNF instance, to allow the exchange of messages (e.g., related to ME application LCM or initial deployment-specific configuration); it is related to the Ve-Vnfm-vnf reference point, as defined in ETSI NFV, but may include additions, and might not use all functionality offered by Ve-Vnfm-vnf.

In some aspects, the following reference points are used as they are defined by ETSI NFV: Nf-Vn (this reference point connects each ME app VNF with the NFVI); Nf-Vi (this reference point connects the NFVI and the VIM); Os-Ma-nfvo (this reference point connects the OSS and the NFVO. It is primarily used to manage NSs, e.g., a number of VNFs connected and orchestrated to deliver a service); Or-Vnfm (this reference point connects the NFVO and the VNFM; it is primarily used for the NFVO to invoke VNF LCM operations); Vi-Vnfm (this reference point connects the VIM and the VNFM; it is primarily used by the VNFM to invoke resource management operations to manage the cloud resources that are needed by the VNF; it is assumed in an NFV-based MEC deployment that this reference point corresponds 1:1 to Mm6); and Or-Vi (this reference point connects the NFVO and the VIM; it is primarily used by the NFVO to manage cloud resources capacity).

Figure 18:
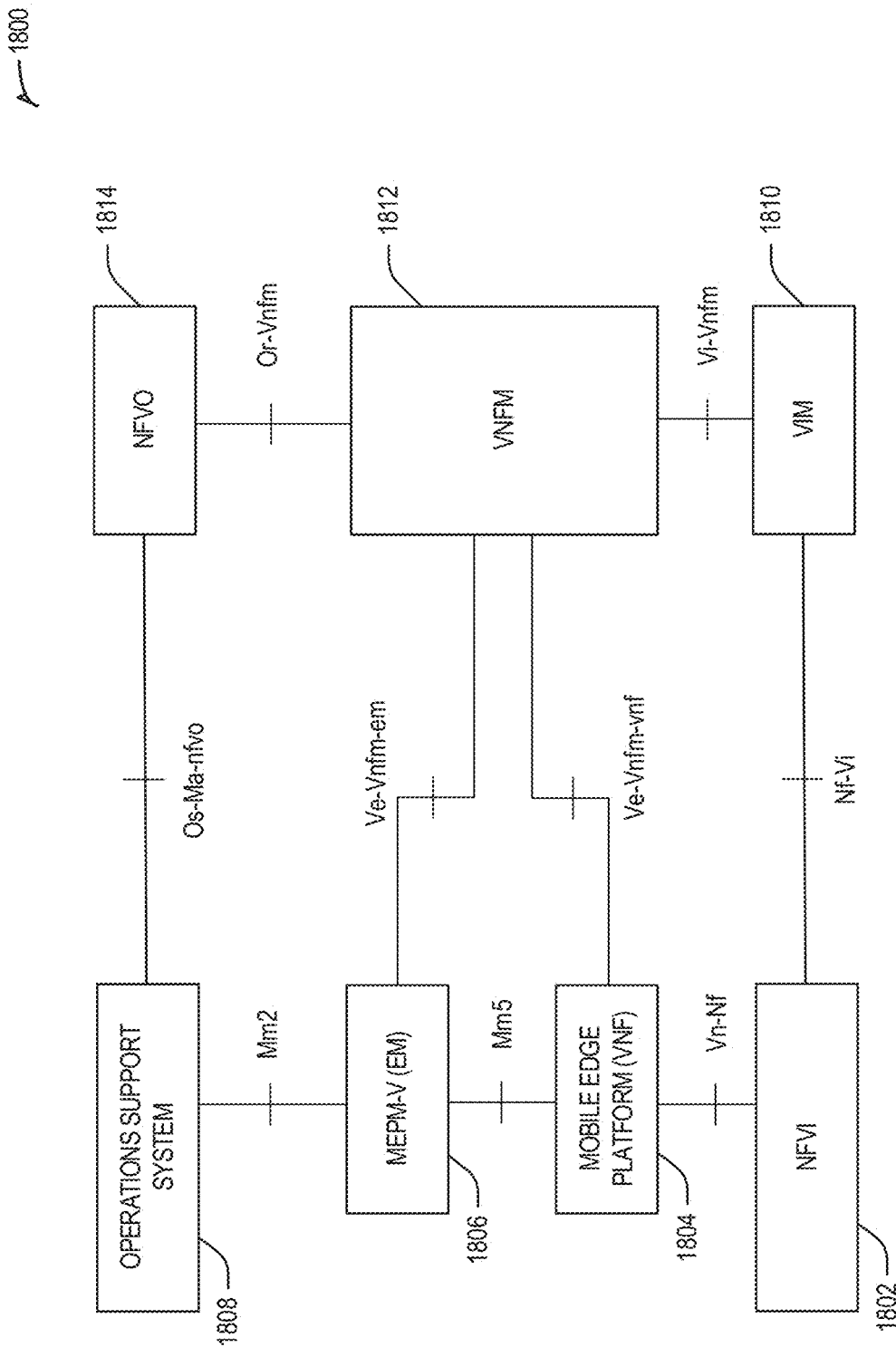
FIG. 18 illustrates the management of a MEC platform as a virtualized network function (VNF), deployable from an example edge computing system.

FIG. 18 illustrates the management of a MEC platform as a virtualized network function (VNF). Referring to FIG. 18, diagram 1800 illustrates management components from the MEC reference architecture 1800 in an NFV environment. More specifically, diagram 1800 illustrates the operations support system 1808, the MEPM-V 1806, the mobile edge platform 1804, the NFVI 1802, the NFVO 1814, the VNFM 1812, and the VIM 1810.

In some aspects, the MEPM-V 1806 can be configured to function as the Element Manager (EM) of the ME platform VNF 1804. In some aspects, a VNF Manager (VNFM) 1812, according to ETSI NFV (e.g., Specific VNFM, Generic VNFM), is used to perform LCM of the ME platform VNF 1804.

Diagram 1800 further illustrates the following reference point connects between the management components 1802-1814, as defined by ETSI NFV:

Ve-Vnfm-em: this reference point connects the VNF Manager (VNFM) that manages the lifecycle of the ME platform with the Mobile Edge Platform Manager-NFV (MEPM-V). The Ve-Vnfm-em reference point can be as defined in ETSI NFV. Since the Mobile Edge Platform VNF is considered as a network function, it is not expected that there are any impacts to the Ve-Vnfm-em procedures as defined by ETSI NFV.

Ve-Vnfm-vnf: this reference point connects the VNFM that manages the lifecycle of the ME platform with the Mobile Edge Platform VNF. The Ve-Vnfm-vnf reference point can be as defined in ETSI NFV. Since the Mobile Edge Platform VNF is considered as a network function, it is not expected that there are any impacts to the Ve-Vnfm-vnf procedures as defined by ETSI NFV.

Nf-Vn: this reference point connects the Mobile Edge Platform VNF and the NFVI. Nf-Vi: this reference point connects the NFVI and the VIM. Os-Ma-nfvo: this reference point connects the OSS and the NFVO. It is primarily used to manage NSs, e.g., a number of VNFs connected and orchestrated to deliver a service. Or-Vnfm: this reference point connects the NFVO and the VNFM that manages the lifecycle of the ME platform. It is primarily used for the NFVO to invoke VNF LCM operations. Vi-Vnfm: this reference point connects the VIM and the VNFM that manages the lifecycle of the ME platform. It is primarily used by the VNFM to invoke resource management operations to manage the cloud resources that are needed by the VNF. Or-Vi: this reference point connects the NFVO and the VIM. It is primarily used by the NFVO to manage cloud resources capacity.

In some aspects, 5G adoption depends on the ability to provide TSPs the ability to provision, manage, adjust, and operate multiple virtual networks over a common set of physical (wireless and wired) network infrastructure. End-to-end "slices" carve out virtual logical networks using physical computing and network resources. Each slice can be specifically configured to support performance related to the service supported including capacity, security levels, geographical coverage, and latency. Slices included partitioning the wireless radio of Radio Access Network (RAN), telecommunication system core infrastructure including the Evolved Packet Core (EPC), as well as the switches and Data Center Servers where the 5G mobile applications and content may be hosted. Furthermore, 5G EDGE devices may also be included in the slice depending on the service latency requirements.

In some aspects, 5G network slices will support a wide range of applications from (semi-)autonomous vehicles, remote health monitoring and first-responder applications requiring the best security/traceability to tiered smartphone plans and IoT devices that may be ok without extra resource traceability.

In some aspects, the information elements required to perform the disclosed interactions are complex and dynamic and must be access-controlled. It may be visualized as a resource graph (e.g., visualizing which CPUs, memories, bandwidth, I/O, storage systems, network nodes), which resources are owned by which actor, the state of allocation (of a resource) to a particular service instance. However, for security, not all parts of this "graph" are equally visible to each actor. The elements are stored in different slices; communication between slices and thus blockchain is based on policies and rights settings, which are dynamic in nature. In some aspects, AI techniques disclosed herein can be used to infer/predict SLA impacts to the network operator resources and the enterprise SLAs, including the price of resourcing at the time of request for transfer of resourcing.

Some technical problems addressed by some demonstrative embodiments will be addressed next.

Virtualized industrial workloads such as programmable logic controller (PLC's) have recently emerged as providing commercially available solutions in the domain of industrial automation. PLCs in an edge environment, such as in a wired or wireless edge computing system, for example an edge computing system implemented in an industrial automation setting, are typically connected to pieces of equipment within the industrial enterprise by way of sensors or wires. State of the art PLCs in an edge computing system are part of the mission-critical systems whose failure or disruption could cause an entire operation or business to grind to a halt. However, workloads currently implemented by PLCs are deployed as single instance virtual workloads running on an edge node, these workloads being highly tuned. As a result, in heterogeneous edge compute environments that are to host dynamic heterogeneous services and workloads, pre-tuning all workloads on the compute platform is in general not scalable. Orchestration and on-boarding of virtualized industrial workloads that are a mix of real-time and best-effort workloads in multi-tenant environments, while guaranteeing specific levels of compute/network/storage determinism along with real-time packet behavior is extremely difficult.

Embodiments address the above technical limitations by providing a mechanism to identify target edge nodes which can provide the level of determinism and real-time behavior required by a workload in dynamic edge computing environments. With respect to determinism, if a set of tasks exceed the allotted time window or if the tasks do not finish in a consistent fashion from run to run, serious quality and safety issues tend to occur. The consistent and predictable execution of workloads is an example of determinism. Without determinism, systems may not be referred to as real-time. Real-time adds the additional constraint of tasks or event finishing with a specified time interval e.g. soft real-time (e.g. <10 ms), hard real-time (e.g. <1 ms), isochronous real-time (31.25 µs).

There are currently no existing solutions to solve the above technical limitations. Workload orchestration in cloud compute environments provide approaches that focus on an optimal allocation of infrastructure resources (e.g. including cost functions, machine-learning (ML) compute resources, etc.) to achieve a specified level of performance as required by an SLA. However, current workload orchestrations take into consideration only workload performance or resource utilization KPI's, but not the deterministic behavior of workloads, that is, not whether a selected edge node can support/guarantee the deterministic behavior required by the workload.

Some embodiments provide solutions to address the deterministic behavior of workloads in selecting edge nodes, such as edge nodes within dynamic, heterogenous edge computing networks. Embodiments provide, by way of example:
(1) a novel Centralized Determinism Evaluator (CDE), which may be provided at least in part in the form of logic or software, and which corresponds to a new architectural component in a time sensitive edge computing network responsible for evaluating the deterministic and real-time behavior of edge nodes;
(2) a CDE based mechanism to specify edge node determinism and to match real-time KPI requirements for a virtualized industrial workloads to support the on-boarding process; the CDE based mechanism may, for example, include a mechanism to decode a virtualized workload descriptor as will be explained in item (3) below; and
(3) a virtualized workload descriptor, such as, for example, an extended Virtualized Industrial Function Descriptor (VIFD), which details real-time KPI requirements, workload compute requirements, and host node determinism KPIs.

Embodiments provide a mechanism aimed at ensuring the deterministic behavior of a virtualized industrial workload in multi-tenant and heterogeneous compute environments such as, by way of example, an industrial edge cloud environment.

An example implementation of a sample VIFD 1900 according to one embodiment is illustrated in FIG. 19, the sample VIFD including representative determinism KPI's. The example VIFD 1900 of FIG. 19 includes an example topology definition section 1920, which specifies the instantiation parameters and operational behaviors of the workload to be deployed. The topology definition and properties are used by the orchestrator to create the required VM to host the workload being deployed. The example VIFD 1900 of FIG. 19 also includes an example scheduling constraints definition section 1940, which specifies representative determinism KPIs, as shown in the embodiment, in the form of network communication scheduling requirements for the workload to be deployed. VIFD 1900 further includes a cost section 1960, for example in terms of energy and CPU daily cost for the workload.

Figure 20:
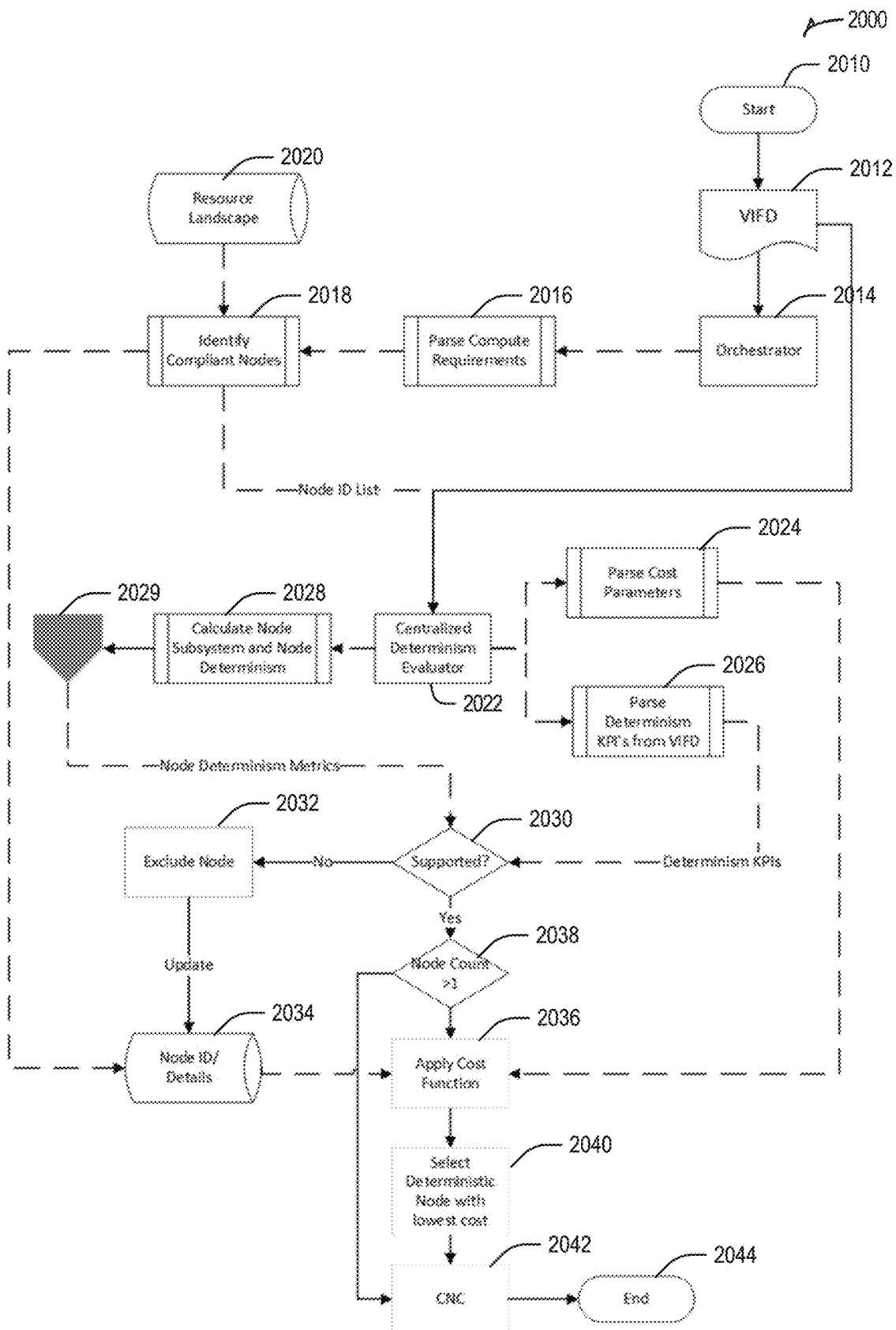
FIG. 20 illustrates a flow diagram depicting operations in the context of a mechanism to select a target edge node according to some exemplary embodiments.

FIG. 20 is a flow diagram 2000 depicting operations in the context of a mechanism according to some exemplary embodiments. Flow diagram 2000 shows among other things the use of deployment requirements for a virtualized workload in a VIFD, such as VIFD 2012 of FIG. 20. It is to be noted that the broken lines between stages/operations in flow diagram 2000 correspond to subprocesses within the flow, as will become apparent in the description of FIG. 20 to follow.

As seen in FIG. 20, the operations begin at the start 2010, and proceed to the provision, to an orchestrator of an edge computing system, of a VIFD 2012 that specifies determinism and real-time KPI requirements/workload compute resource requirements for a virtualized workload to support the on-boarding process. The VIFD 2012 is provided to an infrastructure orchestrator 2014. The compute resource requirements within the VIFD are initially parsed at subroutine 2016 by orchestrator 2014 which, as a result of the parsing, may extract the workload computer resource requirements and further a software image name of the workload to be deployed from the VIFD.

A VIFD according to some embodiments is, in general, to specify the instantiation parameters, operational behaviors, network communication requirements, compute resource requirements and determinism KPIs for a workload to be deployed to an edge node. In some examples, the VIFD may be an enhancement of the virtual network function descriptor (VNFD) specified by the European Telecommunications Standards Institute (ETSI) in the specification "Network Functions Virtualization (NFV) Release 2; Protocols and Data Models; NFV descriptors based on TOSCA specification," version 2.5.1, published in December 2018. In some such examples, the VIFD may be a file that uses the Topology and Orchestration Specification for Cloud Applications (TOSCA) language to specify the instantiation parameters, operational behaviors, network communication requirements, compute resource requirements etc., for the new workload to be assigned to an edge compute note. For example, a VNFD uses the TOSCA language to specify the instantiation parameters and operational behaviors of VNF workloads. For example, the VNFD can contain key performance indicators (KPIs) and/or other requirements that can be used in the process of onboarding and managing the lifecycle of the VNF workloads. However, while a VNFD does not describe the real-time networking requirements for a workload (such as packet communication jitter targets/bounds, latency targets/bounds, etc.), nor does it set forth workload determinism KPIs, the VIFD according to some embodiments described herein may extend the VNFD to include network communication scheduling requirements for the workload (such as frame spacing, mean latency, an upper bound for latency, etc.), and/or may extend the VNFD to include workload determinism KPIs.

Referring still to FIG. 20, an orchestrator may at 2016 parse the compute resource requirements of the VIFD for the workload to be deployed, for example by parsing at least portions of the VM-related fields of the VIFD in order to determine the workload compute resource requirements (e.g. number of virtual central processing units (CPUs), memory, storage, network interfaces, etc.) for the workload to be deployed (e.g., in real-time) to an edge node (e.g., which may be an edge node deployed at a single physical device, or across multiple physical devices, or by way of a cluster in an industrial computer premises system). For example, the orchestrator may parse a topology definition section of the VIFD to determine the compute resource requirements (e.g., VM flavor, number of network connections, image name, number of cores, memory/disk sizes, etc.).

Based on the workload compute resource requirements determined from parsing relevant portions of the VIFD 2012, the orchestrator may then identify at 2018 a set of candidate target edge nodes in the available infrastructure of the edge computing system that are compliant with the workload compute resource requirements and networking requirements specified in within VIFD 2012. The set of candidate target edge nodes corresponds to a list of those edge nodes that would, from a strictly resource-based perspective, support on-boarding of the workload. Such edge nodes are "candidate" edge nodes to the extent that they serve as candidate for an edge node to be selected as a target edge node at which the workload is to be deployed, it being understood that, as noted previously, an "edge node" as used herein refers to an identifiable entity implementing an aspect of edge computing operations, whether part of a larger system, distributed collection of systems, or a standalone apparatus.

Referring still to FIG. 20, the identification at 2018 may happen through use by the orchestrator of resource landscape data from resource landscape database 2020 regarding edge nodes within the edge computing system of the orchestrator. The resource landscape data at 2020 is to include at least information regarding relevant compute resources of edge nodes that would allow identification of the edge nodes as compliant with workload compute resource requirements specified in a VIFD.

The orchestrator at 2014 may then provide information regarding the set of candidate target edge nodes and associated hardware characteristics extracted from the VIFD to a Centralized Determinism Evaluator (CDE) 2022, and further to a Node ID/Details database at 2034. In the shown embodiment of FIG. 20, the information regarding the set of candidate target edge nodes is in the form of a Node ID List as shown, although embodiments are not so limited.

The CDE at 2022 may ingest the information regarding the set of candidate target edge nodes from the orchestrator and may further access relevant portions of the VIFD to determine workload determinism KPIs therefrom and workload cost parameters therefrom. In particular, the CDE may, at 2026, parse the VIFD to extract the required determinism KPIs for the various subsystems on a desired target edge node, such as from the constraints section of the VIFD. The CDE may also parse, at 2024, any cost parameters defined in the VIFD e.g. energy, financial cost etc. which may need to be considered when making the final target edge node selection decision.

The CDE may determine, at 2028, the node determinism metrics for each subsystem of each edge node in the set of candidate target edge nodes. The CDE may also calculate the overall edge node determinism metrics for each edge node in the set of candidate target edge nodes based on the determinism metrics for each subsystem of each edge node in the set of candidate edge nodes. Some embodiments for the calculation of workload determinism metrics for an edge node will be described further below in relation to FIG. 22, and are referenced in FIG. 20 by way of the off-page connector 2029.

As seen in the embodiment of FIG. 20, the CDE may, for each edge node of the set of candidate target edge nodes, compare, at 2030, the workload determinism KPIs parsed by the CDE 2022 from the VIFD 2012 on the one hand with the overall edge node determinism metrics for said each edge node. The CDE may determine, based on the comparison, one or more candidate target edge nodes from the set of candidate target edge nodes that are compliant with the workload determinism KPIs. The CDE may further determine, at 2030, based on the comparison, one or more non-compliant edge nodes from the set of candidate target edge nodes that are not compliant with the workload determinism KPIs. The CDE may further, at 2032, exclude the non-compliant edge nodes and remove the non-compliant edge nodes from the Node ID/Details database 2034.

For the one or more candidate target edge nodes determined from decision 2030, the process (as implemented by the CDE, the orchestrator or any other entity within the edge computing system) may, at decision 2038, determine if the one or more candidate target edge nodes include a plurality of candidate target edge nodes. If the answer is no, the one or more candidate target edge nodes necessarily includes a single candidate target edge node which corresponds to the target edge node to which the workload is to be deployed. In such a case, process may deploy the workload to the target edge node, for example as shown in FIG. 20 to a computer numerical control (CNC) software 2044 at the target edge node, although embodiments are not so limited. If the answer from decision 2038 is yes, however, the process may move to applying a cost function to the plurality of candidate target edge nodes identified at decision 2038.

If a single candidate target edge node is determined to comply with workload compute resource requirements as identified in subprocess 2018, and further with workload determinism KPIs as determined at decision 2030, some embodiments contemplate not applying a cost function in a determination of the target edge node as a further filtering of edge nodes would not be necessary.

A cost function as seen at 2036 may ingest workload cost parameters determined from a parsing of relevant portions of the VIFD 2012 by the CDE 2022 at subprocess 2024 as described above. The cost function may further ingest information regarding the plurality of candidate target edge nodes, and may calculate the cost of deploying the workload on each candidate target edge node of the plurality of candidate target edge nodes. Calculation the cost of workload deployment may be implemented according to the state of the art. According to some embodiments, cost calculation may depend on the cost factor being utilised. For example, if the cost factor involves energy consumption, hardware telemetry data available for each node may be used to calculate the hourly/daily/weekly average power consumption. These values can then be compared against the power cost value specified in the VIFD. Similarly, one may utilize a predefined list of financial costs for different CPU's types, memory, storage, etc. which then can be ingested by the cost function to perform the calculation.

Based on the calculation of the cost of deploying the workload on each candidate target edge node, the cost function may determine which candidate target edge node in the Node ID/Details may provide a lowest cost option, and may select the lowest cost option as the target edge node. The selected node ID of the target edge node may pass to the Central Network Controller (CNC) for schedule determination for deployment of the workload onto the target edge node. In a time-sensitive network (TSN—IEEE 802.1x) the CNC defines the schedule on which all TSN frames are transmitted i.e. provides deterministic IP packet transmission over Ethernet.

According to some embodiments, the orchestrator 2014 and CDE 2022 may be implemented as logic or software within an edge node, such as an edge gateway node (see for example edge gateway nodes 312 of FIG. 3).

Figure 21:
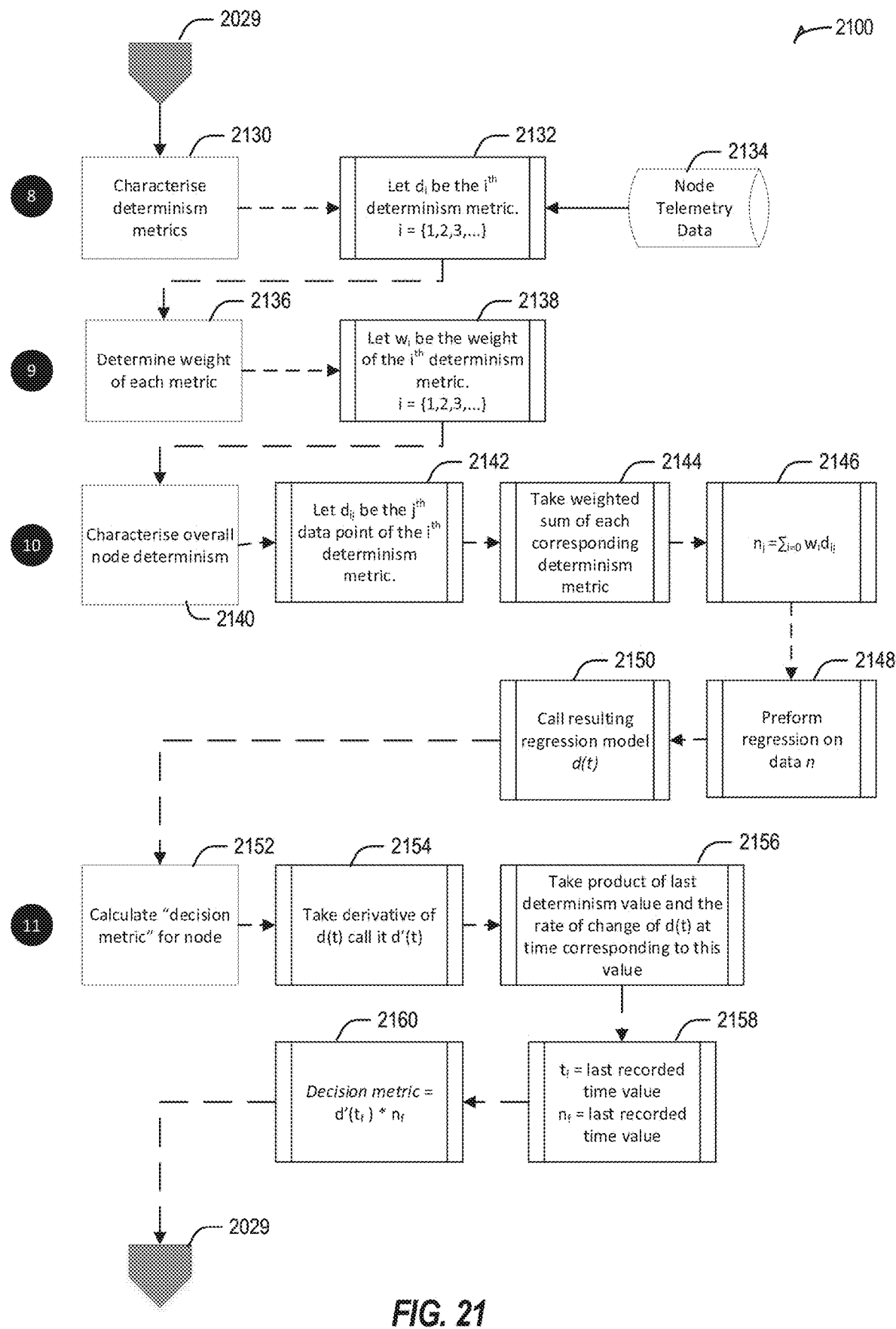
FIG. 21 illustrates a flow diagram depicting operations in the context of calculating edge node subsystem determinism metrics and a decision metric according to some embodiments.

Turning now to FIG. 21, an embodiment of a flow 2100 of the connector 2029 of FIG. 20 is shown in detail, which subprocess concerns in part a calculation of the node determinism metrics for each subsystem of each edge node in the set of candidate target edge nodes from process 2000 of FIG. 20. The CDE may also calculate the overall node level determinism for each edge node in the set of candidate target edge nodes based on the determinism metrics for each subsystem of each edge node in the set of candidate edge nodes.

At process 2130, the CDE may obtain collect determinism metrics for each subsystem of each edge node of the set of candidate target edge nodes. The CDE may obtain such determinism metrics according to one embodiment by obtaining it from a standalone telemetry service, for example one according to the state of the art that can collect the necessary metrics. According to another embodiment, the CDE may obtain the metrics from each subsystem of each edge node of the set of candidate target edge nodes. The CDE may characterize (observe and determine the significance of by applying a mathematical/algorithmic approach, such as one described in the context of some embodiments herein) such metrics in order to capture node and subsystem dynamics for said each edge node. The below lists, for an edge node, some examples of edge node subsystem determinism metrics:

1. compute subsystem determinism metrics, which may be based on factors such as number of cache misses, maximum cycle time, and minimum cycle time;
2. network subsystem determinism metrics, which may be based on factors such as jitter, number of packet drops, max packet latency, min packet latency;
3. memory subsystem determinism metrics, which may be based on factors such as bandwidth and latency excursion; and
4. storage subsystem determinism metrics, which may be based on factors such as read and write latency.

According to some embodiments, the CDE may characterize one or more of the above edge node subsystem determinism metrics for an edge node, calculate an overall edge node determinism metrics corresponding thereto for the edge node, and analyze the calculated overall edge node determinism metrics as a function of time to determine their trends.

At process 2130, the CDE may characterize one or more edge node subsystem determinism metrics for an edge node. Subprocess 2132 corresponds to a subprocess of process 2130, and provides further details of the same. In particular, at subprocess 2132, determinism metrics for an edge node may be characterized by the CDE by characterizing the edge node subsystem determinism metrics for subsystem i of the edge node as $d_i$. Where the CDE selects a total number of subsystems N for which to characterize the subprocess determinism metrics $d_i$, i would therefore be equal to integers from 1 through N inclusive. According to some embodiments, N could be equal to 1 or to an integer more than one. In subprocess 2132, as part of characterizing the edge node subsystem determinism metrics, the CDE may ingest edge node telemetry data 2134 provided by the edge computing system as the telemetry data 2134 become available as a function of time. Data 2134 may for example include values (such as max/min cycle time, jitter, max/min latency) that may be used by the CDE to calculate both subsystem and overall system determinism.

At process 2136, the CDE may enumerate the chosen edge node subsystem determinism metrics $d_i$, for example with i={1 . . . N} (where i may correspond to an integer that denotes a given edge node subsystem determinism metrics type) by assigning a weight $w_i$ to each metrics $d_i$. Subprocess 2138 corresponds to a subprocess of process 2136, and provides further details of the same. In particular, at subprocess 2138, CDE may enumerate weights such that a weight $w_i$ corresponding to determinism metrics $d_i$. By way of example, initial seed weights for each $d_i$ may, according to an embodiment, be provided via the VIFD, and for example, be based on prior characterization of the workload, or be determined through longitudinal observation of edge node behavior hosting similar classes of workloads. Weights may, according to some embodiments, be based on a feature or subsystem's impact on the overall determinism of the edge node being analyzed. Weights may, according to one embodiment, be defined in the range 0-1 inclusive, and may be applied such that, where an edge node subsystem determinism metrics has substantially no bearing on overall determinism, the weight for that edge node subsystem determinism metrics would be 0, whereas, if an edge node subsystem determinism metrics is a sole influencer, among other edge node subsystem determinism metrics, of the overall edge node determinism metrics, the weight for the edge node subsystem determinism metrics would be 1, etc.).

At process 2140, the CDE may characterize the overall edge node determinism metrics by for example calculating the same. Subprocesses 2142 to 2148 correspond to subprocesses of process 2140, and provide further details of the same.

In particular, at subprocess 2142, an edge node subsystem determinism metrics $d_i$ for a given instance j for an edge node may be characterized by the CDE as $d_{ij}$. An instance j corresponds to an instance for each type of determinism metric i. All instances j of $d_i$ data points may happen at the same time $t_j$. $d_{ij}$ may represent a data point instance j for an edge node subsystem determinism metrics of type i of an edge node corresponding to edge node subsystem determinism metrics type number i). The record of each edge node subsystem determinism metrics $d_i$ across the time domain may be used using a sliding window within which the edge node subsystem determinism metrics may be assessed, for example, according to one embodiment, considering only the latest values within a given time window. According to one an embodiment, the 100 most recent data point instances $d_i$ across determinism metrics types i may be considered in order to calculate the overall edge node determinism metrics over time, discarding all older values. The manner of obtaining the weighted sum as noted above will be described below in relation to subprocess 2144 and 2146.

At subprocess 2144, the CDE may calculate, for each time value $t_1, t_2, \ldots t_f$ that is relevant for each type i of edge node subsystem determinism metrics $d_i$, using the $w_i$ corresponding to $d_i$, the weighted sum of the edge node subsystem determinism metrics values $d_{ij}$ across edge node subsystem determinism metrics value types i. Subprocess 2146 further explains subprocess 2144 by providing one embodiment of obtaining the weighted sum as noted above. In particular, according to subprocess 2146, the CDE may generate a data set n for each given instance j of an edge node subsystem determinism metrics i by calculating each value $n_j$ ($j^{th}$ data point of n). That is, for each instance j where edge node subsystem determinism metrics $d_i$ is available (based on a maximum time window for calculation denoted by a maximum number for j), the CDE may calculate a sum of edge node subsystem determinism metrics $d_{ij}$ multiplied by the weight vector $w_i$ as shown in Equation (1) below:

$$n_j = \Sigma_{i=1} w_i d_{ij} \qquad \text{Eq. (1)}$$

At subprocess 2148, the CDE may then perform regression on data points n (obtained at each instance j by way of the summation noted in relation to Equation (1) above, over all instances of data points n through time. If linear regression is performed, the CDE may determine a slope m for a line plotting n versus time. Regression would, according to some embodiments, generate a model of overall node determinism for the edge node being analyzed. Let us refer to the overall edge node determinism metrics as d(t), as suggested by subprocess 2150. The overall edge node determinism metrics may for example be fed to decision 2030 of FIG. 20 in order to determine whether one or more of the edge nodes being analyzed would comply with determinism KPIs of a workload as specified by a VIFD.

According to some embodiments, such as those involving lockstep orchestration of a plurality of edge nodes as will be explained in more detail in relation to FIGS. 23 and 24 further below, the CPE may calculate a decision metrics for edge nodes. A manner of obtaining a decision metrics according to some embodiments will now be explained in relation to FIG. 21 below.

Referring still to FIG. 21, the exemplary operation in that figure may then proceed to process 2152. At process 2152, the CDE may calculate a "decision metrics" for the edge node being analyzed. Subprocesses 2154 to 2160 correspond to subprocesses of process 2152, and provide further details of the same for calculation of a decision metrics according to an embodiment.

Referring to subprocess 2154, according to one embodiment, the CDE may obtain the decision metrics for the edge node by calculating the derivative of d(t), that is, d'(t), which would provide a rate of change of d(t) over time. Derivative d'(t) would in essence provide a measure, at each time t, of a fluctuation of the overall edge node determinism metrics for the edge node being analyzed. Thereafter, at subprocesses 2156 through 2160, the CDE may multiply the most recent overall edge node determinism metrics value, denoted $n_f$ herein, with the rate of change of d(t) at the time corresponding to $n_f$ in order to determine the decision metrics, as illustrated in Equation (2) below:

$$\text{Decision Metric} = d'(t_f) * f_f \qquad \text{Eq. (2)}$$

Figure 22:
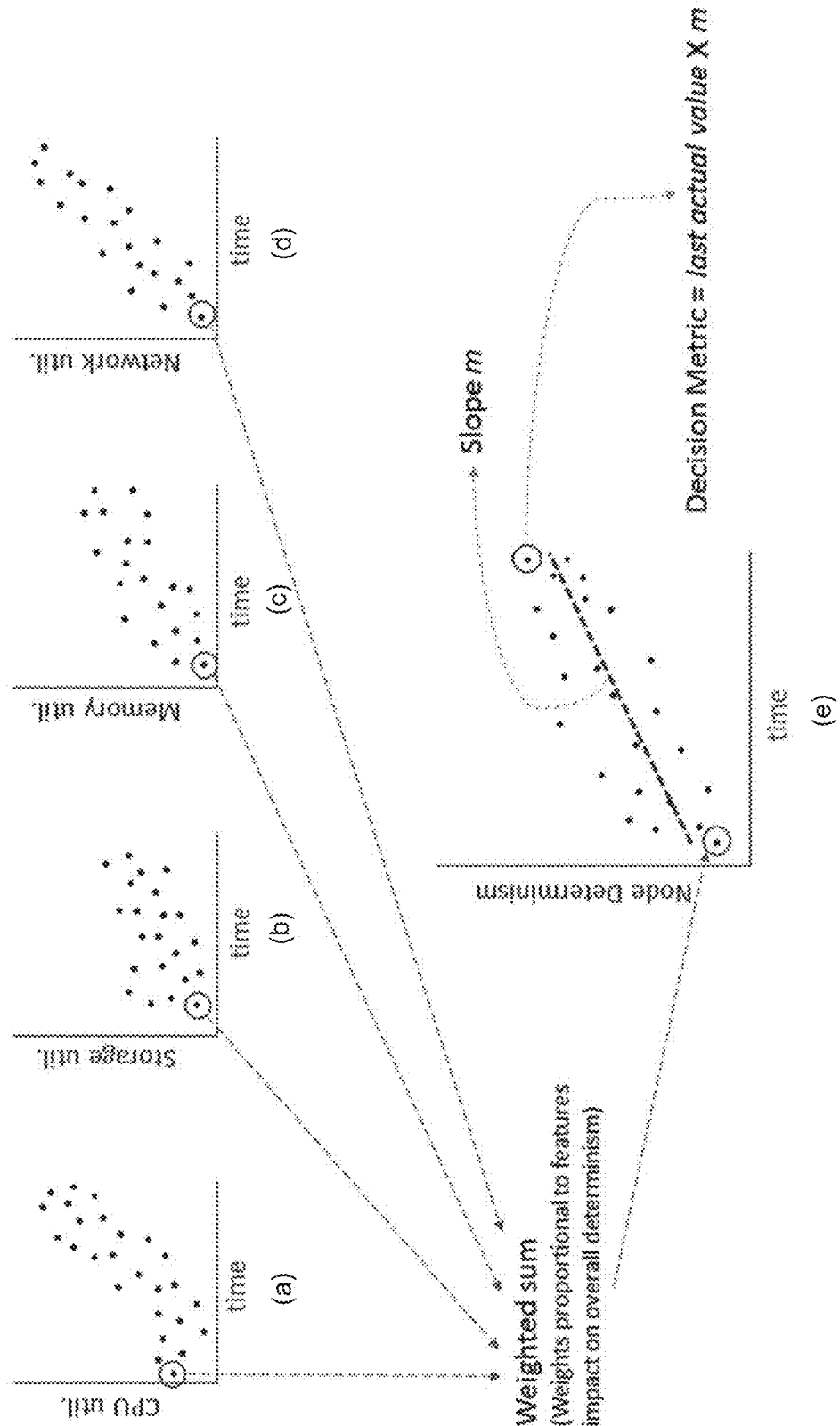
FIG. 22 illustrates example graphs corresponding to edge node subsystem determinism metrics and to an overall edge node determinism metric model according to some embodiments.

The decision metrics encapsulates a most recent observed overall determinism value of the edge node being analyzed, along with the fluctuation trend for the overall determinism value at that most recent time. The decision metrics may be useful in a lockstep orchestration process according to some embodiments, and will be explained in FIG. 22 depicts graphs (a) through (e) which show determinism metrics plotted against time. In particular, graphs (a) through (d) depict example edge node subsystem determinism metrics plotted against time for subsystems of type CPU/compute subsystem as shown in graph (a), of type storage subsystem as shown in graph (b), of type memory subsystem as shown in graph (c), and of type network subsystem as shown in graph (d), for an edge node. Graphs (a) through (d) plot $d_i$ against time where i, as explained above, may be an integer denoting each type of subsystem. The values of $d_i$ in graphs (a) through (d) may for example be obtained as node telemetry data as depicted by data 2134 in FIG. 21. Graph (e) plots overall edge node determinism metrics n as a function of time based on the values of $d_i$ in graphs (a) through (d), the overall edge node determinism values having been calculated based on the edge node subsystem determinism metrics, for example as described with respect to Equation (1) above using weighted sums of groups of instances of edge node subsystem determinism metrics. Graph (e) further depicts regression on the overall edge node determinism metrics n to obtain a slope m for the data points of n plotted over time, and further the most recent overall edge node determinism metrics X that could be used to derive the decision metrics such as illustrated by way of example in Equation (2).

Figure 23:
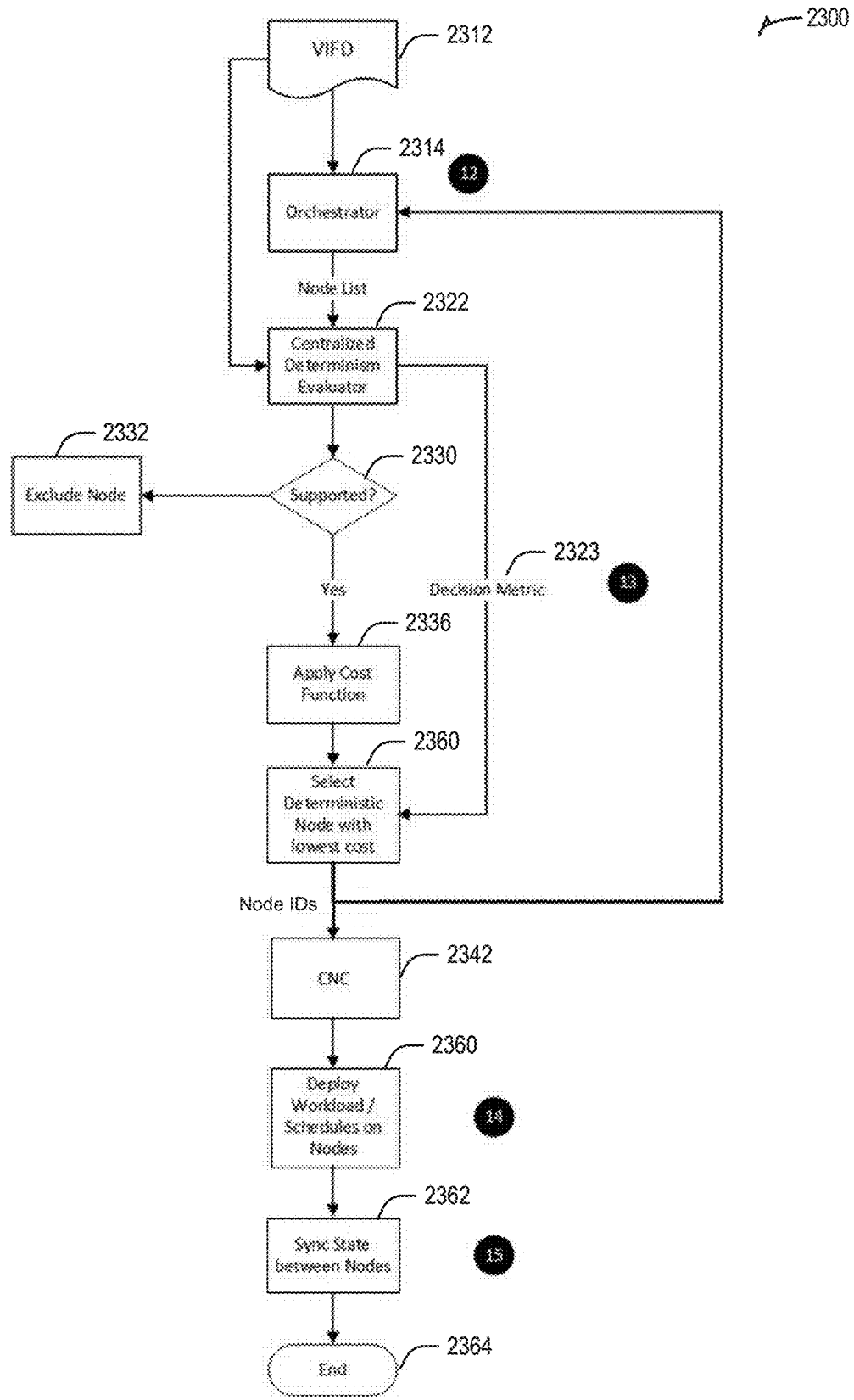
FIG. 23 illustrates a flow diagram depicting operations in the context of a lockstep mechanism to select a primary edge node and a secondary edge node according to some embodiments.
Figure 24:
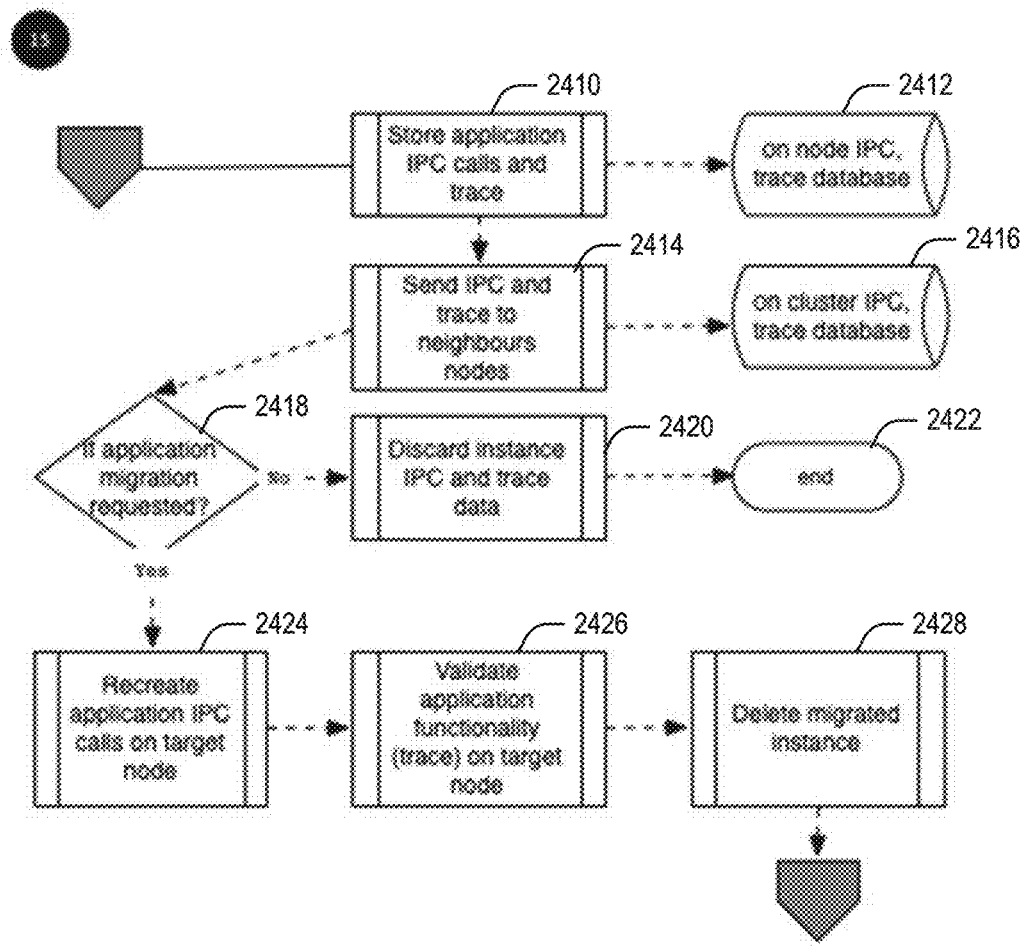
FIG. 24 illustrates a flow diagram depicting operations in the context of synching a workload between a primary edge node and a secondary edge node according to some embodiments.

Referring now to FIGS. 23 and 24, some embodiments further include enabling lockstep orchestration as between two or more edge nodes to which a workload could be deployed, where lockstep orchestration may provide a redundancy mechanism, such as, for example, for mission critical industrial functions. According to a lockstep orchestration mechanism, a backup workload instance may be deployed at a secondary edge node, with the primary workload instance deployed at a primary edge node, the backup workload instance maintained in "lock-step" with the primary workload instance in order to provide a temporally efficient "hot swap" if a hot swap should become necessary.

In a lockstep scenario, a process similar to that outlined with respect to FIGS. 20 and 21 for selection of the most appropriate edge node to on-board the workload may be extended to include a lockstep option. According to the limited embodiments of a lockstep option, when referring to an "edge node" onto which a primary or secondary instance of a workload is deployed, what is meant is a physically distinct edge node, as opposed to an edge node with a broader definition as provided in all other portions of the instant disclosure. Accordingly, in lockstep embodiments, two edge nodes are identified to on-board a primary and secondary instance of the workload on two physically separate nodes. State information may be maintained between the two workload instances and between the two edge nodes.

FIG. 23 is a flow diagram 2300 depicting operations in the context of a mechanism according to some exemplary embodiments involving lockstep orchestration. The data, processes, and decisions depicted in FIG. 23 with reference numerals corresponding to those in FIG. 20 are associated, respectively, with the same data, processes and decisions as those described above in relation to FIG. 20. Flow diagram 2300 shows among other things the use of deployment requirements for a virtualized workload in a VIFD, such as VIFD 2312 of FIG. 23.

As seen in FIG. 23, the operations include the generation of a VIFD 2312 The compute resource requirements within the VIFD are initially parsed by orchestrator 2314 which, as a result of the parsing, extracts the workload computer resource requirements from the VIFD. The VIFD according to a lockstep embodiment may further contain one or more lockstep fields that specify that the virtualized workload is to be deployed in a redundant and synchronized configuration (i.e. a lockstep configuration) among a plurality (such as 2) edge nodes.

Based on the workload compute resource requirements determined from parsing relevant portions of the VIFD 2312, the orchestrator may then identify a set of candidate target edge nodes in the available infrastructure of the edge computing system that are compliant with the workload compute resource requirements specified in the KPIs within VIFD 2312. The identification may happen through use by the orchestrator of resource landscape data from a resource landscape database as explained previously in the context of FIG. 20.

The orchestrator at 2314 may then provide information regarding the set of candidate target edge nodes and associated hardware characteristics extracted from the VIFD to CDE 2322, and further to a Node ID/Details database (not shown in FIG. 23). In the shown embodiment of FIG. 23, the information regarding the set of candidate target edge nodes is in the form of a Node list as shown, although embodiments are not so limited.

The CDE at 2322 may ingest the information regarding the set of candidate target edge nodes from the orchestrator, and may further access relevant portions of the VIFD to determine workload determinism KPIs therefrom and workload cost parameters therefrom. In particular, the CDE may parse the VIFD to extract the required determinism KPIs for the various subsystems on a desired target edge node, such as from the constraints section of the VIFD. The CDE may also parse any cost parameters defined in the VIFD e.g. energy, financial cost etc. which may need to be considered when making the final target edge node selection decision.

The CDE may determine the edge node subsystem determinism metrics for each subsystem of each edge node in the set of candidate target edge nodes, for example from telemetry data as explained previously in the context of FIG. 20. The CDE may also calculate the overall node level determinism for each edge node in the set of candidate target edge nodes based on the determinism metrics for each subsystem of each edge node in the set of candidate edge nodes, for example according to Equation (1) above.

As seen in the embodiment of FIG. 23, the CDE may, for each edge node of the set of candidate target edge nodes, compare, at 2330, the workload determinism KPIs parsed by the CDE 2322 from the VIFD 2312 on the one hand with the overall edge node determinism metrics for said each edge node. The CDE may determine, based on the comparison, one or more candidate target edge nodes from the set of candidate target edge nodes that are compliant with the workload determinism KPIs. The CDE may further determine, at 2330, based on the comparison, one or more non-compliant edge nodes from the set of candidate target edge nodes that are not compliant with the workload determinism KPIs. The CDE may further, at 2332, exclude the non-compliant edge nodes and remove the non-compliant edge nodes from the Node ID/Details database (not shown).

For the one or more candidate target edge nodes determined from decision 2330, the process (as implemented by the CDE, the orchestrator or any other entity within the edge computing system) may determine that the one or more candidate target edge nodes include a plurality of candidate target edge nodes. The process may then move to applying a cost function 2336 to the plurality of candidate target edge nodes.

A cost function as seen at 2336 may ingest workload cost parameters determined from a parsing of relevant portions of the VIFD 2312 by the CDE 2322 as described above. The cost function may further ingest information regarding the plurality of candidate target edge nodes, and may calculate the cost of deploying the workload on each candidate target edge node of the plurality of candidate target edge nodes. Based on the calculation of the cost of deploying the workload on each candidate target edge node, the cost function may determine, at process 2340, which plurality of (for example, 2) candidate target edge nodes may serve as a primary edge node and a secondary edge node for synchronized lockstep workload deployment. In selecting the primary and secondary edge nodes at process 2360, the decision metrics, for example one calculated according to Equation (2) above, may be employed superimposed with the cost function.

The node decision metrics may therefore be utilized as an input in to cost function together with any other parameters of concern in order to select suitable edge nodes as the primary edge node and the secondary edge node For example, the selection of the primary and secondary edge nodes may involve prioritizing the decision metrics over cost, and for example picking the two edge nodes with the top decision metrics in terms of fluctuation toward (rather than away from) determinism, and with respective cost functions below a given cost function threshold. Embodiments are not so limited however, and encompass basing the selection of the primary and secondary edge nodes taking cost, decision metrics and other parameters into consideration in any reasonable manner. The ID's of the two nodes selected are then passed to the CNC 2342 and orchestrator 2314.

The orchestrator 2314 may then deploy the workload on the two selected primary and secondary edge nodes. The CNC 2342 may calculate the network schedule and configure the network schedule on the primary and secondary edge nodes.

The selected node ID of the target edge nodes may pass to the orchestrator 2314 for schedule determination for deployment of the workload onto the target edge nodes at process 2360. The orchestrator may implement deployment of a primary instance of the workload on the primary edge node, and deployment of a secondary instance of the workload on the secondary edge node in parallel.

At process 2362, the orchestrator may sync the respective states of the primary edge node and the secondary edge node during deployment of the primary and secondary instances of the workload thereon. Subprocesses of process 2362 are depicted in FIG. 24.

Referring now to FIG. 24, some embodiments of subprocesses of process 2362 of FIG. 23 are shown, which subprocesses aim at ensuring edge node state synchronization among edge nodes, such as between the primary edge node and the secondary edge node. Edge node state synchronization may involve sharing states of workload instances, which may include a collection of pairs of IPC calls and workload trace, between edge nodes in a cluster, such as, for example, between the primary edge node and the secondary edge node, in order to facilitate migration if migration is requested. As seen in FIG. 24, at subprocess 2410, workload interprocess communication (IPC) calls and trace are stored in the IPC/trace database 2412 of the primary edge node. At subprocess 2414, the workload IPC calls and trace may be sent to neighbor edge nodes in a cluster of selected edge nodes (for example, one or more secondary edge nodes), or to a single node, and stored in the IPC/trace database 2416 of the one or more secondary edge nodes. At decision 2413, a determination is made as to whether a request has been received to migrate the workload. If no migration request has been received, the operation moves to subprocess 2420 in which the instance of IPC calls and trace data is discarded from the primary and secondary edge node databases, and the operation comes to an end at 2422, corresponding to end 2364 of FIG. 23. If a migration request has been received, the operation moves to subprocess 2424, where the workload IPC calls and trace are recreated on the target edge node, corresponding to a selected one of the secondary nodes. Thereafter, at process 2426, the workload trace is validated on the target edge node, and at process 2428, the migrated instance deleted from the primary node. In such an instance, the workload would have been migrated to a secondary edge node. Process 2262 and its associated exemplary subprocesses shown in FIG. 23 may, according to some embodiments, be performed in whole or in part at the node level.

For a target edge node selected by one or more of the mechanisms described in relation to FIGS. 19-24 above, an orchestrator may create a VM configuration specification for the VM, which is to host the workload on the target edge node. The orchestrator then creates the VM configuration specification for the VM based on the parameters parsed from the VIFD. Accordingly, the orchestrator is an example of means for parsing a virtualized industrial function descriptor to determine a virtual machine configuration specification for a virtual machine to deploy on a target edge node to implement a virtualized workload.

Figure 25:
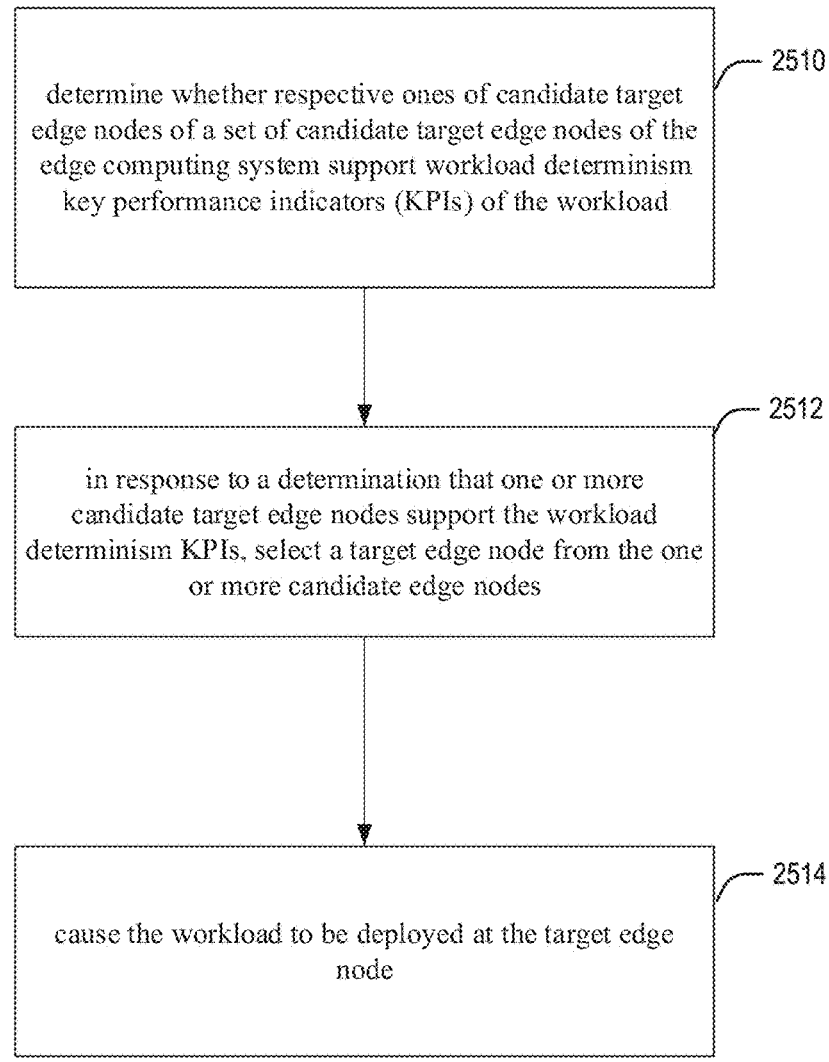
FIG. 25 illustrates a process according to some embodiments.

FIG. 25 depicts a process 2500 according to some embodiments. At operation 2510, the process includes determining whether respective ones of candidate target edge nodes of a set of candidate target edge nodes of the edge computing system support workload determinism key performance indicators (KPIs) of the workload. At operation 2512, the process includes, in response to a determination that one or more candidate target edge nodes support the workload determinism KPIs, selecting a target edge node from the one or more candidate edge nodes. At process 2514, the process includes causing the workload to be deployed at the target edge node.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Example Edge Computing Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 includes non-transitory computer-readable storage medium of an edge computing system to identify a target edge node for deployment of a workload thereon, the computer-readable storage medium comprising computer-readable instructions that, when executed, cause at least one processor to perform operations comprising: determining whether respective ones of candidate target edge nodes of a set of candidate target edge nodes of the edge computing system support workload determinism key performance indicators (KPIs) of the workload; in response to a determination that one or more candidate target edge nodes support the workload determinism KPIs, selecting a target edge node from the one or more candidate edge nodes; and causing the workload to be deployed at the target edge node.

Example 2 includes the subject matter of Example 1, and optionally, wherein the operations further comprise parsing one or more fields of a Virtualized Industrial Function Descriptor (VIFD) to determine the workload determinism KPIs.

Example 3 includes the subject matter of claim 1, the operations further including comparing the workload determinism KPIs with respective overall edge node determinism metrics of the respective ones of the candidate target edge nodes to determine whether the respective ones of the candidate target edge nodes support the workload determinism KPIs.

Example 4 includes the subject matter of any one of Examples 1-3, the operations further comprising calculating overall edge node determinism metrics for each of the respective ones of the candidate target edge nodes of the set of candidate target edge nodes, calculating the overall edge node determinism metrics being based on one or more edge node subsystem determinism metrics for said each of the respective ones of the candidate target edge nodes.

Example 5 includes the subject matter of Example 4, and optionally, wherein: the one or more edge node subsystem determinism metrics for said each of the respective ones of the candidate target edge nodes include edge node subsystem determinism metrics $d_{ij}$ corresponding to: a subsystem number i designating a subsystem type of said each of the respective ones of the candidate target edge nodes, where i is an integer equal to or greater than 1; and a data point instance j of the one or more edge node subsystem determinism metrics for each subsystem number i, where j is an integer equal to or greater than 1 and; the operations further include: assigning a weight vector $w_i$ to subsystem determinism metrics of each subsystem number i; for said each of the respective ones of the candidate target edge nodes, calculating a sum $n_j$ of the one or more edge node subsystem determinism metrics for each data point instance j and through all edge node subsystem determinism metrics i, wherein $n_j$ is given by:

$$n_j = \sum_{i=1} w_i d_{ij}$$

and performing regression on data points $n_j$ through data point instances j to determine the overall edge node determinism metrics as a function of time, d(t), for said each of the respective ones of the candidate target edge nodes.

Example 6 includes the subject matter of any one of Examples 4-5, and optionally, wherein the one or more edge node subsystem determinism metrics include at least one of: edge node compute subsystem determinism metrics, edge node network subsystem determinism metrics, edge node memory subsystem determinism metrics, or edge node network subsystem determinism metrics.

Example 7 includes the subject matter of Examples 5-6, and optionally, wherein the operations further include parsing one or more fields of a Virtualized Industrial Function Descriptor (VIFD) to determine the weight vector $w_i$ of each subsystem number i.

Example 8 includes the subject matter of any one of Examples 1-7, the operations further comprising: determining whether respective edge nodes of the edge computing system support workload computer resource requirements of the workload; and in response to a determination that one or more of the respective edge nodes of the edge computing system support the workload compute resource requirements: generating a node identification list for the one or more of the respective edge nodes of the edge computing system, the node identification list to identify the set of candidate target edge nodes; and using the node identification list for the one or more of the respective edge nodes to determine whether respective ones of the candidate target edge nodes of the set of candidate target edge nodes support the workload determinism key performance indicators (KPIs).

Example 9 includes the subject matter of claim 8, and optionally, wherein the operations further comprise: parsing one or more fields of a Virtualized Industrial Function Descriptor (VIFD) to determine the workload compute resource requirements; determining compute resource requirements of the respective edge nodes from resource landscape data for the edge computing system; and comparing the workload computer resource requirements with the compute resource requirements of the respective edge nodes to determine whether the respective edge nodes support the workload computer resource requirements.

Example 10 includes the subject matter of Examples 1-9, wherein selecting the target edge node includes: in response to a determination that one or more candidate target edge nodes do not support the workload determinism KPIs, generating an excluded node identification list for the one or more candidate target edge nodes that do not support the workload determinism KPIs; and causing the excluded node identification list to be removed from a node ID database of the edge computing system.

Example 11 includes the subject matter of any one of Examples 5-10, the operations further including: in response to a determination that the one or more candidate target edge nodes include a single candidate target edge node, selecting the single candidate target edge node as the target edge node; in response to a determination that the one or more candidate target edge nodes include a plurality of candidate target edge nodes: applying a cost function to the plurality of candidate target edge nodes by determining a cost of deployment of the workload on each candidate target edge node of the plurality of candidate target edge nodes; and selecting the target edge node based on determining the cost of deployment.

Example 12 includes the subject matter of Example 11, and optionally, the operations further including, in response to the determination that the one or more candidate target edge nodes include a plurality of candidate target edge nodes, selecting the target edge node as an edge node with a lowest cost of deployment.

Example 13 includes the subject matter of Examples 11-12, and optionally, the operations further including parsing relevant fields of a Virtualized Industrial Function Descriptor (VIFD) to determine workload cost parameters for the workload, and determining the cost of deployment based on the workload cost parameters.

Example 14 includes the subject matter of Example 11, and optionally, wherein selecting the target edge node includes: determining that the workload is to be deployed in a redundant and synchronized configuration as a primary workload on a primary edge node and a secondary workload on a secondary edge node; and based on a determination that the workload is to be deployed in a redundant and synchronized configuration, selecting, as the target edge node, the primary edge node and the secondary edge node from the plurality of candidate target edge nodes based on a rate of change of a last calculated datapoint instance of the overall edge node determinism metrics of each of the primary edge node and the secondary edge node.

Example 15 includes the subject matter of Example 14, and optionally, wherein the last calculated datapoint instance of the overall edge node determinism metrics of each of the primary edge node and the secondary edge node corresponds to a decision metric given by:

$$\text{Decision Metric} = d'(t_f) * n_f$$

where $d'(t_f)$ is a derivative of $d(t_f)$, and $d(t_f)$ is a value if $d(t)$ at a last time instance $t_f$ at which $d(t)$ has been determined.

Example 16 includes the subject matter of Example 14, wherein determining that the workload is to be deployed in a redundant and synchronized configuration includes parsing one or more lockstep fields of a Virtualized Industrial Function Descriptor (VIFD).

Example 17 includes the subject matter of Example 14, and optionally, the operations further including implementing edge node state synchronization between the primary edge node and the secondary edge node by causing a storing of workload interprocess communication (IPC) calls and trace for the workload at the primary edge node and the secondary edge node.

Example 18 includes the subject matter of Example 17, and optionally, the operations further including: determining whether a request for migration of the workload from the primary edge node exists; and in response to a determination that the request exists: recreating the workload IPC calls at the secondary edge node; and deleting the workload IPC calls and trace from the primary edge node; and in response to a determination that the request does not exist, deleting the workload IPC calls and trace from the primary edge node and the secondary edge node.

Example 19 includes a device of an edge computing system to identify a target edge node for deployment of a workload thereon, the device comprising: a centralized determinism evaluator (CDE) to: determine whether respective ones of candidate target edge nodes of a set of candidate target edge nodes of the edge computing system support workload determinism key performance indicators (KPIs) of the workload; and in response to a determination that one or more candidate target edge nodes support the workload determinism KPIs, select a target edge node from the one or more candidate edge nodes; and an orchestrator to deploy the workload at the target edge node.

Example 20 includes the subject matter of Example 19, and optionally, the CDE to parse one or more fields of a Virtualized Industrial Function Descriptor (VIFD) to determine the workload determinism KPI.

Example 21 includes the subject matter of Example 19, and optionally, the CDE to compare the workload determinism KPIs with respective overall edge node determinism metrics of the respective ones of the candidate target edge nodes to determine whether the respective ones of the candidate target edge nodes support the workload determinism KPIs.

Example 22 includes the subject matter of any one of Examples 19-21 and optionally, the CDE to further calculate overall edge node determinism metrics for each of the respective ones of the candidate target edge nodes of the set of candidate target edge nodes, calculating the overall edge node determinism metrics being based on one or more edge node subsystem determinism metrics for said each of the respective ones of the candidate target edge nodes.

Example 23 includes the subject matter of Example 22, and optionally, wherein: the one or more edge node subsystem determinism metrics for said each of the respective ones of the candidate target edge nodes include edge node subsystem determinism metrics $d_{ij}$ corresponding to: a subsystem number i designating a subsystem type of said each of the respective ones of the candidate target edge nodes, where i is an integer equal to or greater than 1; and a data point instance j of the one or more edge node subsystem determinism metrics for each subsystem number i, where j is an integer equal to or greater than 1 and; the CDE is further to: assign a weight vector $w_i$ to subsystem determinism metrics of each subsystem number i; for said each of the respective ones of the candidate target edge nodes, calculate a sum $n_j$ of the one or more edge node subsystem determinism metrics for each data point instance j and through all edge node subsystem determinism metrics i, wherein $n_j$ is given by:

$$n_j = \sum_{i=1} w_i d_{ij}$$

and perform regression on data points $n_j$ through data point instances j to determine the overall edge node determinism metrics as a function of time, d(t), for said each of the respective ones of the candidate target edge nodes.

Example 24 includes the subject matter of any one of Examples 22-23, and optionally, wherein the one or more edge node subsystem determinism metrics include at least one of: edge node compute subsystem determinism metrics, edge node network subsystem determinism metrics, edge node memory subsystem determinism metrics, or edge node network subsystem determinism metrics.

Example 25 includes the subject matter of any one of Examples 23-24, and optionally, wherein the CDE to further parse one or more fields of a Virtualized Industrial Function Descriptor (VIFD) to determine the weight vector $w_i$ of each subsystem i.

Example 26 includes the subject matter of any one of Examples 19-25, and optionally, wherein the orchestrator to: determine whether respective edge nodes of the edge computing system support workload computer resource requirements of the workload; and in response to a determination that one or more of the respective edge nodes of the edge computing system support the workload compute resource requirements: generate a node identification list for the one or more of the respective edge nodes of the edge computing system, the node identification list to identify the set of candidate target edge nodes; and use the node identification list for the one or more of the respective edge nodes to determine whether respective ones of the candidate target edge nodes of the set of candidate target edge nodes support the workload determinism key performance indicators (KPIs).

Example 27 includes the subject matter of Example 26, and optionally, the orchestrator to: parse one or more fields of a Virtualized Industrial Function Descriptor (VIFD) to determine the workload compute resource requirements; determine compute resource requirements of the respective edge nodes from resource landscape data for the edge computing system; and compare the workload computer resource requirements with the compute resource requirements of the respective edge nodes to determine whether the respective edge nodes support the workload computer resource requirements.

Example 28 includes the subject matter of any one of Examples 19-27, and optionally, wherein the CDE is to select the target edge node by: in response to a determination that one or more candidate target edge nodes do not support the workload determinism KPIs, generating an excluded node identification list for the one or more candidate target edge nodes that do not support the workload determinism KPIs; and causing the excluded node identification list to be removed from a node ID database of the edge computing system.

Example 29 includes the subject matter of any one of Examples 23-28, and optionally, wherein the CDE to: in response to a determination that the one or more candidate target edge nodes include a single candidate target edge node, select the single candidate target edge node as the target edge node; in response to a determination that the one or more candidate target edge nodes include a plurality of candidate target edge nodes: apply a cost function to the plurality of candidate target edge nodes by determining a cost of deployment of the workload on each candidate target edge node of the plurality of candidate target edge nodes; and select the target edge node based on determining the cost of deployment.

Example 30 includes the subject matter of Example 29, and optionally, CDE further to, in response to the determination that the one or more candidate target edge nodes include a plurality of candidate target edge nodes, select the target edge node as an edge node with a lowest cost of deployment.

Example 31 includes the subject matter of any one of Examples 29-30, and optionally, wherein the CDE to parse relevant fields of a Virtualized Industrial Function Descriptor (VIFD) to determine workload cost parameters for the workload, and determining the cost of deployment based on the workload cost parameters.

Example 32 includes the subject matter of Example 29, and optionally, wherein the CDE is to select the target edge node by: determining that the workload is to be deployed in a redundant and synchronized configuration as a primary workload on a primary edge node and a secondary workload on a secondary edge node; and based on a determination that the workload is to be deployed in a redundant and synchronized configuration, selecting, as the target edge node, the primary edge node and the secondary edge node from the plurality of candidate target edge nodes based on a rate of change of a last calculated datapoint instance of the overall edge node determinism metrics of each of the primary edge node and the secondary edge node.

Example 33 includes the subject matter of Example 32, and optionally, wherein the last calculated datapoint instance of the overall edge node determinism metrics of each of the primary edge node and the secondary edge node corresponds to a decision metric given by:

$$\text{Decision Metric} = d'(t_f) * n_f$$

where $d'(t_f)$ is a derivative of $d(t_f)$, and $d(t_f)$ is a value if d(t) at a last time instance $t_f$ at which d(t) has been determined.

Example 34 includes the subject matter of Example 32, and optionally, wherein determining that the workload is to be deployed in a redundant and synchronized configuration includes parsing one or more lockstep fields of a Virtualized Industrial Function Descriptor (VIFD).

Example 35 includes the subject matter of Example 32, and optionally, the orchestrator to implement an edge node state synchronization between the primary edge node and the secondary edge node by causing a storing of workload interprocess communication (IPC) calls and trace for the workload at the primary edge node and the secondary edge node.

Example 36 includes the subject matter of Example 35, and optionally, the orchestrator to: determine whether a request for migration of the workload from the primary edge node exists; and in response to a determination that the request exists: recreate the workload IPC calls at the secondary edge node; and delete the workload IPC calls and trace from the primary edge node; and in response to a determination that the request does not exist, delete the workload IPC calls and trace from the primary edge node and the secondary edge node.

Example 37 includes the subject matter of any one of Examples 19-36, and optionally, wherein the device includes an edge gateway node or an edge aggregator node.

Example 38 includes a computer-implemented method to identify a target edge node of an edge computing system for deployment of a workload on the target edge node, the method comprising: determining whether respective ones of candidate target edge nodes of a set of candidate target edge nodes of the edge computing system support workload determinism key performance indicators (KPIs) of the workload; in response to a determination that one or more candidate target edge nodes support the workload determinism KPIs, selecting a target edge node from the one or more candidate edge nodes; and causing the workload to be deployed at the target edge node.

Example 39 includes the subject matter of Example 38, and optionally, the method further comprising parsing one or more fields of a Virtualized Industrial Function Descriptor (VIFD) to determine the workload determinism KPIs.

Example 40 includes the subject matter of Example 38, and optionally, the method further including comparing the workload determinism KPIs with respective overall edge node determinism metrics of the respective ones of the candidate target edge nodes to determine whether the respective ones of the candidate target edge nodes support the workload determinism KPIs.

Example 41 includes the method of any one of Examples 38-40, and optionally, the method further comprising calculating overall edge node determinism metrics for each of the respective ones of the candidate target edge nodes of the set of candidate target edge nodes, calculating the overall edge node determinism metrics being based on one or more edge node subsystem determinism metrics for said each of the respective ones of the candidate target edge nodes.

Example 42 includes the subject matter of Example 41, and optionally, wherein: the one or more edge node subsystem determinism metrics for said each of the respective ones of the candidate target edge nodes include edge node subsystem determinism metrics $d_{ij}$ corresponding to: a subsystem number i designating a subsystem type of said each of the respective ones of the candidate target edge nodes, where i is an integer equal to or greater than 1; and a data point instance j of the one or more edge node subsystem determinism metrics for each subsystem number i, where j is an integer equal to or greater than 1 and; the method further includes: assigning a weight vector $w_i$ to subsystem determinism metrics of each subsystem number i; for said each of the respective ones of the candidate target edge nodes, calculating a sum $n_j$ of the one or more edge node subsystem determinism metrics for each data point instance j and through all edge node subsystem determinism metrics i, wherein $n_j$ is given by:

$$n_j = \sum_{i=1} w_i d_{ij}$$

and performing regression on data points $n_j$ through data point instances j to determine the overall edge node determinism metrics as a function of time, d(t), for said each of the respective ones of the candidate target edge nodes.

Example 43 includes the method of any one of Examples 41-42, and optionally, wherein the one or more edge node subsystem determinism metrics include at least one of: edge node compute subsystem determinism metrics, edge node network subsystem determinism metrics, edge node memory subsystem determinism metrics, or edge node network subsystem determinism metrics.

Example 44 includes the method of any one of Examples 42-43, and optionally, the method further including parsing one or more fields of a Virtualized Industrial Function Descriptor (VIFD) to determine the weight vector $w_i$ of each subsystem number i.

Example 45 includes the method of any one of Examples 38-44, and optionally, the method further comprising: determining whether respective edge nodes of the edge computing system support workload computer resource requirements of the workload; and in response to a determination that one or more of the respective edge nodes of the edge computing system support the workload compute resource requirements; generating a node identification list for the one or more of the respective edge nodes of the edge computing system, the node identification list to identify the set of candidate target edge nodes; and using the node identification list for the one or more of the respective edge nodes to determine whether respective ones of the candidate target edge nodes of the set of candidate target edge nodes support the workload determinism key performance indicators (KPIs).

Example 46 includes the subject matter of Example 45, and optionally, the method further comprising: parsing one or more fields of a Virtualized Industrial Function Descriptor (VIFD) to determine the workload compute resource requirements; determining compute resource requirements of the respective edge nodes from resource landscape data for the edge computing system; and comparing the workload computer resource requirements with the compute resource requirements of the respective edge nodes to determine whether the respective edge nodes support the workload computer resource requirements.

Example 47 includes the method of any one of Examples 38-46, and optionally, wherein selecting the target edge node includes: in response to a determination that one or more candidate target edge nodes do not support the workload determinism KPIs, generating an excluded node identification list for the one or more candidate target edge nodes that do not support the workload determinism KPIs; and causing the excluded node identification list to be removed from a node ID database of the edge computing system.

Example 48 includes the method of any one of Examples 42-47, and optionally, the method further including: in response to a determination that the one or more candidate target edge nodes include a single candidate target edge node, selecting the single candidate target edge node as the target edge node; in response to a determination that the one or more candidate target edge nodes include a plurality of candidate target edge nodes: applying a cost function to the plurality of candidate target edge nodes by determining a cost of deployment of the workload on each candidate target edge node of the plurality of candidate target edge nodes; and selecting the target edge node based on determining the cost of deployment.

Example 49 includes the subject matter of Example 48, and optionally, the method further including, in response to the determination that the one or more candidate target edge nodes include a plurality of candidate target edge nodes, selecting the target edge node as an edge node with a lowest cost of deployment.

Example 50 includes the method of any one of Examples 48-49, and optionally, the method further including parsing relevant fields of a Virtualized Industrial Function Descriptor (VIFD) to determine workload cost parameters for the workload, and determining the cost of deployment based on the workload cost parameters.

Example 51 includes the subject matter of Example 48, and optionally, wherein selecting the target edge node includes: determining that the workload is to be deployed in a redundant and synchronized configuration as a primary workload on a primary edge node and a secondary workload on a secondary edge node; and based on a determination that the workload is to be deployed in a redundant and synchronized configuration, selecting, as the target edge node, the primary edge node and the secondary edge node from the plurality of candidate target edge nodes based on a rate of change of a last calculated datapoint instance of the overall edge node determinism metrics of each of the primary edge node and the secondary edge node.

Example 52 includes the subject matter of Example 51, and optionally, wherein the last calculated datapoint instance of the overall edge node determinism metrics of each of the primary edge node and the secondary edge node corresponds to a decision metric given by:

$$\text{Decision Metric}=d'(t_f)*n_f$$

where $d'(t_f)$ is a derivative of $d(t_f)$, and $d(t_f)$ is a value if $d(t)$ at a last time instance $t_f$ at which $d(t)$ has been determined.

Example 53 includes the subject matter of Example 51, and optionally, wherein determining that the workload is to be deployed in a redundant and synchronized configuration includes parsing one or more lockstep fields of a Virtualized Industrial Function Descriptor (VIFD).

Example 54 includes the subject matter of Example 51, and optionally, the method further including implementing edge node state synchronization between the primary edge node and the secondary edge node by causing a storing of workload interprocess communication (IPC) calls and trace for the workload at the primary edge node and the secondary edge node.

Example 55 includes the subject matter of Example 54, and optionally, the method further including: determining whether a request for migration of the workload from the primary edge node exists; and in response to a determination that the request exists: recreating the workload IPC calls at the secondary edge node; and deleting the workload IPC calls and trace from the primary edge node; and in response to a determination that the request does not exist, deleting the workload IPC calls and trace from the primary edge node and the secondary edge node.

Example 56 includes an apparatus comprising: means for determining whether respective ones of candidate target edge nodes of a set of candidate target edge nodes of the edge computing system support workload determinism key performance indicators (KPIs) of the workload; means for, in response to a determination that one or more candidate target edge nodes support the workload determinism KPIs, selecting a target edge node from the one or more candidate edge nodes; and means for causing the workload to be deployed at the target edge node.

Example 57 includes the subject matter of Example 56, and optionally, further including means for parsing one or more fields of a Virtualized Industrial Function Descriptor (VIFD) to determine the workload determinism KPIs.

Example 58 includes the subject matter of Example 56, and optionally, further including means for comparing the workload determinism KPIs with respective overall edge node determinism metrics of the respective ones of the candidate target edge nodes to determine whether the respective ones of the candidate target edge nodes support the workload determinism KPIs.

Example 59 includes the subject matter of any one of Examples 56-58, and optionally, further comprising means for calculating overall edge node determinism metrics for each of the respective ones of the candidate target edge nodes of the set of candidate target edge nodes, calculating the overall edge node determinism metrics being based on one or more edge node subsystem determinism metrics for said each of the respective ones of the candidate target edge nodes.

Example 60 includes a means for performing the method of any one of the method examples described above.

Another example implementation is an aggregation node, network hub node, gateway node, or core data processing node, within or coupled to an edge computing system, operable to invoke or perform the operations of any one of the method examples above, or other subject matter described herein.

Another example implementation is an access point, base station, road-side unit, street-side unit, or on-premise unit, within or coupled to an edge computing system, operable to invoke or perform the operations of any one of the method examples above, or other subject matter described herein.

Another example implementation is an edge provisioning node, service orchestration node, application orchestration node, or multi-tenant management node, within or coupled to an edge computing system, operable to invoke or perform the operations of any one of the method examples above, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of any one of the method examples above, or other subject matter described herein.

Another example implementation is an edge computing system operable as an edge mesh, as an edge mesh with side car loading, or with mesh-to-mesh communications, operable to invoke or perform the operations of any one of the method examples above, or other subject matter described herein.

Another example implementation is an edge computing system including aspects of network functions, acceleration functions, acceleration hardware, storage hardware, or computation hardware resources, operable to invoke or perform the use cases discussed herein, with use of any one of the method examples above, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of any one of the method examples above, or other subject matter described herein.

Another example implementation is an edge computing system adapted for mobile wireless communications, including configurations according to an 3GPP 4G/LTE or 5G network capabilities, operable to invoke or perform the use cases discussed herein, with use of any one of the method examples above, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A non-transitory computer-readable storage medium of an edge computing system to identify a target edge node for deployment of a workload thereon, the computer-readable storage medium comprising computer-readable instructions that, when executed, cause at least one processor to perform operations comprising:
    determining whether respective ones of candidate target edge nodes of a set of candidate target edge nodes of the edge computing system support workload determinism key performance indicators (KPIs) of the workload;
    in response to a determination that one or more candidate target edge nodes support the workload determinism KPIs, selecting a target edge node from the one or more candidate edge nodes;
    causing the workload to be deployed at the target edge node; and
    parsing one or more fields of a Virtualized Industrial Function Descriptor (VIFD) to determine the workload determinism KPIs.

2. The computer-readable storage medium of claim 1, the operations further including comparing the workload determinism KPIs with respective overall edge node determinism metrics of the respective ones of the candidate target edge nodes to determine whether the respective ones of the candidate target edge nodes support the workload determinism KPIs.

3. The computer-readable storage medium of claim 1, the operations further comprising calculating overall edge node determinism metrics for each of the respective ones of the candidate target edge nodes of the set of candidate target edge nodes, calculating the overall edge node determinism metrics being based on one or more edge node subsystem determinism metrics for said each of the respective ones of the candidate target edge nodes.

4. The computer-readable storage medium of claim 3, wherein:
    the one or more edge node subsystem determinism metrics for said each of the respective ones of the candidate target edge nodes include edge node subsystem determinism metrics $d_{ij}$ corresponding to:
        a subsystem number i designating a subsystem type of said each of the respective ones of the candidate target edge nodes, where i is an integer equal to or greater than 1; and
        a data point instance j of the one or more edge node subsystem determinism metrics for each subsystem number i, where j is an integer equal to or greater than 1 and;
    the operations further include:
        assigning a weight vector $w_i$ to subsystem determinism metrics of each subsystem number i;
        for said each of the respective ones of the candidate target edge nodes, calculating a sum $n_j$ of the one or more edge node subsystem determinism metrics for each data point instance j and through all edge node subsystem determinism metrics i, wherein $n_j$ is given by:

$$n_j = \sum_{i=1} w_i d_{ij};$$

and
        performing regression on data points $n_j$ through data point instances j to determine the overall edge node determinism metrics as a function of time, d(t), for said each of the respective ones of the candidate target edge nodes.

5. The computer-readable storage medium of claim 3, wherein the one or more edge node subsystem determinism metrics include at least one of: edge node compute subsystem determinism metrics, edge node network subsystem determinism metrics, edge node memory subsystem determinism metrics, or edge node network subsystem determinism metrics.

6. The computer-readable storage medium of claim 1, the operations further comprising:
    determining whether respective edge nodes of the edge computing system support workload computer resource requirements of the workload; and
    in response to a determination that one or more of the respective edge nodes of the edge computing system support the workload compute resource requirements:
        generating a node identification list for the one or more of the respective edge nodes of the edge computing system, the node identification list to identify the set of candidate target edge nodes; and using the node identification list for the one or more of the respective edge nodes to determine whether respective ones of the candidate target edge nodes of the set of candidate target edge nodes support the workload determinism key performance indicators (KPIs).

7. The computer-readable storage medium of claim 6, the operations further comprising:
determining compute resource requirements of the respective edge nodes from resource landscape data for the edge computing system; and
comparing the workload computer resource requirements with the compute resource requirements of the respective edge nodes to determine whether the respective edge nodes support the workload computer resource requirements.

8. The computer-readable storage medium of claim 4, the operations further including:
in response to a determination that the one or more candidate target edge nodes include a single candidate target edge node, selecting the single candidate target edge node as the target edge node;
in response to a determination that the one or more candidate target edge nodes include a plurality of candidate target edge nodes:
applying a cost function to the plurality of candidate target edge nodes by determining a cost of deployment of the workload on each candidate target edge node of the plurality of candidate target edge nodes; and
selecting the target edge node based on determining the cost of deployment.

9. The computer-readable storage medium of claim 8, the operations further including, in response to the determination that the one or more candidate target edge nodes include a plurality of candidate target edge nodes, selecting the target edge node as an edge node with a lowest cost of deployment.

10. The computer-readable storage medium of claim 8, wherein selecting the target edge node includes:
determining that the workload is to be deployed in a redundant and synchronized configuration as a primary workload on a primary edge node and a secondary workload on a secondary edge node; and
based on a determination that the workload is to be deployed in a redundant and synchronized configuration, selecting, as the target edge node, the primary edge node and the secondary edge node from the plurality of candidate target edge nodes based on a rate of change of a last calculated datapoint instance of the overall edge node determinism metrics of each of the primary edge node and the secondary edge node.

11. The computer-readable storage medium of claim 10, wherein the last calculated datapoint instance of the overall edge node determinism metrics of each of the primary edge node and the secondary edge node corresponds to a decision metric given by:

$$\text{Decision Metric} = d'(t_f) * n_f$$

where $d'(t_f)$ is a derivative of $d(t_f)$, and $d(t_f)$ is a value if $d(t)$ at a last time instance $t_f$ at which $d(t)$ has been determined.

12. The computer-readable storage medium of claim 10, the operations further including implementing edge node state synchronization between the primary edge node and the secondary edge node by causing a storing of workload interprocess communication (IPC) calls and trace for the workload at the primary edge node and the secondary edge node.

13. An apparatus of an edge computing system to identify a target edge node for deployment of a workload thereon, the apparatus comprising:
a centralized determinism evaluator (CDE) to:
parse one or more fields of a Virtualized Industrial Function Descriptor (VIFD);
determine, based on parsing the one or more fields of the VIFD, whether respective ones of candidate target edge nodes of a set of candidate target edge nodes of the edge computing system support workload determinism key performance indicators (KPIs) of the workload; and
in response to a determination that one or more candidate target edge nodes support the workload determinism KPIs, select a target edge node from the one or more candidate edge nodes; and
an orchestrator to deploy the workload at the target edge node.

14. The apparatus of claim 13, the CDE to compare the workload determinism KPIs with respective overall edge node determinism metrics of the respective ones of the candidate target edge nodes to determine whether the respective ones of the candidate target edge nodes support the workload determinism KPIs.

15. The apparatus of claim 13, the CDE to further calculate overall edge node determinism metrics for each of the respective ones of the candidate target edge nodes of the set of candidate target edge nodes, calculating the overall edge node determinism metrics being based on one or more edge node subsystem determinism metrics for said each of the respective ones of the candidate target edge nodes.

16. The apparatus of claim 15, wherein:
the one or more edge node subsystem determinism metrics for said each of the respective ones of the candidate target edge nodes include edge node subsystem determinism metrics $d_{ij}$ corresponding to:
a subsystem number i designating a subsystem type of said each of the respective ones of the candidate target edge nodes, where i is an integer equal to or greater than 1; and
a data point instance j of the one or more edge node subsystem determinism metrics for each subsystem number i, where j is an integer equal to or greater than 1 and;
the CDE is further to:
assign a weight vector $w_i$ to subsystem determinism metrics of each subsystem number i;
for said each of the respective ones of the candidate target edge nodes, calculate a sum $n_j$ of the one or more edge node subsystem determinism metrics for each data point instance j and through all edge node subsystem determinism metrics i, wherein $n_j$ is given by:

$$n_j = \sum_{i=1} w_i d_{ij};$$

and
perform regression on data points $n_j$ through data point instances j to determine the overall edge node determinism metrics as a function of time, d(t), for said each of the respective ones of the candidate target edge nodes.

17. A computer-implemented method to identify a target edge node of an edge computing system for deployment of a workload on the target edge node, the method comprising:
parsing one or more fields of a Virtualized Industrial Function Descriptor (VIFD);
determining, based on parsing the one or more fields of the VIFD, whether respective ones of candidate target edge nodes of a set of candidate target edge nodes of the edge computing system support workload determinism key performance indicators (KPIs) of the workload;
in response to a determination that one or more candidate target edge nodes support the workload determinism KPIs, selecting a target edge node from the one or more candidate edge nodes; and
causing the workload to be deployed at the target edge node.

18. The method of claim 17, the method further comprising calculating overall edge node determinism metrics for each of the respective ones of the candidate target edge nodes of the set of candidate target edge nodes, calculating the overall edge node determinism metrics being based on one or more edge node subsystem determinism metrics for said each of the respective ones of the candidate target edge nodes wherein:
the one or more edge node subsystem determinism metrics for said each of the respective ones of the candidate target edge nodes include edge node subsystem determinism metrics $d_{ij}$ corresponding to:
a subsystem number i designating a subsystem type of said each of the respective ones of the candidate target edge nodes, where i is an integer equal to or greater than 1; and
a data point instance j of the one or more edge node subsystem determinism metrics for each subsystem number i, where j is an integer equal to or greater than 1 and;
the method further includes:
assigning a weight vector $w_i$ to subsystem determinism metrics of each subsystem number i;
for said each of the respective ones of the candidate target edge nodes, calculating a sum $n_j$ of the one or more edge node subsystem determinism metrics for each data point instance j and through all edge node subsystem determinism metrics i, wherein $n_j$ is given by:

$$n_j = \sum_{i=1}^{} w_i d_{ij};$$

and
performing regression on data points $n_j$ through data point instances j to determine the overall edge node determinism metrics as a function of time, d(t), for said each of the respective ones of the candidate target edge nodes.

19. The method of claim 17, the method further including:
in response to a determination that the one or more candidate target edge nodes include a single candidate target edge node, selecting the single candidate target edge node as the target edge node;
in response to a determination that the one or more candidate target edge nodes include a plurality of candidate target edge nodes:
applying a cost function to the plurality of candidate target edge nodes by determining a cost of deployment of the workload on each candidate target edge node of the plurality of candidate target edge nodes; and
selecting the target edge node based on determining the cost of deployment, wherein selecting the target edge node includes:
determining that the workload is to be deployed in a redundant and synchronized configuration as a primary workload on a primary edge node and a secondary workload on a secondary edge node; and
based on a determination that the workload is to be deployed in a redundant and synchronized configuration, selecting, as the target edge node, the primary edge node and the secondary edge node from the plurality of candidate target edge nodes based on the cost of deployment and on a rate of change of a last calculated datapoint instance of the overall edge node determinism metrics of each of the primary edge node and the secondary edge node; and
implementing edge node state synchronization between the primary edge node and the secondary edge node by causing a storing of workload interprocess communication (IPC) calls and trace for the workload at the primary edge node and the secondary edge node.

20. The method of claim 19, wherein the last calculated datapoint instance of the overall edge node determinism metrics of each of the primary edge node and the secondary edge node corresponds to a decision metric given by:

$$\text{Decision Metric} = d'(t_f) * n_f$$

where $d'(t_f)$ is a derivative of $d(t_f)$, and $d(t_f)$ is a value if d(t) at a last time instance $t_f$ at which d(t) has been determined.

21. The method of claim 19, the method further including:
determining whether a request for migration of the workload from the primary edge node exists; and
in response to a determination that the request exists:
recreating the workload IPC calls at the secondary edge node; and
deleting the workload IPC calls and trace from the primary edge node; and
in response to a determination that the request does not exist, deleting the workload IPC calls and trace from the primary edge node and the secondary edge node.

22. An apparatus comprising:
means for parsing one or more fields of a Virtualized Industrial Function Descriptor (VIFD);
means for determining, based on parsing the one or more fields of the VIFD, whether respective ones of candidate target edge nodes of a set of candidate target edge nodes of the edge computing system support workload determinism key performance indicators (KPIs) of the workload;
means for, in response to a determination that one or more candidate target edge nodes support the workload determinism KPIs, selecting a target edge node from the one or more candidate edge nodes; and
means for causing the workload to be deployed at the target edge node.

* * * * *